(12) United States Patent
Mori et al.

(10) Patent No.: US 12,287,450 B2
(45) Date of Patent: Apr. 29, 2025

(54) FUNCTIONAL LAMINATE AND FUNCTIONAL LENS COMPRISING THE FUNCTIONAL LAMINATE

(71) Applicant: TOKUYAMA CORPORATION, Shunan (JP)

(72) Inventors: Katsuhiro Mori, Shunan (JP); Toshimitsu Hiraren, Shunan (JP); Junji Momoda, Shunan (JP)

(73) Assignee: TOKUYAMA CORPORATION, Shunan (JP)

( * ) Notice: Subject to any disclaimer, the term of this patent is extended or adjusted under 35 U.S.C. 154(b) by 0 days.

(21) Appl. No.: 18/606,814

(22) Filed: Mar. 15, 2024

(65) Prior Publication Data
US 2024/0241291 A1 Jul. 18, 2024

Related U.S. Application Data

(63) Continuation of application No. 16/971,349, filed as application No. PCT/JP2019/005951 on Feb. 19, 2019, now Pat. No. 11,988,808.

(30) Foreign Application Priority Data

Feb. 23, 2018 (JP) .................................. 2018-030413
Apr. 27, 2018 (JP) .................................. 2018-087691
Oct. 19, 2018 (JP) .................................. 2018-197121

(51) Int. Cl.
*G02B 1/04* (2006.01)
*B32B 7/12* (2006.01)
(Continued)

(52) U.S. Cl.
CPC ................ *G02B 1/041* (2013.01); *B32B 7/12* (2013.01); *B32B 23/08* (2013.01); *B32B 27/08* (2013.01);
(Continued)

(58) Field of Classification Search
CPC ........... G02B 1/041; B23B 7/12; B23B 23/08; B23B 27/08; B23B 27/283; B23B 27/306;
(Continued)

(56) References Cited

U.S. PATENT DOCUMENTS 4,268,134 A 5/1981 Gulati et al.
5,312,689 A 5/1994 Dasher et al.
(Continued)

FOREIGN PATENT DOCUMENTS

CN 107238877 A 10/2017
EP 1 560 060 A1 8/2005
(Continued)

OTHER PUBLICATIONS

European Communication pursuant to Article 94(3) EPC for corresponding European Application No. 19756579.9, dated Dec. 4, 2023.
(Continued)

*Primary Examiner* — Sharrief I Broome
(74) *Attorney, Agent, or Firm* — Birch, Stewart, Kolasch & Birch, LLP

(57) ABSTRACT

A functional lens having a functional laminate (A) including a first optical sheet (Aa), a second optical sheet (Ab) and a functional layer (Ac) existent between these two sheets and having photochromic properties and/or polarizability and a synthetic resin layer (B) existent on at least one of the first optical sheet (Aa) and the second optical sheet (Ab) of the functional laminate (A), and adhesive strength between the first optical sheet (Aa) and/or the second optical sheet (Ab) and the synthetic resin layer (B) is not less than 50 N, wherein the reactive functional group of the surface modified area is an hydroxy group, thiol group, carboxy group, amino group, sulfo group, (thio)isocyanate group, allyl
(Continued)

group, (meth)acrylic group, vinyl group, epoxy group, oxetane group or a thioepoxy group.

17 Claims, 3 Drawing Sheets

(51) Int. Cl.
  *B32B 23/08* (2006.01)
  *B32B 27/08* (2006.01)
  *B32B 27/28* (2006.01)
  *B32B 27/30* (2006.01)
  *B32B 27/34* (2006.01)
  *B32B 27/36* (2006.01)
  *B32B 27/40* (2006.01)
  *G02C 7/02* (2006.01)
  *G02C 7/10* (2006.01)
  *G02C 7/12* (2006.01)

(52) U.S. Cl.
  CPC .......... *B32B 27/283* (2013.01); *B32B 27/306* (2013.01); *B32B 27/308* (2013.01); *B32B 27/34* (2013.01); *B32B 27/36* (2013.01); *B32B 27/40* (2013.01); *G02C 7/02* (2013.01); *G02C 7/102* (2013.01); *G02C 7/12* (2013.01); *B32B 2250/03* (2013.01); *B32B 2250/05* (2013.01); *B32B 2255/10* (2013.01); *B32B 2255/26* (2013.01); *B32B 2307/412* (2013.01); *B32B 2307/42* (2013.01); *B32B 2551/00* (2013.01)

(58) Field of Classification Search
  CPC ....... B23B 27/308; B23B 27/34; B23B 27/36; B23B 27/40; B23B 2250/03; B23B 2250/05; B23B 2255/10; B23B 2255/26; B23B 2307/412; B23B 2307/42; B23B 2251/10; G02C 7/02; G02C 7/102; G02C 7/12
  USPC .................................................... 351/159.62
  See application file for complete search history.

(56) References Cited

U.S. PATENT DOCUMENTS

| | | | |
|---|---|---|---|
| 7,350,917 B2 | 4/2008 | Kawai et al. | |
| 7,967,434 B2 | 6/2011 | Miura et al. | |
| 8,496,859 B2 | 7/2013 | Miura et al. | |
| 10,274,643 B2 | 4/2019 | Ryu et al. | |
| 10,663,622 B2 | 5/2020 | Ryu et al. | |
| 10,690,943 B2 | 6/2020 | Mori et al. | |
| 2012/0236255 A1 | 9/2012 | Jiang et al. | |
| 2013/0208239 A1* | 8/2013 | Jiang | B29D 11/00644 156/305 |
| 2013/0242393 A1* | 9/2013 | Ryu | G02B 5/3033 264/1.32 |
| 2015/0276986 A1* | 10/2015 | Ryu | B29D 11/00644 359/488.01 |
| 2016/0108298 A1 | 4/2016 | Berzon et al. | |
| 2016/0216425 A1* | 7/2016 | Marchal | G02B 1/14 |

FOREIGN PATENT DOCUMENTS

| | | |
|---|---|---|
| EP | 1 739 462 A1 | 1/2007 |
| EP | 2 602 300 A1 | 6/2013 |
| EP | 3 270 213 A1 | 1/2018 |
| EP | 3 495 441 A1 | 6/2019 |
| JP | 60-127923 U | 8/1985 |
| JP | 61-236521 A | 10/1986 |
| JP | 4-10030 Y2 | 3/1992 |
| JP | 2002-131537 A | 5/2002 |
| JP | 2005-181426 A | 7/2005 |
| JP | 2005-215640 A | 8/2005 |
| JP | 2007-25609 A | 2/2007 |
| JP | 2012-226026 A | 11/2012 |
| JP | 2012-230317 A | 11/2012 |
| JP | 2012-242701 A | 12/2012 |
| JP | 2012-242718 A | 12/2012 |
| JP | 2014-113761 A | 6/2014 |
| JP | 2015-113397 A | 6/2015 |
| JP | 2016-522269 A | 7/2016 |
| JP | 2016-169363 A | 9/2016 |
| JP | 2016-189009 A | 11/2016 |
| WO | WO 2008/013320 A1 | 1/2008 |
| WO | WO 2008/018168 A1 | 2/2008 |
| WO | WO 2011/105133 A1 | 9/2011 |
| WO | WO 2013/132805 A1 | 9/2013 |
| WO | WO 2015/018992 A1 | 2/2015 |
| WO | WO 2017/115874 A1 | 7/2017 |
| WO | WO 2018/025508 A1 | 2/2018 |

OTHER PUBLICATIONS

Extended European Search Report issued in corresponding European Application No. 19756579.9 on Feb. 18, 2022.
International Preliminary Report on Patentability and English translation of the Written Opinion of the International Searching Authority (PCT/IB/373 and PCT/ISA/237) dated Aug. 27, 2020 for Application No. PCT/JP2019/005951.
International Search Report, issued in PCT/JP2019/005951, dated Mar. 26, 2019.
Japanese Office Action for corresponding Japanese Application No. 2020-501761, dated Jul. 4, 2023, with English translation.
Non-Final Office Action issued in U.S. Appl. No. 16/971,349 on Dec. 18, 2023.
Partial Supplementary European Search Report dated Oct. 29, 2021 for corresponding Application No. 19756579.9.
Restriction Requirement issued in U.S. Appl. No. 16/971,349 on Aug. 10, 2023.
Written Opinion of the International Searching Authority, issued in PCT/JP2019/005951, dated Mar. 26, 2019.

* cited by examiner

[FIG. 1]
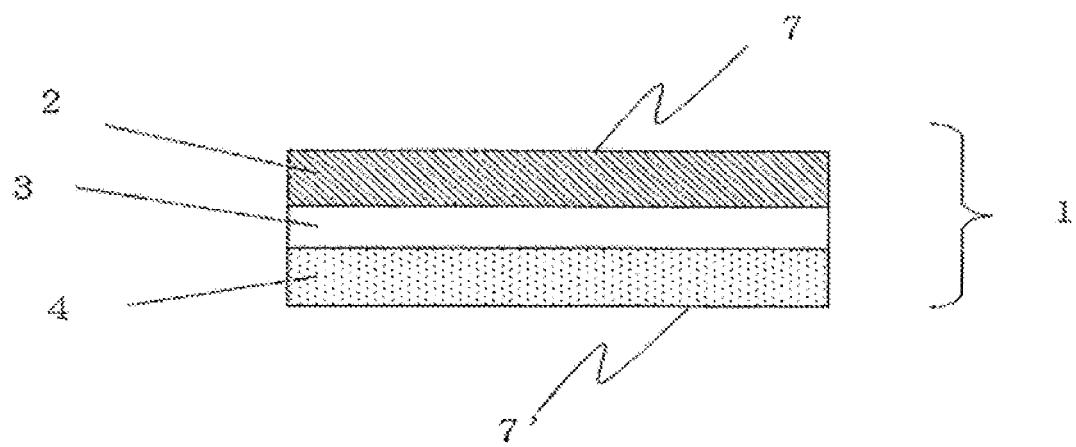
[FIG. 2]
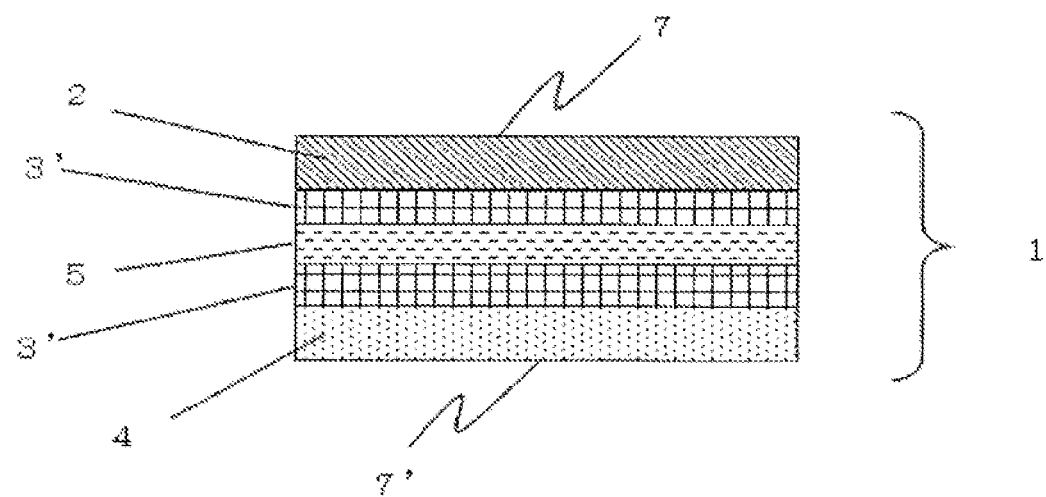

[FIG. 3]
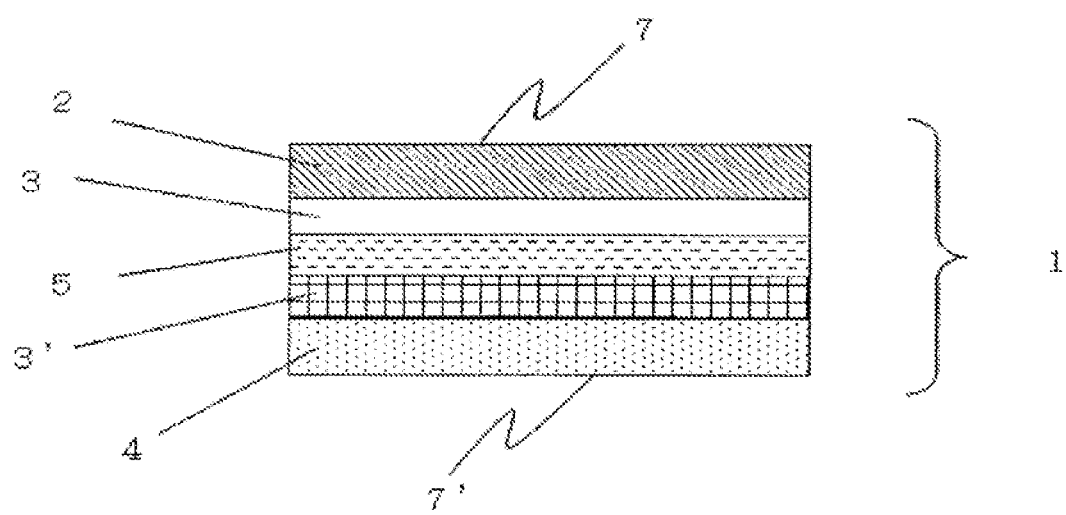
[FIG. 4]
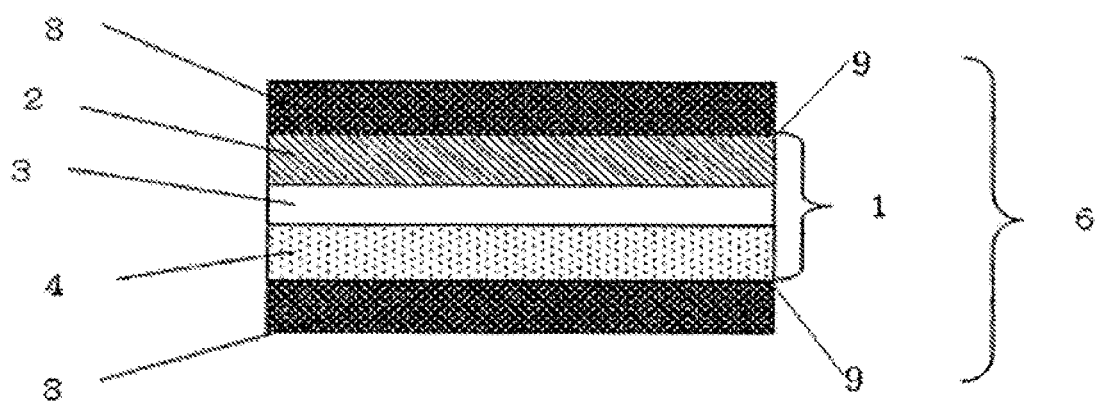

[FIG. 5]
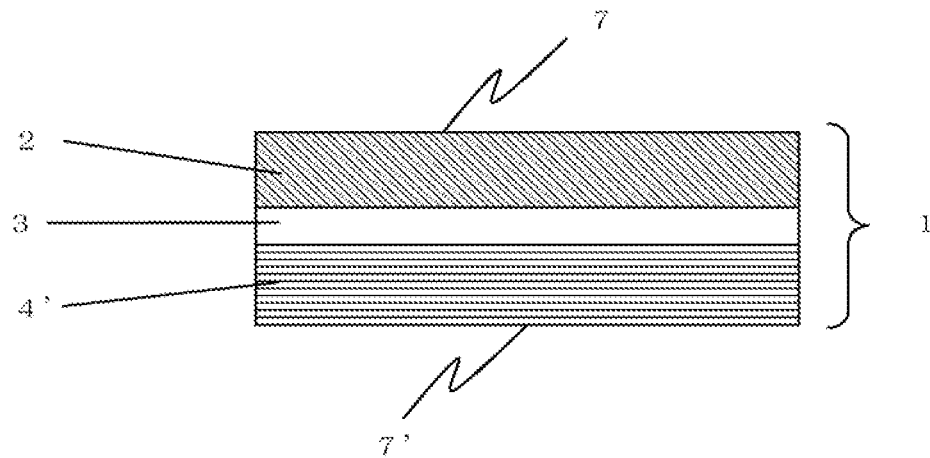
[FIG. 6]
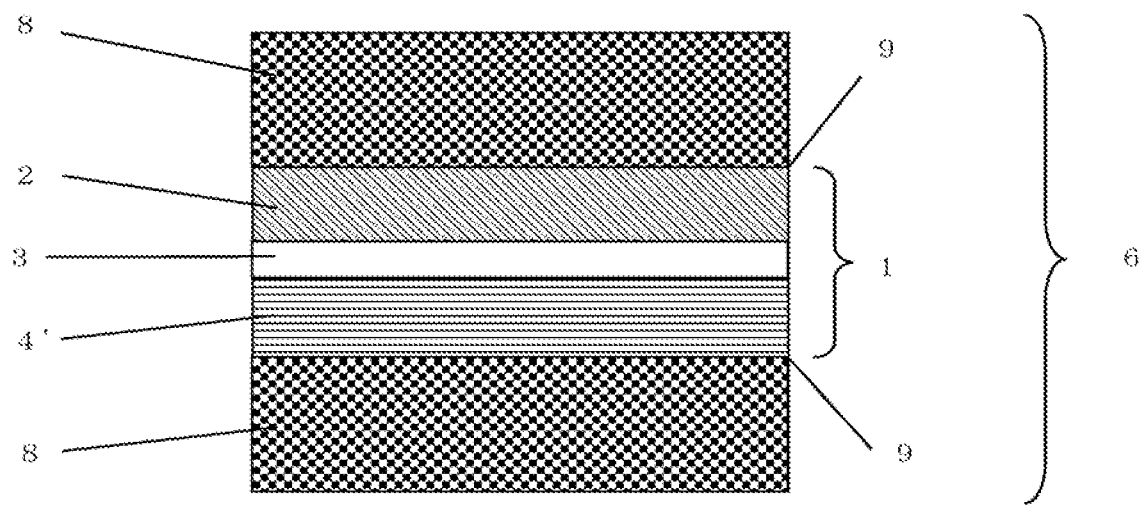

FUNCTIONAL LAMINATE AND FUNCTIONAL LENS COMPRISING THE FUNCTIONAL LAMINATE

CROSS-REFERENCE TO RELATED APPLICATIONS

This application is a Continuation of copending U.S. patent application Ser. No. 16/971,349, filed Aug. 20, 2020, which is the National Phase under 35 U.S.C. § 371 of International Application No. PCT/JP2019/005951, filed Feb. 19, 2019, which claims the benefit under 35 U.S.C. § 119 (a) to Patent Application No. 2018-197121 filed in Japan on Oct. 19, 2018, Patent Application No. 2018-087691 filed in Japan on Apr. 27, 2018, and Patent Application No. 2018-030413 filed in Japan on Feb. 23, 2018, all of which are hereby expressly incorporated by reference into the present application.

TECHNICAL FIELD

The present invention relates to a novel functional laminate having photochromic properties and/or polarizability and a novel functional lens comprising the functional laminate.

BACKGROUND ART

In recent years, in the field of spectacle lenses, demand for sunglasses having antiglare properties is growing rapidly. As the base materials of these sunglasses, plastic lenses are used since they are lighter in weight than glass lenses and have such high safety that they are hardly broken. Also, it is easy to provide various functions to these plastic sunglasses. For example, a photochromic lens which can adjust antiglare properties as transmittance thereof changes according to ambient brightness can be obtained by containing a photochromic compound or forming a photochromic layer. Also, a polarizing lens having enhanced antiglare properties can be obtained by forming a polarizing film having a polarizing function. Further, a polarizing photochromic lens having both photochromic properties and polarizability can be easily obtained.

The above plastic photochromic lens, polarizing lens and polarizing photochromic lens are produced by various methods. For example, they are produced by a method in which a coating composition comprising a photochromic compound is applied to the surface of a plastic lens or a method in which a photochromic compound is mixed with the material of a plastic lens.

As a method which can provide photochromic properties and/or polarizability at a low cost without impairing the characteristic properties of a plastic material as a base material, a method using a functional laminate having photochromic properties and/or polarizability is now under study. This functional laminate having photochromic properties and/or polarizability can be produced by the following method.

The functional laminate having photochromic properties can be produced by first dispersing a photochromic compound into an adhesive polyurethane resin to form an adhesive sheet and then laminating an optical sheet made of, for example, a polycarbonate resin on this adhesive sheet (refer to Patent Document 10 and Patent Document 11).

The functional laminate having polarizability can be produced by bonding a polarizing film made of polyvinyl alcohol to an optical sheet made of, for example, a polycarbonate resin through an adhesive resin such as polyurethane.

The functional laminate having photochromic properties and polarizability can be produced by dispersing a photochromic compound into an adhesive polyurethane resin to form an adhesive sheet and then forming a polarizing film made of polyvinyl alcohol and an optical sheet such as a polycarbonate resin on this adhesive sheet sequentially (refer to Patent Document 12).

As a specific method of producing a plastic lens using the above functional laminate, there is known a method in which a thermoplastic resin for lenses is laminated on the functional laminate by injection molding. Since it is necessary to introduce an injection molding machine in this method, the following simple method is proposed. For example, there is known a method using a monomer composition which is polymerized to become a thermosetting resin for lenses (may be referred to as "monomer composition for forming a lens" hereinafter) as an advantageous method capable of producing a functional lens easily. This method is to produce a photochromic lens, polarizing lens or polarizing photochromic lens by polymerizing the monomer composition for forming a lens after the laminate is embedded or immersed in the monomer composition for forming a lens. With this method using the monomer composition for forming a lens, a photochromic lens, polarizing lens or polarizing photochromic lens can be produced at a relatively low temperature. Further, since various functions can be provided to a lens by changing the type of the monomer, a large number of studies are being made on this method (refer to Patent Documents 1 to 5).

However, in these prior art methods, there is room for improvement in the following points. For example, in the method disclosed by Patent Documents 1, 2 and 3, there was a case where adhesion between the thermosetting resin layer or the synthetic resin layer as the base material and the optical sheet having photochromic properties or polarizability and adhesion between the optical sheet and the photochromic layer (adhesive sheet) or the polarizing film were unsatisfactory. Therefore, after the production of the photochromic lens or the polarizing lens, there was a case where each layer peeled off. Further, since chemical resistance was not satisfactory according to the material of the optical sheet in use, when the thermosetting resin layer (synthetic resin layer as the base material) was formed by polymerizing the monomer composition for forming a lens, there was a case where an appearance defect such as whitening or yellowing occurred.

To solve these problems, Patent Documents 4 to 9 disclose a method in which a photochromic laminate or polarizing laminate having a coating layer on the surface is used. In this method, a photochromic lens or polarizing lens is produced by forming a thermosetting resin (synthetic resin layer) composed of a polymerized product (cured product) of a monomer composition for forming a lens on the coating layer. In the Patent Document 4, coating layers made of polyurethane (meth)acrylate and polyester (meth)acrylate are enumerated. In the Patent Document 5, coating layers made of polyurethane are enumerated. In the Patent Document 6, coating layers made of a water-soluble polymer are enumerated. In the Patent Document 7, coating layers made of a composition comprising a hydrolyzable silicon compound having a (meth)acrylic group are enumerated. In the Patent Document 8, coating layers made of urethane urea having a polymerizable group are enumerated. In the Patent Document 9, coating layers made of a photocurable composition comprising a propenyl ether group-containing compound are enumerated.

However, even in the prior art photochromic lenses or polarizing lenses having a coating layer, there was a case where adhesion between the thermosetting resin layer (synthetic resin layer) and the optical sheet was not improved according to the type of the thermosetting resin layer (synthetic resin layer) and the type of the optical sheet. When adhesion is unsatisfactory and especially when the end face of the photochromic laminate or the polarizing laminate is flush with the end face of the thermosetting resin (synthetic resin layer), the photochromic lens or the polarizing lens itself may peel off.

PRIOR ART DOCUMENTS

Patent Documents

Patent Document 1: JP-A 61-236521
Patent Document 2: JP-A 2005-181426
Patent Document 3: WO2008/018168 pamphlet
Patent Document 4: JP-A 2005-215640
Patent Document 5: WO2013/132805 pamphlet
Patent Document 6: JP-A 2012-226026
Patent Document 7: JP-A 2012-230317
Patent Document 8: JP-A 2012-242701
Patent Document 9: JP-A 2012-242718
Patent Document 10: WO2017/115874 pamphlet
Patent Document 11: JP-A 2014-113761
Patent Document 12: WO2018/025508 pamphlet
Patent Document 13: Laid-open Utility Model 60-127923
Patent Document 14: Utility Model 4-10030

DISCLOSURE OF THE INVENTION

Problem to be Solved by the Invention

It is therefore an object of the present invention to provide a photochromic lens, polarizing lens or polarizing photochromic lens which has excellent adhesion between a synthetic resin layer made of a thermoplastic resin or thermosetting resin as a base material and an optical sheet. It is another object of the present invention to provide a photochromic lens, polarizing lens or polarizing photochromic lens having high transparency and photochromic properties and/or polarizability in addition to the above adhesion. It is a further object of the present invention to provide a method of producing a photochromic lens, polarizing lens or polarizing photochromic lens easily.

Other objects and advantages of the present invention will become apparent from the following description.

Means for Solving the Problem

To solve the above problems, the inventors of the present invention conducted studies on the surface state of the optical sheet of a photochromic lens, polarizing lens or polarizing photochromic lens, paying special attention to the surface state of the outer surface in contact with a monomer composition for forming a lens of an optical sheet and found that a lens having high adhesive force between layers against stress applied from the side face can be obtained by adjusting the surface state of the optical sheet to increase the adhesive strength of each layer constituting the lens. The present invention was accomplished based on this finding.

That is, the present invention is (1) a functional lens having a functional laminate (A) comprising a first optical sheet (Aa), a second optical sheet (Ab) and a functional layer (Ac) existent between these two sheets and having photochromic properties and/or polarizability and a synthetic resin layer (B) existent on at least one of the first optical sheet (Aa) and the second optical sheet (Ab) of the functional laminate (A), wherein the first optical sheet (Aa) and the second optical sheet (Ab) are both made of a resin selected from the group consisting of polyamide resin, polyester resin, cellulose resin, (meth)acrylic resin, polyurethane resin, polyurethane urea resin, polyimide resin, epoxy resin, polyolefin resin and polyvinyl alcohol resin, the synthetic resin layer (B) is made of a resin selected from the group consisting of polyamide resin, polyester resin, allyl resin, (meth)acrylic resin, polyurethane resin, polyurethane urea resin, polythiourethane resin, polythioepoxy resin and polycarbonate resin, and adhesive strength between the first optical sheet (Aa) and/or the second optical sheet (Ab) and the synthetic resin layer (B) is not lower than 50 N.

The present invention can take the following modes.

(2) The functional lens in the above paragraph (1), wherein the first optical sheet (Aa) and/or the second optical sheet (Ab) are/is made of a resin selected from the group consisting of polyamide resin, polyester resin, cellulose resin and polyvinyl alcohol resin, and the synthetic resin layer (B) is made of a resin selected from the group consisting of allyl resin, (meth)acrylic resin, polyurethane resin, polyurethane urea resin, polythiourethane resin and polythioepoxy resin. (3) The functional lens in the above paragraph (1), the first optical sheet (Aa) and the second optical sheet (Ab) are both made of polyvinyl alcohol resin, the functional layer (Ac) is a photochromic adhesive layer (Ac1) containing a photochromic compound and a polyurethane urea resin, and the first optical sheet (Aa) and the second optical sheet (Ab) are directly bonded together by the photochromic adhesive layer (Ac1). (4) The functional lens in the above paragraph (3), wherein at least one of the first optical sheet (Aa) and the second optical sheet (Ab) made of polyvinyl alcohol resin is a sheet having polarizability.

The Patent Documents 13 and 14 disclose a photochromic laminate consisting of polyvinyl alcohol/adhesive layer/photochromic properties layer/adhesive layer/polyvinyl alcohol. However, in this photochromic laminate, the layer exhibiting photochromic properties is not directly bonded to polyvinyl alcohol, and the laminate has a larger number of adhesive layers than that of the present invention. In addition, the Patent Documents 13 and 14 do not teach that a resin layer formed by polymerizing and curing a liquid composition comprising a polymerizable monomer is further laminated.

(5) A functional laminate (A) comprising a first optical sheet (Aa), a second optical sheet (Ab) and a functional layer (Ac) existent between these two sheets and having photochromic properties and/or polarizability, wherein the first optical sheet (Aa) and the second optical sheet (Ab) are both made of a resin selected from the group consisting of polyamide resin, polyester resin, cellulose resin, (meth)acrylic resin, polyurethane resin, polyurethane urea resin, polyimide resin, epoxy resin and polyolefin resin, and a surface modified area having a reactive functional group is existent on the outer surface of at least one of the first optical sheet (Aa) and the second optical sheet (Ab).

(6) The functional laminate in the above paragraph (5), wherein the reactive functional group of the surface modified area is selected from hydroxy group, thiol group, carboxy group, amino group, sulfo group, (thio) isocyanate group, allyl group, (meth)acrylic group, vinyl group, epoxy group, oxetane group, thioepoxy group and silanol group.

(7) The functional laminate in the above paragraph (5) or (6), wherein the surface modified area is an area formed by treating the outer surface of the optical sheet with a coat composition comprising a silane coupling agent having a radically polymerizable group.

(8) The functional laminate in the above paragraph (5) or (6), wherein a contact angle of the surface modified area is 10 to 60°.

(9) The functional laminate in any one of the above paragraphs (5) to (8), wherein the functional layer (Ac) comprises a layer having photochromic properties, and the layer having photochromic properties is a photochromic adhesive layer (Ac1) comprising a photochromic compound and a polyurethane urea resin.

(10) The functional laminate in any one of the above paragraphs (5) to (9), wherein the functional layer (Ac) comprises a polarizing film (Ac2) which is a layer having polarizability, and both surfaces of the polarizing film (Ac2) are bonded to the first optical sheet (Aa) and the second optical sheet (Ab) through an adhesive layer, respectively.

(11) The functional laminate in any one of the above paragraphs (5) to (10), wherein the functional layer (Ac) has a layer having photochromic properties and a layer having polarizability, the layer having photochromic properties is a photochromic adhesive layer (Ac1) comprising a photochromic compound and a polyurethane urea resin, the photochromic adhesive layer (Ac1) is bonded to the first optical sheet (Aa), the layer having polarizability is a polarizing film (Ac2), one surface of the polarizing film (Ac2) is bonded to the photochromic adhesive layer (Ac1), and the other surface of the polarizing film (Ac2) is bonded to the second optical sheet (Ab) through an adhesive layer.

(12) A functional laminate (A) having a first optical sheet (Aa), a second optical sheet (Ab) and a functional layer (Ac) existent between these two sheets and having photochromic properties, wherein
the first optical sheet (Aa) and the second optical sheet (Ab) are both made of polyvinyl alcohol resin, a surface modified area having a reactive functional group selected from hydroxy group, thiol group, carboxy group, amino group, sulfo group, (thio) isocyanate group, allyl group, (meth)acrylic group, vinyl group, epoxy group, oxetane group, thioepoxy group and silanol group is existent on the outer surface of at least one of the first optical sheet (Aa) and the second optical sheet (Ab), the functional layer (Ac) is a photochromic adhesive layer (Ac1) comprising a photochromic compound and a polyurethane urea resin, and the first optical sheet (Aa) and the second optical sheet (Ab) are directly bonded together by the photochromic adhesive layer (Ac1).

(13) The functional laminate in the above paragraph (12), wherein at least one of the first optical sheet (Aa) and the second optical sheet (Ab) has polarizability.

(14) A method of producing the functional lens of the above paragraph (1), comprising the steps of:
embedding the functional laminate (A) of any one of the above paragraphs (5) to (13) in a monomer composition for forming a lens which is polymerized to become a resin selected from the group consisting of allyl, (meth) acryl, polyurethane, polyurethane urea, polythiourethane and polythioepoxy; and
polymerizing the monomer composition for forming a lens to laminate a synthetic resin layer (B) on the functional laminate (A).

Effect of the Invention

In the functional lens of the present invention, the layer having photochromic properties and/or polarizability and the synthetic resin layer formed on the layer are firmly bonded together. Therefore, the functional lens can be used for various purposes. Although the functional lens of the present invention has excellent adhesion with an adhesive strength between the functional laminate (A) and the synthetic resin layer (B) of not lower than 50 N, when the functional laminate (A) is treated with a surface modifier in advance, a functional lens having higher adhesion can be obtained.

Further, a photochromic lens, polarizing lens or polarizing photochromic lens (functional lens) having high adhesion while retaining respective characteristic properties can be obtained by using the functional laminate (A) of the present invention. Therefore, the functional lens of the present invention has excellent photochromic properties and/or polarizabiity and can be used for a long time.

Further, the functional laminate (A) of the present invention is excellent in solvent resistance. Therefore, when a functional lens is produced by embedding (immersing) the functional laminate (A) in a monomer composition for forming a lens which forms the synthetic resin layer (B), it is possible to prevent the optical sheet from dissolving in the monomer composition for forming a lens. As a result, a transparent functional lens which does not become cloudy can be obtained.

BRIEF DESCRIPTION OF THE DRAWINGS

FIG. 1 This is a sectional view showing an example of the layer constitution of the functional laminate of the present invention.

FIG. 2 This is a sectional view showing another example of the layer constitution of the functional laminate of the present invention.

FIG. 3 This is a sectional view showing still another example of the layer constitution of the functional laminate of the present invention.

FIG. 4 This is a sectional view showing an example of the layer constitution of the functional lens of the present invention.

FIG. 5 This is a sectional view showing a further example of the layer constitution of the functional laminate of the present invention.

FIG. 6 This is a sectional view showing another example of the layer constitution of the functional lens of the present invention.

BEST MODE FOR CARRYING OUT THE INVENTION

The functional lens of the present invention comprises a functional laminate (A) which includes a first optical sheet (Aa), a second optical sheet (Ab) and a functional layer (Ac) having photochromic properties and/or polarizability and existent between these two sheets and a synthetic resin layer (B) existent on at least one of the first optical sheet (Aa) and the second optical sheet (Ab) of the functional laminate (A), wherein the first optical sheet (Aa) and the second optical sheet (Ab) are both made of a resin selected from the group consisting of polyamide resin, polyester resin, cellulose resin, (meth)acrylic resin, polyurethane resin, polyurethane urea resin, polyimide resin, epoxy resin, polyolefin resin and polyvinyl alcohol resin, the synthetic resin layer (B) is made of a resin selected from the group consisting of polyamide resin, polyester resin, allyl resin, (meth)acrylic resin, polyurethane resin, polyurethane urea resin, polythiourethane resin, polythioepoxy resin and polycarbonate resin, and adhesive strength between the first optical sheet (Aa) and/or the second optical sheet (Ab) and the synthetic resin layer (B) is not lower than 50 N.

When the functional lens is formed, the functional laminate (A) includes the first optical sheet (Aa), the second optical sheet (Ab) and the functional layer (Ac) existent between these two sheets and having photochromic properties and/or polarizability, the first optical sheet (Aa) and the second optical sheet (Ab) are both made of a resin selected from the group consisting of polyamide resin, polyester resin, cellulose resin, (meth)acrylic resin, polyurethane resin, polyurethane urea resin, polyimide resin, epoxy resin, polyolefin resin and polyvinyl alcohol resin, and the outer surface of at least one of the first optical sheet (Aa) and the second optical sheet (Ab) has a surface modified area having a reactive functional group. When the functional laminate has this constitution, the lens always has the synthetic resin layer (B) which is existent on at least one of the first optical sheet (Aa) and the second optical sheet (Ab).

A description is subsequently given of these elements one by one.

(Functional Lens)

Since the functional lens of the present invention has high adhesive force with an adhesive strength between the functional laminate (A) which will be described hereinafter and the synthetic resin layer (B) which will be described hereinafter of not lower than 50 N, it can be used for various purposes.

In the present invention, adhesive strength is obtained by measuring adhesion between the functional laminate (A) and the synthetic resin layer (B) in a horizontal direction (direction perpendicular to a lamination direction) and not peel strength when the functional laminate (A) and the synthetic resin layer (B) are peeled off from each other in a vertical direction (lamination direction). Stated more specifically, adhesive strength between the functional laminate (A) and the synthetic resin layer (B) is a value measured by the following method. A strip-like test piece having a width of 20 mm and a length of 30 mm is first cut out in a direction orthogonal (vertical) to the lamination direction. A SUS metal sheet (thickness of 0.4 mm, width of 20 mm) having the same length (20 mm) as that of the test piece is pressed against only the exposed face of one of the functional laminate (A) and the synthetic resin layer (B) in such a manner that it becomes parallel to the boundary line of the functional laminate (A) and the boundary line of the synthetic resin layer (B) exposed to the 20 mm-wide cut-out face (side face) of this test piece. Then, adhesive strength is measured by carrying out a compression test at a cross head speed of 10 mm/min and a temperature of 25° C. using the AGS-500NX autograph (manufactured by Shimadzu Corporation).

Therefore, the functional lens of the present invention is firmly bonded even when stress is applied to the lens from a horizontal direction. The adhesive strength of the functional lens is preferably not lower than 60 N, more preferably not lower than 70 N, much more preferably not lower than 80 N, particularly preferably not lower than 100 N to make it more effective. Although the upper limit of adhesive strength is not particularly limited, when industrial production is taken into consideration, adhesive strength is 300 N. When adhesive strength is higher than 300 N, in general, the functional laminate (A) or the synthetic resin layer (B) itself is first broken and therefore measurement is difficult.

Although the method of producing the functional lens of the present invention is not particularly limited, a functional laminate in which the outer surface of at least one of the first optical sheet (Aa) and the second optical sheet (Ab) arranged as the outer layer of the functional laminate (A) has a surface modified area having a reactive functional group is preferably used. The functional lens can be easily produced by laminating the synthetic resin layer (B) on the outer surface having this surface modified area.

A description is subsequently given of the functional laminate (A).

(Functional Laminate (A))

The functional laminate (A) has a functional layer (Ac) between the first optical sheet (Aa) and the second optical sheet (Ab).

A description is subsequently given of the first optical sheet (Aa) and the second optical sheet (Ab) constituting the functional laminate (A).

(First Optical Sheet (Aa) and Second Optical Sheet (Ab))
<Explanation of Raw Material Resin>

As the first optical sheet (Aa) and the second optical sheet (Ab) used in the present invention, a sheet having light transmission is used. As the raw material, a resin selected from polyamide resin, polyester resin, cellulose resin, (meth)acrylic resin, polyurethane resin, polyurethane urea resin, polyimide resin, epoxy resin, polyolefin resin and polyvinyl alcohol resin is used. Out of these, polyamide resin, polyester resin and cellulose resin are preferred and polyamide resin is more preferred when the versatility and function of the obtained functional lens are taken into consideration. Especially when the materials of the first optical sheet (Aa) and the second optical sheet (Ab) differ from the material of the synthetic resin layer (B), a functional laminate (A) treated with a surface modifier which will be described in detail hereinunder in advance may be advantageously used.

When the first optical sheet (Aa) and the second optical sheet (Ab) are sheets made of polyvinyl alcohol resin, the following advantages are obtained. In this case, the first optical sheet (Aa) and the second optical sheet (Ab) have a surface modified area having a hydroxy group as a reactive functional group on the surface without any treatment. As a result, the production processes of the functional laminate (A) and the functional lens can be simplified. Further, by using polyvinyl alcohol resin sheets, polarizability can be provided to the sheets. As a result, the number of layers of each of the functional laminate (A) and the functional lens can be reduced.

<First Optical Sheet (Aa) and Second Optical Sheet (Ab); (Polyamide Resin)>

Commercially available resins may be used as the polyamide resin, and commercially available products may also be used as the first optical sheet (Aa) and the second optical sheet (Ab) made of polyamide resin.

As the polyamide resin, polyamide resins obtained by carrying out the polycondensation reaction of ω-aminocarboxylic acid such as ε-caprolactam, lactam 10-aminodecanoate or ω-laurine lactam, polyamide resins obtained by carrying out the copolycondensation reaction of a diamine and a dicarboxylic acid, and copolymers thereof may be preferably used.

As the diamine used in the above polyamide resins obtained by the copolycondensation reaction, aliphatic diamines having 4 to 14 carbon atoms such as tetramethylene diamine, hexamethylene diamine, 1,9-nonanediamine, 1,12-dodecanediamine and methyl pentadiamine; diaminocycloalkanes (having 5 to 10 carbon atoms) such as diaminocyclohexane; alicyclic diamines which may have a substituent such as alkyl group (alkyl group having 1 to 6 carbon atoms, preferably alkyl group having 1 to 4 carbon atoms, more preferably alkyl group having 1 to 2 carbon atoms), such as bisaminocycloalkyl (having 5 to 10 carbon atoms) alkanes (having 1 to 6 carbon atoms) including bis(4-aminocyclohexyl) methane, bis(4-amino-3-methylcyclohexyl) methane and 2,2-bis(4'-aminocyclohexyl) propane; and aromatic diamines such as p-phenylenediamine and m-phenylenediamine may be preferably used.

As the dicarboxylic acid used in the polyamide resins obtained by the copolycondensation reaction, aliphatic dicarboxylic acids having 4 to 18 carbon atoms such as adipic acid, sebacic acid and dodecanedioic acid; alicyclic dicarboxylic acids having 5 to 10 carbon atoms such as cyclohexane-1,4-dicarboxylic acid and cyclohexane-1,3-dicarboxylic acid; and aromatic dicarboxylic acids such as terephthalic acid and isophthalic acid may be preferably used.

Out of these, polyamide resins obtained by the copolycondensation reaction are preferably used for the first optical sheet (Aa) and the second optical sheet (Ab) used in the present invention from the viewpoints of mechanical strength, solvent resistance (chemical resistance) and transparency. Further, alicyclic polyamide resins or semi-aromatic polyamide resins are more preferably used. The alicyclic polyamide resins are each a homo- or co-polyamide containing at least one selected from alicyclic diamines and alicyclic dicarboxylic acids as a constituent component. It may also be a copolyamide containing an aromatic polyamide resin. The semi-aromatic polyamide resins are each a polyamide resin containing an aromatic compound as one of the dicarboxylic acid and the diamine and an aliphatic compound as the other.

<Preferred Alicyclic Polyamide Resin>

Preferred examples of the alicyclic polyamide resin include resins (homo- or co-polyamides) containing an alicyclic diamine [such as bis(aminocycloalkyl) (having 5 to 10 carbon atoms)] alkane (having 1 to 6 carbon atoms), preferably bisaminocycloalkyl (having 6 to 8 carbon atoms) alkane (having 1 to 6 carbon atoms), more preferably bisaminocyclohexylalkane (having 1 to 3 carbon atoms) and an aliphatic dicarboxylic acid (such as alkanedicarboxylic acid having 4 to 18 carbon atoms, preferably alkanedicarboxylic acid having 6 to 16 carbon atoms, more preferably alkanedicarboxylic acid having 8 to 14 carbon atoms) as constituent components. A typical example of the alicyclic polyamide resin is an alicyclic polyamide represented by the following formula (1).

[formula 1]

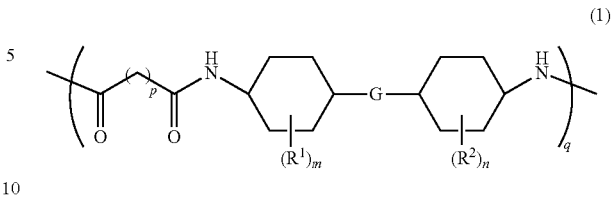

(In the above formula, "G" is a direct bond, alkylene group or alkenylene group, $R^1$ and $R^2$ are the same or different alkyl groups, "m" and "n" are each 0 or an integer of 1 to 4, and "p" and "q" are each an integer of 1 or more.)

In the above formula (1), the alkylene group (containing alkylidene group) represented by "G" is an alkylene group (or alkylidene group) having 1 to 6 carbon atoms such as methylene, ethylene, ethylidene, propylene, propane-1,3-diyl, 2-propylidene or butylene, preferably alkylene group (or alkylidene group) having 1 to 4 carbon atoms, more preferably alkylene group (or alkylidene group) having 1 to 3 carbon atoms. The alkenylene group represented by "G" is an alkenylene group having 2 to 6 carbon atoms such as vinylene or propenylene, preferably alkenylene group having 2 to 4 carbon atoms.

The alkyl group represented by $R^1$ and $R^2$ in the above formula (1) is preferably an alkyl group having 1 to 6 carbon atoms such as methyl group, ethyl group, propyl group, isopropyl group, butyl group or isobutyl group, preferably alkyl group having 1 to 4 carbon atoms, more preferably methyl group or ethyl group having 1 to 2 carbon atoms.

"m" and "n" in the above formula (1) are each selected from 0 and an integer of 1 to 4. They are generally 0 or an integer of 1 to 3, preferably 0 or an integer of 1 to 2, more preferably 0 or 1. The substitution positions of the substituents $R^1$ and $R^2$ may be selected from 2-position, 3-position, 5-position and 6-position, preferably 2-position and 6-position, with respect to the amide group.

In the above formula (1), "p" is preferably 4 or more, more preferably 6 to 20, most preferably 8 to 15.

In the above formula (1), "q" (polymerization degree) is preferably 5 or more, more preferably 10 to 800, most preferably 50 to 500.

As the above alicyclic polyamide resin, commercially available products may be used. Examples thereof include TROGAMID (registered trademark) manufactured by Daicel Evonik Ltd. and Grilamid (registered trademark) and Grilamid TR (registered trademark) manufactured by EMS-GRIVORY Ltd. The alicyclic polyamide resins may be used alone or in combination of two or more. Therefore, the polyamide resin first optical sheet (Aa) and second optical sheet (Ab) may be made of only one alicyclic polyamide resin or two or more alicyclic polyamide resins.

The number average molecular weight of the alicyclic polyamide resin is, for example, 6,000 to 300,000, preferably 10,000 to 200,000, more preferably 15,000 to 100,000.

The alicyclic polyamide resin may have a thermal melting temperature or melting point, and the thermal melting temperature is, for example, 100 to 300° C., preferably 110 to 280° C., more preferably 130 to 260° C. The thermal melting temperature of an alicyclic polyamide resin having crystallinity, especially microcrystallinity is, for example, 150 to 300° C., preferably 180 to 280° ° C., more preferably 210 to 260° C. The thermal melting temperatures of the first optical sheet (Aa) and the second optical sheet (Ab) made of alicyclic polyamide resin preferably satisfy the above range though they become a little high when the sheets are oriented.

The alicyclic polyamide resin has a Vicat softening point of 100 to 200° C., preferably 110 to 170° ° C., more preferably 130 to 150° C. This Vicat softening point is a value obtained by measuring the first optical sheet (Aa) and the second optical sheet (Ab) made of alicyclic polyamide resin.

The alicyclic polyamide resin may have a glass transition point of 100 to 200° C., preferably 110 to 170° C., more preferably 125 to 150° C. The thermal melting temperatures of the first optical sheet (Aa) and the second optical sheet (Ab) made of alicyclic polyamide resin preferably satisfy the above range though they become a little high when the sheets are oriented.

<Preferred Semi-Aromatic Polyamide Resin>

As the preferred semi-aromatic polyamide, a semi-aromatic polyamide represented by the following formula (2) is used.

[formula 2]

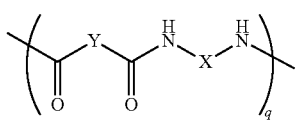

(2)

(In the above formula, one of "X" and "Y" is a divalent aromatic substituent and the other is a divalent aliphatic substituent, and "q" is an integer of 1 or more.)

In the above formula (2), one of "X" and "Y" is a divalent aromatic substituent and preferably represented by the following formula (3).

[formula 3]

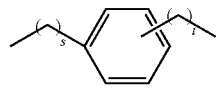

(3)

(In the above formula, "s" and "t" are each 0 or an integer of 2 or less.)

In the above formula (2), the aliphatic substituent represented by "X" and "Y" is an alkylene group or alkenylene group such as alkylene group having 1 to 20 carbon atoms, preferably alkylene group having 4 to 10 carbon atoms, or alkenylene group having 2 to 6 carbon atoms, preferably alkenylene group having 2 to 4 carbon atoms.

In the above formula (2), "q" (polymerization degree) is as defined in the above formula (1) and preferably 5 or more, more preferably 10 to 800, most preferably 50 to 500.

As a more preferred semi-aromatic polyamide, semi-aromatic polyamides represented by the following formulas (4) to (6) are used. Copolymers of the semi-aromatic polyamides represented by the following formulas (4) to (6) may also be used.

[formula 4]

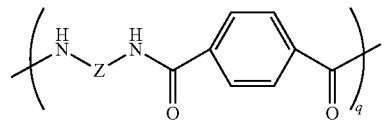

(4)

(In the above formula, "z" is a direct bond, alkylene group or alkenylene group, and "q" is an integer of 1 or more.)

In the above formula (4), examples of the alkylene group represented by "Z" include alkylene groups having 1 to 20 carbon atoms which may have a substituent such as methylene, ethylene, propylene and butylene, more preferably alkylene groups having 4 to 10 carbon atoms. Examples of the alkenylene group represented by "Z" include alkenylene groups having 2 to 6 carbon atoms such as vinylene and propenylene, preferably alkenylene groups having 2 to 4 carbon atoms.

In the above formula (4), "q" (polymerization degree) is as defined in the above formula (1) and preferably 5 or more, more preferably 10 to 800, most preferably 50 to 500.

[formula 5]

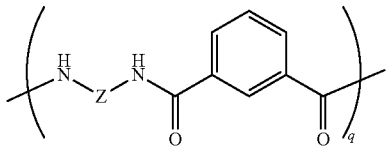

(5)

(In the above formula, "Z" is a direct bond, alkylene group or alkenylene group, and "q" is an integer of 1 or more.)

In the above formula (5), examples of the alkylene group represented by "Z" include alkylene groups having 1 to 20 carbon atoms which may have a substituent such as methylene, ethylene, propylene and butylene, more preferably alkylene groups having 4 to 10 carbon atoms. Examples of the alkenylene group represented by "Z" include alkenylene groups having 2 to 6 carbon atoms such as vinylene and propenylene, preferably alkenylene groups having 2 to 4 carbon atoms.

In the above formula (5), "q" (polymerization degree) is as defined in the above formula (1) and preferably 5 or more, more preferably 10 to 800, most preferably 50 to 500.

[formula 6]

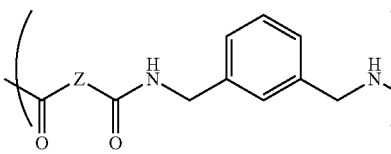

(6)

(In the above formula, "Z" is a direct bond, alkylene group or alkenylene group, and "q" is an integer of 1 or more.)

In the above formula (6), examples of the alkylene group represented by "Z" include alkylene groups having 1 to 20 carbon atoms which may have a substituent such as methylene, ethylene, propylene and butylene, preferably alkylene groups having 4 to 10 carbon atoms. Examples of the alkenylene group represented by "Z" include alkenylene groups having 2 to 6 carbon atoms such as vinylene and propenylene, preferably alkenylene groups having 2 to 4 carbon atoms.

In the above formula (6), "q" (polymerization degree) is as defined in the above formula (1) and preferably 5 or more, more preferably 10 to 800, most preferably 50 to 500.

The semi-aromatic polyamide resin has a glass transition point of 100 to 170° C., preferably 105 to 150° C. The glass transition points of the first optical sheet (Aa) and the second optical sheet (Ab) made of semi-aromatic polyamide resin preferably satisfy the above range though they become a little high when the sheets are oriented.

The polyamide sheet used in the present invention preferably contains the above alicyclic polyamide resin or semi-aromatic polyamide resin as the main component but may contain other resins as long as the effect of the present invention is obtained. Examples of the other resin include known aliphatic polyamide resins and aromatic polyamide resins.

<Characteristic Part of First Optical Sheet (Aa) and Second Optical Sheet (Ab) Made of Polyamide Resin>

The first optical sheet (Aa) and the second optical sheet (Ab) made of alicyclic polyamide resin (may be simply referred to as "alicyclic polyamide sheet" hereinafter) have a large Abbe number. Therefore, by using the alicyclic polyamide sheet, the occurrence of an irregular color such as rainbow color can be suppressed efficiently in the obtained functional laminate (A) as compared with a case where a polycarbonate (Abbe number of 34) is used. The Abbe number of the alicyclic polyamide sheet used in the present invention is preferably 40 to 65, more preferably 50 to 60.

When the alicyclic polyamide sheet is used in combination with a polarizing sheet which will be described hereinafter to produce the functional laminate (A), as the aliphatic polyamide resin has a larger Abbe number than a polycarbonate resin as described above, an irregular color such as rainbow color is rarely produced or the production of an irregular color such as rainbow color can be suppressed or prevented at a high level without increasing the retardation value. However, when a laminate obtained by combining an aliphatic polyamide sheet and a polarizing sheet is bent or formed into a curved shape, the degree of polarization may drop. Therefore, an alicyclic polyamide sheet having a retardation value of 100 nm or more obtained by monoaxial stretching is preferably used as the alicyclic polyamide sheet used in the present invention. By using the alicyclic polyamide sheet having this retardation value, the reduction of the degree of polarization at the time of bending can also be suppressed in a laminate obtained by combining a polarizing sheet. In the present invention, when the alicyclic polyamide sheet is combined with the polarizing sheet, the retardation value of the alicyclic polyamide sheet is preferably 100 to 10,000 nm, more preferably 500 to 6,000 nm, much more preferably 1,000 to 5,000 nm.

When the above monoaxially stretched alicyclic polyamide sheet is used, it may be formed on at least one side of the obtained laminate. On the other side (may be the rear side) of the laminate, the above monoaxially stretched alicyclic polyamide sheet or an unstretched alicyclic polyamide sheet may be used.

<First Optical Sheet (Aa) and Second Optical Sheet (Ab); (Polyester Resin)>

Commercially available resins may be used as the polyester resin, and commercially available products may also be used as the first optical sheet (Aa) and the second optical sheet (Ab) made of polyester resin.

Examples of the polyester resin include polycondensates of a dicarboxylic acid such as terephthalic acid or isophthalic acid and a diol such as ethylene glycol, butylene glycol or 1,4-cyclohexane dimethanol. Out of these, polyethylene terephthalate, polybutylene terephthalate and copolymers thereof may be preferably used.

<First Optical Sheet (Aa) and Second Optical Sheet (Ab); (Cellulose Resin)>

Commercially available resins may be used as the cellulose resin, and commercially available products may also be used as the first optical sheet (Aa) and the second optical sheet (Ab) made of cellulose resin.

As the cellulose resin, acetyl celluloses such as triacetyl cellulose and diacetyl cellulose and propyl celluloses such as tripropyl cellulose and dipropyl cellulose may be preferably used.

<First Optical Sheet (Aa) and Second Optical Sheet (Ab); ((Meth)Acrylic Resin)>

Commercially available resins may be used as the (meth) acrylic resin, and commercially available products may also be used as the first optical sheet (Aa) and the second optical sheet (Ab) made of (meth)acrylic resin.

As the (meth)acrylic resin, resins composed of homopolymers such as methyl methacrylate and copolymers of (meth)acrylic monomers may be preferably used.

<First Optical Sheet (Aa) and Second Optical Sheet (Ab); (Polyurethane Resin and Polyurethane Urea Resin)>

Commercially available resins may be used as the polyurethane resin and polyurethane urea resin, and commercially available products may also be used as the first optical sheet (Aa) and the second optical sheet (Ab) made of polyurethane resin and polyurethane urea resin.

The polyurethane resin or the polyurethane urea resin is a resin having a urethane bond or/and a urea bond in the molecule. Stated more specifically, known polyurethane resins and polyurethane urea resins obtained by reacting a diisocyanate compound such as isophorone diisocyanate with a polyol compound such as polycarbonate polyol or polyester polyol are used. Further, polyurethane resins or polyurethane urea resins obtained by reacting a chain extender such as low-molecular weight diol, triol, diamine or triamine may be preferably used.

<First Optical Sheet (Aa) and Second Optical Sheet (Ab); (Polyimide Resin)>

Commercially available resins may be used as the polyimide resin, and commercially available products may also be used as the first optical sheet (Aa) and the second optical sheet (Ab) made of polyimide resin.

As the polyimide resin, polymers of an aromatic tetracarboxylic acid and an aromatic diamine may be preferably used. Examples of the aromatic tetracarboxylic acid include pyromellitic acid, 3,3',4,4'-biphenyl tetracarboxylic acid, 2,3',3,4'-biphenyl tetracarboxylic acid, 3,3',4,4'-benzophenone tetracarboxylic acid, 2,3,6,7-naphthalene tetracarboxylic acid, 2,2-bis(3,4-dicarboxyphenyl) propane, pyridine-2,3,5,6-tetracarboxylic acid, acid anhydrides or acid dianhydrides thereof, and aromatic tetracarboxylic acids derived from ester compounds or halides of these acids. Examples of the aromatic diamine include paraphenylenediamine, metaphenylenediamine, benzidine, paraxylylenediamine, 4,4'-diaminodiphenyl ether, 3,4'-diaminodiphenyl ether, 4,4'-diaminodiphenyl methane, 4,4'-diaminodiphenyl sulfone, 3,3'-dimethyl-4,4'-diaminodiphenyl methane, 1,5-diaminonaphthalene, 3,3'-dimethoxybenzidine, 1,4-bis(3-methyl-5-aminophenyl)benzene and derivatives thereof.

<First Optical Sheet (Aa) and Second Optical Sheet (Ab); (Epoxy Resin)>

Commercially available resins may be used as the epoxy resin, and commercially available products may also be used as the first optical sheet (Aa) and the second optical sheet (Ab) made of epoxy resin.

As the epoxy resin, resins obtained by carrying out a condensation reaction between bisphenol A or bisphenol F and epichlorohydrin, other functional epoxy resins and biphenyl type epoxy resins may be preferably used.

<First Optical Sheet (Aa) and Second Optical Sheet (Ab); (Polyolefin Resin)>

Commercially available resins may be used as the polyolefin resin, and commercially available products may also be used as the first optical sheet (Aa) and the second optical sheet (Ab) made of polyolefin resin.

As the polyolefin resin, polypropylene, polyethylene, ethylene-propylene copolymer, ethylene-α-olefin copolymer and propylene-α-olefin copolymer may be preferably used.

<First Optical Sheet (Aa) and Second Optical Sheet (Ab); (Polyvinyl Alcohol Resin)>

When the first optical sheet (Aa) and the second optical sheet (Ab) made of polyvinyl alcohol resin are used, it is preferred that the functional layer (Ac) should include a layer having photochromic properties. It is preferred that this functional layer (Ac) having photochromic properties should be a photochromic adhesive layer (Ac1) containing a photochromic compound and a polyurethane urea resin. It is also preferred that the first optical sheet (Aa) and the second optical sheet (Ab) should be directly bonded together by the photochromic adhesive layer (Ac1). Further, it is preferred that one of the first optical sheet (Aa) and the second optical sheet (Ab) should be a sheet having polarizability.

Thus, by using the first optical sheet (Aa) and the second optical sheet (Ab) made of polyvinyl alcohol resin, the number of layers of the functional laminate and the functional lens can be reduced. As a result, the productivity of each of them can be increased.

As the optical sheet made of polyvinyl alcohol resin used in the present invention, a sheet made of the following resin is used. The polyvinyl alcohol resin is obtained by saponifying a polyvinyl acetate-based resin. The degree of saponification is generally not less than 85 mol %, preferably not less than 90 mol %, more preferably not less than 99 mol %. Examples of the polyvinyl acetate-based resin include polyvinyl acetate which is a homopolymer of vinyl acetate and copolymers of vinyl acetate and another monomer copolymerizable with vinyl acetate. Examples of the other monomer copolymerizable with vinyl acetate include unsaturated carboxylic acids, olefins, unsaturated sulfonic acids and vinyl ethers.

In the present invention, the average polymerization degree of the polyvinyl alcohol resin is preferably 100 to 10,000, more preferably 1,500 to 8,000, much more preferably 2,000 to 5,000. The average polymerization degree of the polyvinyl alcohol (PVA) resin can be obtained in accordance with JIS K 6726 (1994).

The above polyvinyl alcohol resin may be at least partially modified and may contain polyvinyl formal, polyvinyl acetal or polyvinyl butyral modified with an aldehyde. Out of these, a pair of films made of polyvinyl alcohol are preferably used.

In the present invention, the first optical sheet (Aa) and the second optical sheet (Ab) made of polyvinyl alcohol resin and having a thickness of 10 to 100 μm may be preferably used.

In the present invention, the sheet made of polyvinyl alcohol resin may be unstretched, monoaxially stretched or biaxially stretched. The stretching direction is the machine direction (MD), direction orthogonal to this (TD) or direction oblique to the machine direction of the unstretched film. The unstretched sheet is a sheet which is not stretched, and the monoaxially stretched sheet is a sheet obtained by stretching an unstretched sheet in any one of the above directions. The biaxially stretched sheet is a sheet obtained by stretching in two directions out of the above directions and may be a simultaneously biaxially stretched sheet which has been stretched in two directions at the same time or a sequentially biaxially stretched sheet which has been stretched in a predetermined direction and then another direction. The biaxially stretched sheet is preferably a sheet which has been stretched in MD and TD.

Out of these sheets, a monoaxially stretched sheet obtained by stretching an unstretched film in a machine direction (MD) is preferably used when a sheet made of polyvinyl alcohol resin and having polarizability is used.

In the present invention, when a monoaxially stretched or biaxially stretched sheet is used as the sheet made of polyvinyl alcohol resin, the stretch ratio is preferably 2 to 8. Especially when a sheet made of polyvinyl alcohol resin and having polarizability is used, it is a sheet which has been monoaxially stretched in MD (monoaxially stretched sheet) at a stretch ratio of preferably 3 to 7, more preferably 4 to 6. When the sheet is monoaxially stretched, the sheet made of polyvinyl alcohol resin may be stretched one time or a plurality of times. When the sheet is stretched a plurality of times, the total stretch ratio obtained by multiplying the stretch ratios should fall within the above range. In the present invention, the stretch ratio is based on the length of the sheet made of polyvinyl alcohol resin before stretching, and the stretch ratio of the sheet which is not stretched is 1.

In the present invention, it is preferred that the sheet made of polyvinyl alcohol-based resin should be obtained by crosslinking the polyvinyl alcohol resin with a crosslinking agent such as boric acid, organic titanium-based compound, organic zirconium-based compound, glyoxal or glutaraldehyde whether it is unstretched, monoaxially stretched or biaxially stretched. It is more preferred that the resin should be crosslinked with boric acid.

In the present invention, chemical resistance can be improved by crosslinking the sheet made of polyvinyl alcohol-based resin with boric acid. The boric acid content of the sheet is preferably 1.0 to 20.0 mass %. This boric acid content can be obtained by dissolving the film in a nitric acid aqueous solution and then converting a boric acid content obtained by inductively coupled plasma (IPC) emission spectrometry. As will be described in detail hereinunder, the crosslinking of the polyvinyl alcohol resin with boric acid is carried out by bringing the sheet made of polyvinyl alcohol resin into contact with the boric acid aqueous solution. Therefore, the boric acid content is obtained from the crosslinked sheet. To contain a desired amount of boric acid, relationships between production conditions (thickness of the sheet, contact temperature, contact time, contact speed, concentration of the boric acid aqueous solution and cleaning conditions) and the boric acid content should be obtained in advance, and the sheet should be produced based on these relationships.

In the present invention, when the boric acid content of the sheet is lower than 1.0 mass %, the effect of improving chemical resistance and humidity resistance may become small. When the boric acid content of the sheet is higher than 20.0 mass %, the mechanical strength of the sheet may become low and the dimensional change at a high temperature may become large. Therefore, the boric acid content of the sheet is more preferably 3.0 to 18.0 mass %, much more preferably 5.0 to 15.0 mass %.

In the present invention, additives such as plasticizer and surfactant may be added to the sheet made of polyvinyl alcohol resin. Examples of the plasticizer include polyols and condensates thereof such as glycerin, diglycerin, triglycerin, ethylene glycol, propylene glycol and polyethylene glycol. Although the amount of the plasticizer is not particularly limited, it is preferably not more than 20 mass % in the film.

In the present invention, to provide polarizability to the sheet made of polyvinyl alcohol-based resin, a known dichroic substance may be used without restriction. As the dichroic substance, iodine or a dichroic dye may be used. Commercially available dichroic dyes may be used as the dichroic dye without restriction and include azo-based and anthraquinone-based dyes. Examples thereof include Chlorantine Fast Red (C.I. 28160), Congo Red (C.I. 22120), Brilliant Blue B (C.I. 24410), Benzopurpurine (C.I. 23500), Chlorazol Black BH (C.I. 22590), Direct Blue 2B (C.I. 22610), Diamine Green (C.I. 30295), Chrysophenine (C.I. 24895), Sirius Yellow (C.I. 29000), Direct Fast Red (C.I. 23630), Acid Black (C.I. 20470), Direct Sky Blue (C.I. 24400), Solophenyl Blue 4GL (C.I. 34200), Direct Copper Blue 2B (C.I. 24185) and Nippon Brilliant Violet BKconc (C.I. 27885). Two or more coloring matters may be selected from these dichroic dyes and used according to purpose. The figures within parentheses are Color Index Nos.

In the present invention, when polarizability is to be provided to the sheet made of polyvinyl alcohol resin, the physical properties thereof are not particularly limited but the sheet preferably has a luminous transmittance of 10 to 80% and a polarization degree of 30.0 to 99.9%.

In the present invention, the two sheets made of polyvinyl alcohol resin may be the same or different. The first optical sheet (Aa) and the second optical sheet (Ab) may be the same or different in the material to be formed, the degree of crosslinking, characteristic properties and thickness. They may be suitably determined according to use purpose.

Further, in the present invention, the sheet made of polyvinyl alcohol resin in use preferably has a moisture content of not more than 15 mass % before it is directly bonded to the "adhesive layer containing a photochromic compound (Ac1)" which will be described in detail hereinunder. Especially when the moisture content of the sheet is set to the above range and the photochromic adhesive layer (Ac1) which will be described in detail hereinunder is made of a photochromic adhesive composition comprising (I) a photochromic compound, (II) a terminal nonreactive urethane urea resin and (III) a polyisocyanate compound having at least two isocyanate groups in the molecule, the sheet may be preferably used. Especially when a photochromic adhesive composition comprising the polyisocyanate compound (III) is used, variations in adhesive strength at each position of the obtained photochromic laminate can be reduced. Further, variations in adhesive strength in each lot of the photochromic laminates can also be reduced. To enhance this effect, the moisture content of the sheet made of polyvinyl alcohol resin before bonding is preferably not more than 10 masse, more preferably not more than 6 mass %. As the lower limit value of the moisture content becomes smaller, more stable production is performed advantageously. When the industrial production of the sheet itself is taken into consideration, the moisture content is about 2 mass %. This moisture content is a value measured by a method which will be described in detail in Examples below and obtained from comparison with a film having no mass change by drying.

A description is subsequently given of a typical method of producing the sheet made of polyvinyl alcohol resin used in the present invention.

(Method of Producing Sheet Made of Polyvinyl Alcohol Resin)

In the present invention, although the sheet made of polyvinyl alcohol resin is not particularly limited, it can be produced as follows. For example, a commercially available unstretched sheet made of polyvinyl alcohol resin (may also be referred to as "raw sheet" hereinafter) may be used as it is, or a sheet treated by the following method may also be used.

In the present invention, as the sheet made of polyvinyl alcohol resin, a sheet of interest can be produced by subjecting the raw sheet to a treatment selected from 1) swelling, 2) dyeing, 3) crosslinking, 4) stretching, 5) cleaning and 6) drying, as required.

By carrying out swelling 1), dirt, a blocking inhibitor and a plasticizer on the surface of the raw sheet can be washed away. By swelling the raw sheet, the effect of suppressing uneven dyeing at the time of dyeing 2) is obtained. Swelling 1) can be carried out by immersing the raw sheet in a treating liquid containing water selected from tap water, distilled water, ion exchange water and pure water as the main component. The treating temperature of swelling 1) is preferably 10 to 45° C., and the immersion time is 10 to 300 seconds. Swelling 1) may be carried out simultaneously with stretching. In this case, the raw sheet is stretched preferably 1.2 to 4 times, more preferably 1.6 to 3 times the original length of the raw sheet.

Dyeing 2) is carried out by immersing the raw sheet subjected to swelling 1) in a dye aqueous solution containing the above dichroic substance dissolved therein. When iodine is used as the dichroic substance, an iodide such as potassium iodide, lithium iodide, sodium iodide, zinc iodide, aluminum iodide, lead iodize, copper iodide, barium iodide, calcium iodide, tin iodide or titanium iodide may be use as a dissolution aid. The treating temperature of dyeing 2) is preferably adjusted to 20 to 50° C., and the immersion time is preferably adjusted to 10 to 300 seconds.

Crosslinking 3) is carried out by immersing the raw sheet subjected to only 1) or 1) and 2) in an aqueous solution containing the above crosslinking agent dissolved therein. Crosslinking 3) may be carried out simultaneously with stretching 4). Crosslinking 3) may be carried out a plurality of times. The treating temperature of crosslinking 3) is preferably 30 to 80° C., more preferably 35 to 60° C. The treating time is 10 to 500 seconds.

Stretching 4) is generally monoaxial stretching. This stretching may be carried out simultaneously with swelling, dyeing or/and crosslinking. As the stretching method, wet stretching and dry stretching may be employed but wet stretching is preferred. To stretch the raw sheet by the wet stretching method, after swelling and/or dyeing, stretching is generally carried out in a solution simultaneously with crosslinking. Stretching may also be carried out in multiple stages. The treating temperature in the wet stretching method is preferably 30 to 80° C., more preferably 35 to 60° C. The treating time is 10 to 500 seconds.

The stretch ratio may be suitably set according to purpose but preferably 2 to 8, more preferably 3 to 7, most preferably 4 to 6 as described above. The stretch ratio is based on the length of the sheet made of polyvinyl alcohol resin before stretching. When stretching is carried out in a step other than the stretching step, the stretch ratio is the total of stretch ratios in these steps.

Cleaning 5) may be carried out by immersing in a cleaning liquid containing water selected from tap water, distilled water, ion exchange water and pure water as the main component. Additives such as the above crosslinking agent, the above plasticizer and a surfactant may be added to the cleaning liquid as required before use. The treating temperature of cleaning is preferably 5 to 50° C., and the treating time is preferably 5 to 240 seconds.

For drying 6), the drying time and the drying temperature may be suitably set according to the required moisture content of the obtained sheet. The drying temperature is preferably 20 to 150° C., and the drying time is preferably 10 to 600 seconds. After drying, it is preferred to keep the sheet under a dry condition (a dry inert gas atmosphere (moisture content is reduced as much as possible)) so as to prevent moisture from adsorbing to the sheet. It is more preferred to carry out the following heating right before use so as to produce a stable photochromic laminate. Stated more specifically, the sheet to be directly bonded to the photochromic adhesive layer (Ac1) right before use is preferably heated at 40 to 110° C. for 5 to 1,800 seconds. In this drying and heating, the moisture content of the sheet right before use can be adjusted to 2 to 15 mass %.

To simply crosslink the sheet made of polyvinyl alcohol resin used in the present invention, 1), 3), 5) and 6) should be carried out, to stretch the sheet, 1), 4), 5) and 6) should be carried out, and to crosslink the sheet while stretching, 1), 3), 4), 5) and 6) should be carried out. To produce a sheet having polarizability, all the steps 1) to 6) should be carried out. These steps may be combined without restriction and may be suitably combined according to purpose, and a step other than the above steps may be combined as required.

The outer surfaces of the first optical sheet (Aa) and the second optical sheet (Ab) made of polyvinyl alcohol resin become a surface active area having a hydroxyl group (reactive functional group) without carrying out a special operation. In the present invention, the outer surfaces may be coated with a coat composition comprising a silane coupling agent which will be described in detail hereunder to make the reactive functional group of the surface modified area a group other than a hydroxyl group.

<Characteristic Properties, Surface Modified Area, Etc. Of First Optical Sheet (Aa) and Second Optical Sheet (Ab)>

The first optical sheet (Aa) and the second optical sheet (Ab) may be each an unstretched sheet, monoaxially stretched sheet or biaxially stretched sheet. Further, they may be a combination of these sheets. The first optical sheet (Aa) and the second optical sheet (Ab) may be made of the same type of a resin or different types of resins. In general, sheets made of the same type of a resin are preferably used.

In the present invention, the first optical sheet (Aa) and the second optical sheet (Ab) may contain various additives such as stabilizer (heat stabilizer, ultraviolet absorbent, antioxidant, etc.), plasticizer, lubricant, filler, coloring agent, flame retardant and antioxidant. When the photochromic compound is used in the adhesive composition, a sheet which does not contain an additive for absorbing ultraviolet light such as ultraviolet absorbent is preferably used on the surface side (outer surface exposed to sunlight when the laminate is used in sunglasses) not to prevent the color development of the photochromic compound.

In the present invention, the preferred thickness of each of the first optical sheet (Aa) and the second optical sheet (Ab) is preferably 30 to 1,000 µm, more preferably 50 to 600 µm, much more preferably 100 to 300 µm. The first optical sheet (Aa) and the second optical sheet (Ab) which differ in thickness may be used in combination.

In the present invention, the first optical sheet (Aa) and the second optical sheet (Ab) may be monoaxially or biaxially stretched sheets. The stretch ratio when they are stretched is preferably 1.10 to 7.00, more preferably 1.15 to 6.00, much more preferably 1.20 to 5.00 in the monoaxial direction and the biaxial directions. The first optical sheet (Aa) and the second optical sheet (Ab) which differ in stretch ratio may be used in combination.

When the first optical sheet (Aa) and the second optical sheet (Ab) are made of polyvinyl alcohol resin, stretch ratio and physical properties such as thickness are preferably such as described in <first optical sheet (Aa) and second optical sheet (Ab): (polyvinyl alcohol resin)>.

<Surface Modified Area>

In the present invention, to set adhesive strength between the first optical sheet (Aa) and/or the second optical sheet (Ab) and the synthetic resin layer (B) to not lower than 50 N, a surface modified area having a reactive functional group is preferably existent on the outer surface of the first optical sheet (Aa) and/or the second optical sheet (Ab).

The surface modified area can be formed by applying a coat composition comprising a surface modifier having a reactive functional group to the outer surface so as to form a coat layer. That is, the coat layer treated with the coat composition becomes the surface modified area. The surface modified area can be formed by carrying out various surface treatments on the outer surface so that the surface modified area having a reactive functional group can be formed on the outer surface. The treated layer formed by the treatment may be simply referred to as "surface modified layer".

When the first optical sheet (Aa) and the second optical sheet (Ab) are made of polyvinyl alcohol resin, the sheets have a reactive functional group (hydroxyl group) on the outer surface. Therefore, they have the surface modified area without any treatment. Even when the first optical sheet (Aa) and the second optical sheet (Ab) are made of polyvinyl alcohol resin, a surface modified area (surface modified layer) can be newly formed by forming a coat layer or carrying a surface treatment.

In the present invention, the surface modified layer can be formed on the outer surface of the first optical sheet (Aa) and/or the second optical sheet (Ab) by employing a known method without restriction. Stated more specifically, a method in which the outer surface of the first optical sheet (Aa) and/or the second optical sheet (Ab) is etched and/or a method in which a coat composition is applied to the outer surface of the first optical sheet (Aa) and/or the second optical sheet (Ab) are/is used. The outer surface of the first optical sheet (Aa) and the second optical sheet (Ab) is the outermost surface of the functional laminate (A) and a surface on which the synthetic resin layer (B) to be detailed hereinafter is to be directly laminated.

The surface modified layer is a layer having a reactive functional group. The reactive functional group is preferably a functional group selected from hydroxy group, thiol group, carboxy group, amino group, sulfo group, (thio) isocyanate group, allyl group, (meth)acrylic group, vinyl group, epoxy group, oxetane group, thioepoxy group and silanol group. The reactive functional group may be suitably determined according to a method of forming the surface modified layer.

The reactive functional group of the surface modified layer is not derived from the materials of the first optical sheet (Aa) and the second optical sheet (Ab) but is a reactive functional group which is newly formed by the method of etching and/or the application of the coat composition.

<Method of Forming Surface Modified Layer: Etching>

As the etching method, physical surface treating methods such as chemical treatment using chemicals like an alkali solution or acid solution, polishing, corona discharge treatment, plasma discharge treatment and UV ozone treatment may be employed. When the etching method is employed, not a new layer is formed but the outer surface of the first optical sheet (Aa) and/or the second optical sheet (Ab) is directly modified to form the surface modified area (surface modified layer).

The reactive functional group produced on the outer surface of the first optical sheet (Aa) and/or the second optical sheet (Ab) by etching can be confirmed by analysis with infrared spectroscopy (especially diffusion reflection method).

For example, when the outer surface of the optical sheet made of polyamide resin is subjected to a corona discharge treatment, C=O stretching vibration derived from a carboxyl group can be confirmed at a position different from that of C=O stretching vibration derived from a polyamide bond. Thereby, it is confirmed that an amide bond is cut and a carboxyl group and an amino group as reactive functional groups are produced on the outer surface of the optical sheet made of polyamide resin.

Although the contact angle of the outer surface of the first optical sheet (Aa) and/or the second optical sheet (Ab) can be controlled by etching, it is preferred to control the contact angle of the outer surface of the first optical sheet (Aa) and/or the second optical sheet (Ab) to 10 to 60° in order to improve adhesion to the synthetic resin layer (B) to be bonded. With the contact angle of the outer surface satisfying this range, even when the synthetic resin layer (B) which will be described in detail hereinafter is directly bonded, a functional lens having excellent adhesion can be produced. To further improve adhesion, the contact angle of the outer surface is more preferably 20 to 50°, most preferably 20 to 40°.

Even when the first optical sheet (Aa) and/or the second optical sheet (Ab) are/is made of polyvinyl alcohol resin, the contact angle is more preferably 20 to 50°, most preferably 20 to 40°.

The contact angle in the present invention is obtained by measuring an angle formed by a water drop and the surface of a sheet sample with the DropMaster500 (registered trademark) of Kyowa Interface Science Co., Ltd. when the water drop is dropped on the surface of the sheet sample.

<Method of Forming Surface Modified Layer; Method of Applying Coat Composition>

As the method of applying the coat composition, for example, a method of applying a coat solution such as a moisture-curable polyurethane, polyisocyanate-polyester-based two-liquid type coat solution, polyisocyanate-polyether-based two-liquid type coat solution, polyisocyanate-polyacrylic two-liquid type coat solution, polyisocyanate-polyurethane elastomer-based two-liquid type coat solution, epoxy-based coat solution, epoxy-polyurethane-based two-liquid type coat solution, acrylic coat solution, polyester-based coat solution, polyurethane urea-based one-liquid type coat solution, water-dispersible polyurethane-based coat solution or coat solution containing a silane coupling agent may be employed. The layer formed by using one of the above coat solutions can be a layer having a functional group selected from hydroxy group, thiol group, carboxy group, amino group, sulfo group, (thio) isocyanate group, allyl group, (meth)acrylic group, vinyl group, epoxy group, oxetane group, thioepoxy group and silanol group. When this coat composition is used, a surface modified layer coated with the coat composition is formed on the outer surface of the first optical sheet (Aa) and/or the second optical sheet (Ab).

Out of the above coat compositions, a coat solution containing a silane coupling agent is preferably used, and a coat composition comprising a silane coupling agent having a radically polymerizable group is most preferably used as adhesion to the outer surface of the first optical sheet (Aa) and/or the second optical sheet (Ab) is excellent.

Examples of the silane coupling agent of the present invention include γ-glycidoxypropyl trimethoxysilane, γ-glycidoxypropylmethyl dimethoxysilane, γ-glycidoxypropylmethyl diethoxysilane, γ-glycidoxypropyl triethoxysilane, β-(3,4-epoxycyclohexyl)ethyl trimethoxysilane, tetraethoxysilane, vinyl trimethoxysilane, vinyl triethoxysilane, vinyl triacetoxysilane, methyl trimethoxysilane, methyl triethoxysilane, methyl triphenoxysilane, dimethyl dimethoxysilane, trimethyl methoxysilane, phenyl trimethoxysilane, diphenyl dimethoxysilane, cyclohexylmethyl dimethoxysilane, 1,2-bis(trimethoxysilyl) ethane, n-propyl trimethoxysilane, n-butyl trimethoxysilane, isobutyl trimethoxysilane, isobutyl triethoxysilane, n-hexyl trimethoxysilane, n-hexyl triethoxysilane, n-octyl triethoxysilane, n-decyl trimethoxysilane, 1,6-bistrimethoxysilane, 3-ureidopropyl triethoxysilane, bis [3-(diethoxymethylsilyl)propyl]carbonate, trifluoropropyl trimethoxysilane, perfluorooctylethyl triethoxysilane, γ-chloropropyl trimethoxysilane, vinyl tri (β-methoxy-ethoxy) silane, allyl trimethoxysilane, γ-acryloxypropyl trimethoxysilane, γ-acryloxypropyl triethoxysilane, γ-methacryloxypropyl trimethoxysilane, γ-methacryloxypropyl triethoxysilane, γ-methacryloxypropyl dimethoxymethylsilane, γ-mercaptopropyl trialkoxysilane, γ-aminopropyl trimethoxysilane, γ-aminopropyl triethoxysilane, N-phenyl-γ-aminopropyl trimethoxysilane, 3-triethoxysilyl-N-(1,3-dimethyl-butylidene)propylamine, N-2 (aminoethyl) 3-aminopropyl triethoxysilane, N-2 (aminoethyl) 3-aminopropyl trimethoxysilane, N-2 (aminoethyl) 3-aminopropylmethyl dimethoxysilane, p-styryl trimethoxysilane, 3-isocyanatopropyl triethoxysilane and partially or wholly hydrolyzed products or partial condensates thereof.

Out of these, silane coupling agents having a radically polymerizable group such as vinyl trimethoxysilane, vinyl triethoxysilane, vinyl triacetoxysilane, vinyl tri(β-methoxy-ethoxy) silane, allyl trimethoxysilane, γ-acryloxypropyl trimethoxysilane, γ-acryloxypropyl triethoxysilane, γ-methacryloxypropyl trimethoxysilane, γ-methacryloxypropyl triethoxysilane and γ-methacryloxypropyl dimethoxymethylsilane are preferably used as they improve adhesive strength between the outer surface of the first optical sheet (Aa) and/or the second optical sheet (Ab) and the synthetic resin layer (B).

In the present invention, to the coat solution containing a silane coupling agent, water used to promote the hydrolysis of the silane coupling agent (this water may be added in the form of an acid aqueous solution), an acetyl acetonate complex, a curing catalyst such as perchlorate, a known organic solvent for adjusting coatability (for example, methanol, propanol, t-butyl alcohol, acetylacetone, etc.) and further a surfactant may be added before use. Not particularly limited, a coat composition (coat solution) comprising 100 to 2,000 parts by mass of the above organic solvent, 0.1 to 3.0 parts by mass of the above curing catalyst, 10 to 100 parts by mass of water (may be an acid aqueous solution) and 0.05 to 1.00 part by mass of the surfactant based on 100 parts by mass of the silane coupling agent is preferably used.

In the present invention, to apply the coat solution comprising a silane coupling agent, the following method is preferably employed. The above coat composition (coat solution) is first applied to the outer surface of the first optical sheet (Aa) and/or the second optical sheet (Ab). Then, the coat composition is dried and cured at a temperature of 30 to 120° C. for 5 minutes to 3 hours. Adhesion can be improved more by drying and curing at 35 to 70° C. for 5 to 60 minutes. Although this reason is not known, it is assumed that the component forming the synthetic resin layer (B) permeates into the coat layer (surface modified layer) containing the silane coupling agent while the reactive functional group remains on the outer surface of the first optical sheet (Aa) and/or the second optical sheet (Ab), thereby improving adhesion.

When the coat composition is used, the thickness of the surface modified layer is not particularly limited but preferably 0.1 to 2.0 μm as an excellent effect is obtained and from the viewpoint of productivity.

The contact angle of the surface modified layer formed by using the coat composition may be 10 to 60° or outside this range. Especially when the silane coupling agent having a radically polymerizable group is used, the contact angle may be larger than 60°. In this case, it is considered that the radically polymerizable group serves to enhance adhesive strength. As a matter of course, even when the first optical sheet (Aa) and/or the second optical sheet (Ab) are/is made of polyvinyl alcohol resin, the surface modified layer may be formed by applying the coat composition.

<Time to Form Surface Modified Layer on Optical Sheet>

To form the surface modified layer on the outer surfaces of the first optical sheet (Aa) and the second optical sheet (Ab), the functional laminate (A) should be produced by using the first optical sheet (Aa) and the second optical sheet (Ab) having the surface modified layer on a surface on which the synthetic resin layer (B) is to be formed. After a precursor (having no surface modified layer on the surface) of the functional laminate (A) is produced, before the synthetic resin layer (B) is formed, according to the methods described above, the surface modified layer may be formed on the outermost surfaces of the functional laminate (A), on which the synthetic resin layer (B) is to be laminated.

A description is subsequently given of the functional layer (Ac) of the present invention.

<Functional Layer (Ac)>

The functional layer (Ac) in the present invention is provided with an antiglare function. Not particularly limited, it is preferably a layer having photochromic properties, polarizability or both of them (photochromic properties and polarizability). A description is first given of the layer having photochromic properties.

(Functional Layer (Ac); Layer Having Photochromic Properties)

In the present invention, the layer having photochromic properties (may be simply referred to as "photochromic layer" hereinafter) may be formed by a known method. To firmly bond the first optical sheet (Aa) and the second optical sheet (Ab) to a polarizing layer which is existent between the first optical sheet (Aa) and the second optical sheet (Ab) as required, the photochromic layer is preferably a photochromic adhesive layer (Ac1) containing a photochromic compound and a polyurethane urea resin (may be simply referred to as "photochromic adhesive layer (Ac1)" hereinafter).

(Functional Layer (Ac); Photochromic Adhesive Layer (Ac1))

In the present invention, the polyurethane urea resin forming the photochromic adhesive layer (Ac1) may be a thermosetting polyurethane urea or thermoplastic polyurethane urea. Out of these, a polyurethane urea resin part of which has been polymerized is preferably used in the adhesive layer from the viewpoints of photochromic properties and adhesion.

(Photochromic Adhesive Layer (Ac1); Polyurethane Urea Resin)

The polyurethane urea resin may be produced by a known method. It is preferably a polymer synthesized from a polyisocyanate compound, a polyol compound and a chain extender. A description is subsequently given of each of these components.

(Polyurethane Urea Resin; Polyisocyanate Compound)

As the polyisocyanate compound used in the polyurethane urea resin, an aliphatic polyisocyanate compound or alicyclic polyisocyanate compound is preferably used from the viewpoint of weatherability. Examples of the polyisocyanate compound include aliphatic polyisocyanate compounds such as tetramethylene-1,4-diisocyanate, hexamethylene-1,6-diisocyanate, octamethylene-1,8-diisocyanate and 2,2,4-trimethylhexane-1,6-diisocyanate, and alicyclic polyisocyanate compounds such as cyclohexane-1,3-diisocyanate, cyclohexane-1,4-diisocyanate, 2,4-methylcylohexyl diisocyanate, 2,6-methylcyclohexyl diisocyanate, isophorone diisocyanate, norbornene diisocyanate, isomer mixtures of 4,4'-methylene bis(cyclohexylisocyanate), hexahydrotoluene-2,4-diisocyanate, hexahydrotoluene-2,6-diisocyanate, hexahydrophenylene-1,3-diisocyanate and hexahydrophenylene-1,4-diisocyanate. Isophorone diisocyanate and norbornene diisocyanate are particularly preferably used.

(Polyurethane Urea Resin; Polyol Compound)

As the polyol compound used in the polyurethane urea resin, polyol compounds such as polyether polyols, polycarbonate polyols, polycaprolactone polyols and polyester polyols may be used. Out of these, polycarbonate polyols and polycaprolactone polyols are preferably used from the viewpoints of heat resistance, adhesion, weatherability and hydrolysis resistance. The number average molecular weight of the polyol compound is preferably 400 to 3,000. The number average molecular weight is more preferably 400 to 2,500, much more preferably 400 to 1,500 from the viewpoints of the heat resistance and photochromic properties (color optical density, fading speed, weatherability, etc.) of the obtained polyurethane adhesive layer, particularly the weatherability of the photochromic compound.

(Polyurethane Urea Resin; Chain Extender)

The chain extender used in the polyurethane urea resin is a compound having a molecular weight of 50 to 300 and two or more functional groups able to react with an isocyanate group in the molecule. Examples of the chain extender include diamine compounds, triamine compounds, aminoalcohol compounds, aminocarboxylic acid compounds, aminothiol compounds, diol compounds and triol compounds. Diamine compounds such as isophorone diamine, ethylenediamine, piperazine, bis(4-aminocyclohexyl) methane, norbornene diamine, N, N'-diethyl ethylenediamine and N-ethyl ethylenediamine are preferably used from the viewpoints of adhesion, heat resistance and photochromic properties.

(Other Components Constituting Polyurethane Urea Resin)

The end of the polyurethane urea resin obtained from the above-described polyisocyanate compound, polyol compound and chain extender may be an isocyanate group, and the isocyanate group may be capped with a reaction terminator. As the reaction terminator, a compound having a group reactive with one isocyanate group and a group and structure capable of exhibiting various functions may be used. Stated more specifically, a compound having a group which reacts with an isocyanate group such as 4-amino-1,2,2,6,6-pentamethyl piperidine may be used as the reaction terminator. A urethane urea resin whose end is capped with the reaction terminator is preferably used.

(Preferred Characteristic Properties and Production Method of Polyurethane Urea Resin)

The polyurethane urea resin may be produced by using the above components and a known method. Stated more specifically, a so-called "one-shot method" or "prepolymer method" may be employed. For example, a polyisocyanate compound and a polyol compound are reacted with each other, and then the reaction product is reacted with a chain extender and optionally with a reaction terminator. As the reaction conditions of these components, known conditions may be adopted. As the purification method, a known method may be employed.

The polyurethane urea resin obtained as described above has a number average molecular weight measured by gel permeation chromatography (GPC) of 5,000 to 100,000, preferably 8,000 to 50,000, particularly preferably 10,000 to 40,000. 0.02 to 0.10 g of a urea bond is preferably contained in 1 g of the polyurethane urea resin. As this polyurethane urea resin, polyurethane urea resins described in JP-A 2012-167245, WO2012/018070, JP-A 2012-207198, JP-A 2012-052091 and JP-A 2016-147922 are preferably used.

The polyurethane urea resin obtained as described above is mixed with a photochromic compound which will be described next to form a photochromic adhesive layer (Ac1) containing the photochromic compound. At this point, an organic solvent such as tetrahydrofuran, diethyl ketone, t-butyl alcohol, isopropyl alcohol or propylene glycol monomethyl ether may be used to control viscosity.

(Preferred Components of Photochromic Adhesive Layer (Ac1))

In the present invention, the photochromic layer is preferably formed by blending a polyisocyanate compound (I) (may be simply referred to as "component (I)" hereinafter) which will be described in detail hereinunder to stabilize adhesion to the first optical sheet (Aa), the second optical sheet (Ab) and further the polarizing film (Ac2) which will be described in detail hereinunder. That is, the photochromic adhesive layer (Ac1) is preferably formed from a composition comprising the above polyurethane urea resin, the polyisocyanate compound and the photochromic compound.

As the polyisocyanate compound (I), the above-mentioned polyisocyanate compounds which have been described for the polyurethane urea resin may be used without restriction. Out of these, a polyisocyanate compound (I1) having at least two isocyanate groups in the molecule one of which is bonded to secondary carbon (may be simply referred to as "component (I1)" hereinafter) and a polyisocyanate compound (I2) having at least two isocyanate groups in the molecule and 4 to 40 carbon atoms in the molecule (may be simply referred to as "component (I2)" hereinafter) other than the above component (I1) are preferably contained in a predetermined amount.

Examples of the above component (I1) include isomer mixtures of 4,4'-methylenebis(cyclohexylisocyanate), cyclobutane-1,3-diisocyanate, cyclohexane-1,3-diisocyanate, cyclohexane-1,4-diisocyanate, hexahydrotoluene-2,4-diisocyanate, hexahydrotoluene-2,6-diisocyanate, hexahydrophenylene-1,3-diisocyanate, hexahydrophenylene-1,4-diisocyanate and trimers (isocyanurate compounds) of isophorone diisocyanate. They may be used alone or in combination of two or more. Out of these, isomer mixtures of 4,4'-methylenebis(cyclohexylisocyanate) are preferably used.

Examples of the above component (I2) include hexamethylene diisocyanate, burette compounds of hexamethylene diisocyanate, isocyanurate compounds of hexamethylene diisocyanate and adduct compounds of hexamethylene diisocyanate. They may be used alone or in combination of two or more. Out of these, a polyisocyanate compound selected from the group consisting of burette compounds of hexamethylene diisocyanate and isocyanurate compounds of hexamethylene diisocyanate is preferably used.

In the present invention, the amount of the component (I) is preferably 4.0 to 20 parts by mass based on 100 parts by mass of the adhesive resin component from the viewpoints of the adhesion and heat resistance of the obtained adhesive layer. When the amount of the component (I) satisfies this range, the obtained adhesive layer exhibits an excellent effect. When the amount is too small, the satisfactory effect of improving adhesion and heat resistance is not obtained. When the amount is too large, the adhesive layer tends to become cloudy and adhesion tends to become low. It is considered that this component (I) acts on the urea bond of the polyurethane urea resin to polymerize the resin. When the component (I1) and the component (I2) are used in combination, the above amount is the total amount of these components. The weight ratio of the component (I1) and the component (I2) may be suitably determined according to an object to be bonded. To bond an optical sheet made of polyamide resin, the above component (I2) is contained in an amount of preferably 10 to 500 parts by mass, more preferably 10 to 250 parts by mass based on 100 parts by mass of the above component (I1). When this ratio is satisfied, adhesion to the optical sheet made of alicyclic polyamide resin in particular can be enhanced.

(Photochromic Adhesive Layer; Photochromic Compound)

A description is subsequently given of the photochromic compound contained in the layer having photochromic properties.

As the photochromic compound used in the present invention, known photochromic compounds such as chromene compounds, fulgimide compounds, spirooxazine compounds and spiropyran compounds may be used without restriction. They may be used alone or in combination of two or more.

As the above fulgimide compounds, spirooxazine compounds, spiropyran compounds and chromene compounds. compounds described in, for example, JP-A 2-28154, JP-A 62-288830, WO94/22850 and WO96/14596 may be used.

It is preferred to use one or more chromene compounds having an indeno (2,1-f) naphtho (1,2-b) pyran skeleton out of these photochromic compounds from the viewpoints of photochromic properties such as color optical density, initial coloration, durability and fading speed. Out of these chromene compounds, compounds having a molecular weight of 540 or more are more preferred as they are particularly excellent in color optical density and fading speed.

As the photochromic compound in the present invention, photochromic compounds containing a molecular chain having a molecular weight of 300 or more such as polysiloxane chain or polyoxyalkylene chain as a substituent are suitably selected from known compounds and may be used without restriction. As the photochromic compounds, compounds having the above molecular chain described in, for example, WO2000/015630, WO2004/041961, WO2005/105874, WO2005/105875, WO2006/022825, WO2009/146509, WO2010/20770, WO2012/121414, WO2012/149599, WO2012/162725, WO2012/176918 and WO2013/078086 may be used.

Examples of the photochromic compound which may be particularly preferably used in the present invention are given below.
[formulas 7]
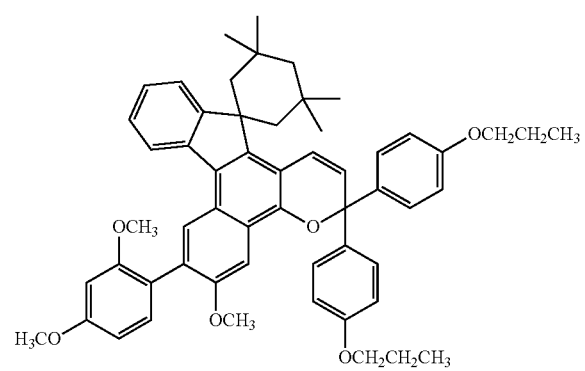
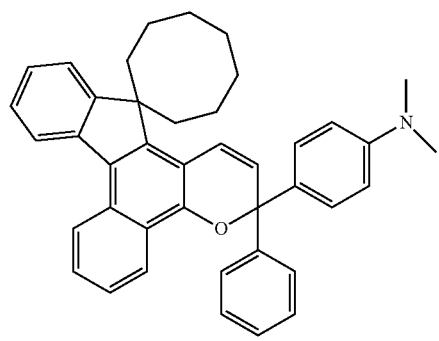
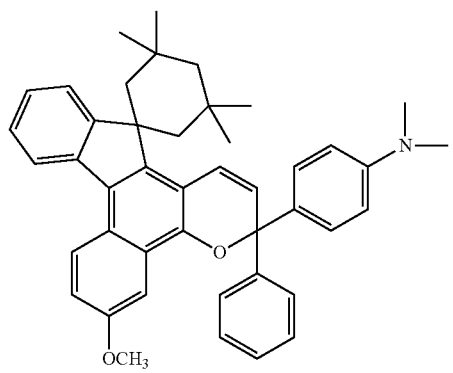
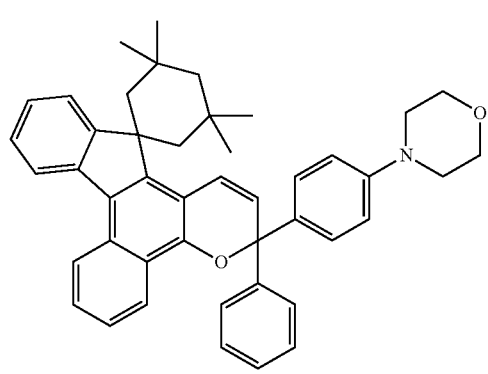
-continued
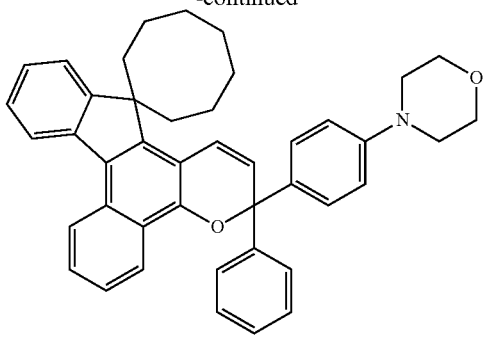
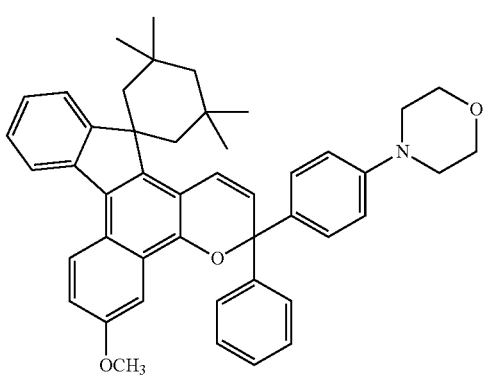
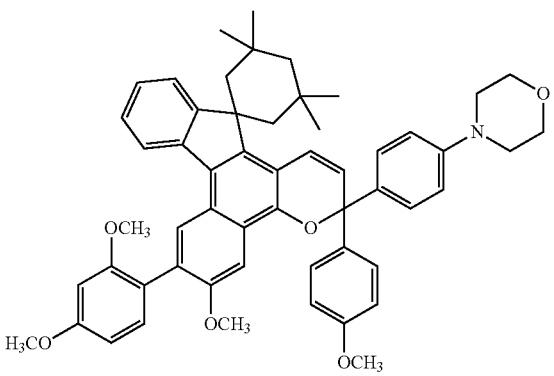
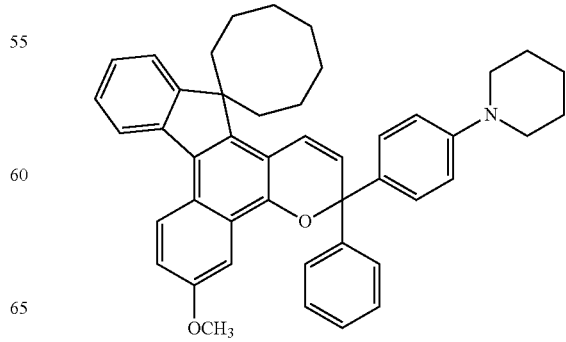

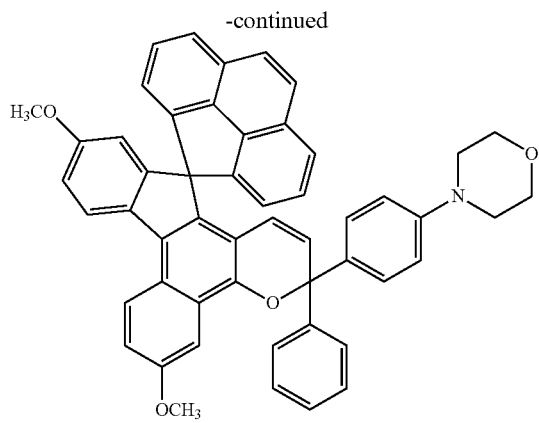

In the present invention, the amount of the photochromic compound is preferably 0.1 to 20.0 parts by mass based on 100 parts by mass of the resin component (adhesive resin component) forming the photochromic layer from the viewpoint of photochromic properties. When the above amount is too small, satisfactory color optical density and durability may not be obtained. When the amount is too large, according to the type of the photochromic compound, the photochromic compound hardly dissolves in the photochromic composition, whereby the homogeneity of the composition may deteriorate and adhesive force (bonding force) may drop. To fully retain adhesion to the first optical sheet (Aa) and the second optical sheet (Ab) while photochromic properties such as color optical density and durability are maintained, the amount of the photochromic compound is more preferably 0.5 to 10.0 parts by mass, much more preferably 1.0 to 7.0 parts by mass based on 100 parts by mass of the total of the resin components of the adhesive resin.

When the photochromic layer (including the adhesive layer) is used as the functional layer (Ac) in the present invention, the thickness thereof is not particularly limited but preferably 1 to 100 μm, more preferably 20 to 50 μm. Within this range, the obtained functional laminate (A) and functional lens exhibit excellent photochromic properties.

In the present invention, when the first optical sheet (Aa) and the second optical sheet (Ab) are both made of polyvinyl alcohol resin, the first optical sheet (Aa) and the second optical sheet (Ab) are directly bonded together by the above photochromic adhesive layer (Ac1).

The photochromic layer, particularly the photochromic adhesive layer (Ac1) is preferably formed based on the above constitution. A description is subsequently given of the layer having polarizability.

(Functional Layer (Ac): Layer Having Polarizability)

In the present invention, the functional layer (Ac) may have a layer having polarizability. The method of forming the layer having polarizability is not particularly limited, and a commercially available polarizing film may be used.

The thickness of the polarizing film (Ac2) is preferably 10 to 100 μm, more preferably 20 to 100 μm. The polarizing film is obtained by stretching a polyvinyl alcohol resin dyed with a dichroic substance such as iodine or dichroic dye. As the polyvinyl alcohol resin, the resin described in <first optical sheet (Aa) and second optical sheet (Ab); (polyvinyl alcohol resin)> may be used. When the first optical sheet (Aa) and the second optical sheet (Ab) are both made of polyvinyl alcohol resin, at least one of the optical sheets may be the polarizing film (Ac2).

When the polarizing film is used in the present invention, an adhesive layer made of the adhesive composition comprising the polyurethane urea resin and the above component (I) explained for the photochromic adhesive layer (Ac1) is preferably arranged on both sides of the polarizing film. Due to this mode, the polarizing film made of polyvinyl alcohol resin and the other optical sheet (first optical sheet (Aa) or second optical sheet (Ab)) can be firmly bonded together by the adhesive layers.

As obvious from above, when the first optical sheet (Aa) and the second optical sheet (Ab) are both made of polyvinyl alcohol resin and one of the optical sheets is a polarizing film, an optical sheet made of another material does not need to be bonded. In this case, the first optical sheet (Aa) and the second optical sheet (Ab) both made of polyvinyl alcohol resin (one of them may be a polarizing film) can be directly bonded together by the photochromic adhesive layer (Ac1).

Although the polarizing film containing a dichroic dye is not particularly limited, by using the adhesive resin of the present invention, even the polarizing film having a luminous transmittance of 10 to 60% and a polarization degree of 70.0 to 99.9% can be firmly bonded.

(Another Mode of Polarizing Film, Treating Method)

To enhance the function and adhesion of the polarizing film, a cellulose triacetate film may be laminated on both side of the polarizing film. The cellulose triacetate film has a thickness of preferably 20 to 200 μm, more preferably 20 to 100 μm. When the cellulose triacetate film is laminated, the first optical sheet (Aa) and the second optical sheet (Ab) are preferably made of a material other than the polyvinyl alcohol resin. When the first optical sheet (Aa) and the second optical sheet (Ab) are made of polyvinyl alcohol resin, the cellulose triacetate film does not need to be formed.

The polarizing film may be heated at 40 to 100° C. for 5 seconds to 30 minutes to adjust the moisture content of the polarizing film and stabilize the size of the polarizing film before the laminate of the present invention is produced.

<Preferred Mode when Polarizing Film (Ac2) is Used Lamination of Adhesive Layer, Etc.>

When the above polarizing film (Ac2) is used in the functional laminate (A) in the present invention, by forming an adhesive layer on the both sides of the above polarizing film (Ac2) so as to bond the first optical sheet (Aa) and the second optical sheet (Ab) thereto, a functional laminate (A) having the first optical sheet (Aa) and the second optical sheet (Ab) which are bonded to the both sides of the polarizing film (Ac2) through the adhesive layers, respectively, can be obtained.

By forming the adhesive layer on the surfaces of the first optical sheet (Aa) and the second optical sheet (Ab) and sandwiching the polarizing film (Ac2) between the adhesive layers, a functional laminate (A) having the first optical sheet (Aa) and the second optical sheet (Ab) which are bonded to the both sides of the polarizing film (Ac2) through the adhesive layers, respectively, can be obtained.

The adhesive layers existent on the polarizing film (Ac2) are not particularly limited but preferably made of the adhesive composition comprising the polyurethane urea resin and the component (I) which have been explained for the photochromic adhesive layer (Ac1). Stated more specifically, the adhesive composition preferably comprises 4.0 to 20 parts by mass of the component (I) based on 100 parts by mass of the above polyurethane urea resin. The above component (I) contains the above component (I2) in an amount of preferably 10 to 500 parts by mass, more preferably 10 to 250 parts by mass based on 100 parts by mass of the above component (11). By using the adhesive layers made of the adhesive composition having this composition, adhesion can be further enhanced.

In the present invention, the thickness of the adhesive layer existent on the both sides of the polarizing film is not particularly limited but preferably 1 to 100 μm, more preferably 5 to 50 μm.

The above explanation is for a case where the both sides of the polarizing film (Ac2) are bonded to the first optical sheet (Aa) and the second optical sheet (Ab) through the adhesive layers, respectively. When the photochromic adhesive layer (Ac1) is further formed, the following constitution may be adopted. That is, a functional laminate (A) consisting of first optical sheet (Aa)/photochromic adhesive layer (Ac1)/polarizing film (Ac2)/adhesive layer/second optical sheet (Ab) laminated in this order can be obtained. An adhesive layer may be formed between the photochromic adhesive layer (Ac1) and the polarizing film (Ac2). When the polarizing film (Ac2) is made of polyvinyl alcohol resin, the adhesive layer is not necessary.

When the first optical sheet (Aa) and the second optical sheet (Ab) are both made of polyvinyl alcohol resin, the lamination order is preferably polyvinyl alcohol first optical sheet (Aa) which may have polarizability/photochromic adhesive layer (Ac1)/polarizing film (Ac) (second optical sheet made of polyvinyl alcohol resin and having polarizability).

(Functional Layer (Ac): Other Additives)

In the present invention, the functional layer (Ac) may contain additives such as surfactant, hindered amine optical stabilizer, hindered phenol antioxidant, phenol-based radical scavenger, sulfur-based antioxidant, phosphorus-based antioxidant, ultraviolet stabilizer, ultraviolet absorbent, release agent, discoloring inhibitor, antistatic agent, fluorescent dye, dye, pigment, aroma chemical and plasticizer besides components which provide photochromic properties and polarizability. As these additives, known compounds may be used without restriction, and two or more of these may be mixed together before use. These additives may be contained in the photochromic layer, the polarizing film and the adhesive layer. The above additives may be used in amounts that do not impair the effect of the present invention. Stated more specifically, the total amount of the additives is preferably 0.001 to 10 parts by mass based on 100 parts by mass of the constituent component (for example, polyurethane urea resin) forming each layer.

Out of these additives, a coloring matter having an absorption peak at 550 to 600 nm is useful as it improves antiglare properties, and examples thereof include nitro-based compounds, azo-based compounds, anthraquinone-based compounds, threne-based compounds, porphyrin-based compounds and rare earth metal compounds. Out of these, porphyrin-based compounds and rare earth metal compounds are preferred from the viewpoint of balance between antiglare properties and visibility. Further, porphyrin-based compounds are most preferred from the viewpoint of dispersion stability in plastic materials.

The rare earth metal compounds include complexes such as aqua hydroxy (1-phenyl1,3-butanedionato) neodymium, aqua hydroxy (phenacylphenylketonato) neodymium, aqua hydroxy (1-phenyl-2-methyl-1,3-butanedionato) neodymium, aqua hydroxy (1-thiophenyl-1,3-butanedionato) neodymium, aqua hydroxy (1-phenyl1,3-butanedionato) erbium and aqua hydroxy (1-phenyl1,3-butanedionato) holmium.

The porphyrin-based compounds are compounds which may have various substituents in the porphyrin skeleton, and compounds described in, for example, JP-A 5-194616, JP-A 5-195446, JP-A 2003-105218, JP-A 2008-134618, JP-A 2013-61653, JP-A 2015-180942, WO2012/020570, Japan Patent No. 5626081, Japan Patent No. 5619472 and Japan Patent No. 5778109 may be preferably used.

The above additives and coloring matters are not particularly limited but preferably blended into the photochromic adhesive layer (Ac1).

(<Preferred Method of Producing Functional Layer (Ac)>

In the present invention, the functional layer (Ac) is preferably an adhesive layer to bond the first optical sheet (Aa) and the second optical sheet (Ab). Stated more specifically, a laminate having the above photochromic adhesive layer (Ac1) and the adhesive layer for bonding the polarizing film (Ac2) or a laminate consisting of these is preferably used as the functional layer (Ac). A description is subsequently given of a method of producing the photochromic adhesive layer (Ac1) and the adhesive layer for bonding the polarizing film (Ac2).

In the present invention, the photochromic adhesive layer (Ac1) and the adhesive layer for bonding the polarizing film (Ac2) are preferably formed from an adhesive composition comprising the above polyurethane urea resin, the component (I) which is blended as required and other additive components. The order of mixing these components is not particularly limited. In the description below, an adhesive layer formed from an adhesive composition comprising a photochromic compound is the photochromic adhesive layer (Ac1). An adhesive layer formed from an adhesive composition comprising no photochromic compound is the adhesive layer for bonding the polarizing film (Ac2).

When an organic solvent is not used in the adhesive composition in the present invention, the adhesive composition prepared by melting and mixing all the components may be pelletized and also may be formed into a sheet directly (in this case, the sheet becomes an adhesive layer directly). When an organic solvent is used, the adhesive composition may be obtained by dissolving all the components in the organic solvent.

<Adhesive Layer Made of Adhesive Composition and Method of Forming the Adhesive Layer>

A description is subsequently given of an example in which the first optical sheet (Aa) and the second optical sheet (Ab) are bonded together by the adhesive layer (photochromic adhesive layer (Ac1)) formed from the adhesive composition comprising a photochromic compound.

The functional laminate (A) having the first optical sheet (Aa) and the second optical sheet (Ab) which are bonded together through the photochromic adhesive layer (Ac1) can be produced by the following method. For example, after the adhesive composition (comprising a photochromic compound) is kneaded to form a homogeneous adhesive sheet which will become the photochromic adhesive layer (Ac1), the adhesive sheet is arranged between the first optical sheet (Aa) and the second optical sheet (Ab) which are then pressed against each other, thereby making it possible to produce the functional laminate (A) having the first optical sheet (Aa) and the second optical sheet (Ab) which are bonded together through the adhesive layer (photochromic adhesive layer (Ac1)).

When the adhesive composition (comprising a photochromic compound) comprising an organic solvent is used, the adhesive composition (comprising a photochromic compound) is applied to the first optical sheet (Aa) to form a coating layer, the organic solvent is removed from the coating layer to form an adhesive layer (photochromic adhesive layer (Ac1)), and the second optical sheet (Ab) is arranged on the adhesive layer (photochromic adhesive layer (Ac1)) to be pressed against the adhesive layer, thereby making it possible to obtain the functional laminate (A) as well.

The method of producing the functional laminate (A) is not particularly limited but preferably the following method to obtain a laminate having excellent smoothness. Stated more specifically, the adhesive composition (photochromic adhesive layer (Ac1)) comprising an organic solvent is first applied to a flat and smooth substrate to form a coating layer. Then, the organic solvent is removed from the coating layer to prepare at least an adhesive sheet which will become the photochromic adhesive layer (Ac1). At this point, drying for removing the organic solvent is preferably carried out at a temperature of room temperature (23° C.) to 100° C.

Further, the functional laminate (A) having the adhesive layer (photochromic adhesive layer (Ac1)) can be produced by interposing the adhesive sheet which will become the photochromic adhesive layer (Ac1) between the first optical sheet (Aa) and the second optical sheet (Ab) to be bonded and bonding them together. When the first optical sheet (Aa) and the second optical sheet (Ab) to be bonded together are made of polyvinyl alcohol resin, the very strong functional laminate (A) can be obtained with this lamination order.

In the present invention, to make the adhesion of the obtained functional laminate (A) strong and stable, it is preferred to use the above urethane urea resin and the component (I) in the adhesive layer (photochromic adhesive layer (Ac1)) and treat it by the following procedure. Stated more specifically, the functional laminated sheet right after the first optical sheet (Aa) and the second optical sheet (Ab) are bonded together by the adhesive sheet which will become the photochromic adhesive layer (Ac1) is preferably left to stand at a temperature of 20° C. to 60° ° C. for 4 hours or more to be degasified. Although the upper limit of the standing time may be determined by looking at the state of the functional laminated sheet, 50 hours suffices. The laminated sheet may be left to stand under normal pressure or vacuum (this step may be referred to as "degassing step" hereinafter).

Then, the functional laminated sheet which has been left to stand is preferably left at a temperature of 60° C. to 130° C. for 30 minutes to 3 hours (this step may be referred to as "heating step" hereinafter). It is considered that, by carrying out this heating, the adhesive sheet is softened and melted at the interfaces between the adhesive sheet which will become the photochromic adhesive layer (Ac1) and the first optical sheet (Aa) and between the adhesive sheet and the second optical sheet (Ab) to enhance adhesion. In addition, it is considered that some of the isocyanate groups of the component (I) are used in a reaction. As a result, it is assumed that the isocyanate groups are bonded to the urethane bond or urea bond of the polyurethane urea resin contained in the adhesive layer to promote the formation of an allophanate bond or burette bond. The functional laminated sheet which is obtained by this heating becomes very stable.

Then, the functional laminated sheet which has been treated in the heating step is preferably humidified at a temperature of room temperature (23° C.) to 100° C. and a humidity of 30 to 100% RH (this step may be referred to as "humidifying step" hereinafter). By carrying out this humidification, a crosslinking structure between polyurethane urea resins can be completed by the component (I) and the isocyanate groups derived from the component (I) contained in the functional laminated sheet can be completely eliminated, thereby making it possible to make adhesion more stable.

It is preferred that the functional laminated sheet after the humidifying step should be further left to stand at a temperature of 40 to 130° ° C. under normal pressure or vacuum to remove excessive moisture contained in the functional laminated sheet (this step may be referred to as "moisture removing step" hereinafter). Thereby, the functional sheet is preferably used as the functional laminate (A).

As described above, to produce the functional laminate (A) in the present invention, after the functional laminated sheet is produced by pressure bonding the first optical sheet (Aa) and the second optical sheet (Ab) together through the adhesive sheet (photochromic adhesive layer (Ac1)), post-processing is preferably carried out in the order of the above degasifying step 1), the heating step 2), the humidifying step 3) and the moisture removing step 4) to make the adhesive sheet a perfect adhesive layer.

The above method is a method of producing the functional laminate (A) having the first optical sheet (Aa) and the second optical sheet (Ab) which are bonded together through the photochromic adhesive layer (Ac1). With reference to the above conditions, the adhesive layer for bonding the polarizing film (Ac2) can be produced. For example, the above conditions are used to form an adhesive layer preferably made of an adhesive composition comprising the above polyurethane urea resin and the above component (I) on both sides of the polarizing film (Ac2). The functional laminate (A) may be produced by bonding the polarizing film (Ac2) having this adhesive layer on both sides to the first optical sheet (Aa) and the second optical sheet (Ab) through the adhesive layers. Also, by laminating the adhesive layer on the surfaces of the first optical sheet (Aa) and the second optical sheet (Ab), these adhesive layers and the polarizing film (Ac2) may be bonded together. A functional laminate (A) consisting of first optical sheet (Aa)/photochromic adhesive layer (Ac1)/polarizing film (Ac2)/adhesive layer/second optical sheet (Ab) may be produced by arranging the above photochromic adhesive layer (Ac1) between the first optical sheet (Aa) and the second optical sheet (Ab) as required. In this case, it is preferred that the polarizing film (Ac2) should be made of polyvinyl alcohol resin and the first optical sheet (Aa) and the second optical sheet (Ab) should be made of a material other than the polyvinyl alcohol resin.

When the first optical sheet (Aa) and the second optical sheet (Ab) having a surface modified layer on a surface on which the synthetic resin layer (B) is to be formed are used in the above method, the functional laminate (A) of the present invention is obtained directly. When the surface modified layer is not formed on the first optical sheet (Aa) and the second optical sheet (Ab), a precursor of the functional laminate (A) is produced in accordance with the above method and the surface modified layer is formed on the surface on which the synthetic resin layer (B) is to be formed of the precursor, thereby making it possible to obtain the functional laminate (A).

A description is subsequently given of the preferred layer constitution and production method of the functional laminate (A).

<Preferred Layer Constitution and Production Method of Functional Laminate (A)>

The preferred layered structures of the functional laminate (A) 1 in the present invention are shown in FIGS. 1 to 3.

<Explanation of FIG. 1>

FIG. 1 shows an example in which an adhesive composition comprising a photochromic compound is used. This is a functional laminate (A) 1 consisting of the first optical sheet (Aa) 2, the adhesive layer 3 having photochromic properties (photochromic adhesive layer (Ac1)) and the second optical sheet (Ab) 4. The surface modified area 9 is formed on at least one of the outer surface 7 of the first optical sheet (Aa) 2 and the outer surface 7' of the second optical sheet (Ab) 4, and the synthetic resin layer (B) 8 is formed on the surface modified area 9. The surface modified area 9 is not shown in FIG. 1.

The functional laminate (A) 1 shown in FIG. 1 is preferably produced by the following method. An adhesive composition comprising a photochromic compound, an organic solvent, the above polyurethane urea resin, the above optionally bonded component (I) and other additives is first applied to a flat and smooth substrate. Then, the organic solvent is removed to produce an adhesive sheet having a smooth surface which will become the photochromic adhesive layer (Ac1) 3. Thereafter, the adhesive sheet is arranged between the first optical sheet (Aa) 2 and the second optical sheet (Ab) 4 which are opposed to each other, and the first optical sheet (Aa) 2 and the second optical sheet (Ab) 4 are pressed against each other with a laminating roll from the outer surfaces. Thereby, the adhesive sheet becomes the adhesive layer 3 (photochromic adhesive layer (Ac1)), thereby making it possible to produce the functional laminate (A) 1 having a layered structure shown in FIG. 1 and photochromic properties. In this case, an adhesive layer 3' having no photochromic properties (not shown) may be formed between the photochromic adhesive layer (Ac1) 3 and the first optical sheet (Aa) 2 and between the photochromic adhesive layer (Ac1) 3 and the second optical sheet (Ab) 4.

When the functional laminate (A) 1 has the layer constitution shown in FIG. 1, the following combination is preferred. That is, the first optical sheet (Aa) 2 and the second optical sheet (Ab) 4 are made of polyvinyl alcohol resin and directly bonded together by the photochromic adhesive layer (Ac1) 3. The first optical sheet (Aa) 2 and the second optical sheet (Ab) 4 may be polarizing films (Ac) made of polyvinyl alcohol resin. As a preferred mode, the first optical sheet (Aa) is made of polyvinyl alcohol resin and the second optical sheet (Ab) is a polarizing film (Ac2) made of polyvinyl alcohol resin (see FIG. 5).

<Preferred Handing Method when Functional Laminate (A) Having First Optical Sheet (Aa) and Second Optical Sheet (Ab) Both Made of Polyvinyl Alcohol Resin is Used>

When the functional laminate (A) 1 (for example, the functional laminate (A) shown in FIG. 5) having the first optical sheet (Aa) 2 and the second optical sheet (Ab) 4 both of which are made of polyvinyl alcohol resin and bonded together by the photochromic adhesive layer (Ac1) 3 is used, it is preferred that, after the moisture content of the functional laminate (A) 1 is adjusted, the synthetic resin layers (B) 8 which will be described in detail hereinunder should be formed to produce a functional lens 6. That is, in this case, it is preferred that, after the moisture content of the functional laminate (A) 1 is adjusted to 0.00 to 0.20 mass %, the synthetic resin layers (B) 8 should be formed. FIG. 6 shows the functional lens 6 obtained by using the functional laminate (A) 1 shown in FIG. 5.

It is considered that this moisture is mainly contained in the optical sheets made of polyvinyl alcohol resin in the functional laminate (A) 1. According to the monomer composition for forming a lens in use, moisture existent on the surface of the functional laminate (A) 1 may have an influence and cause a defect such as air bubble. Therefore, especially when the synthetic resin layer (B) 8 is directly formed on the optical sheets made of polyvinyl alcohol resin, the effect of satisfying the above moisture content is obtained. Therefore, the moisture content of the functional laminate (A) 1 is preferably 0.00 to 0.20 mass %. The moisture content is more preferably 0.00 to 0.15 mass %, much more preferably 0.00 to 0.10 mass % when the productivity of the functional laminate (A) 1 itself is taken into consideration. This moisture content is a value measured by a method which will be described in detail in Examples below and obtained by comparison with the functional laminate (A) 1 which has no weight change by drying.

In this case, a hydroxyl group derived from the polyvinyl alcohol resin is existent on the outer surfaces of the functional laminate (A) 1 without carrying out any treatment. Therefore, it is considered that the functional laminate (A) is firmly bonded to the synthetic resin layers (B) 8 which will be described in detail hereinunder. Even in this case, to achieve high adhesion to the synthetic resin layers (B) 8, the surface modified area 9 having high polarity may be formed by etching. Alternatively, the surface modified area 9 may be formed by applying a coat composition.

<Explanation of FIG. 2>

FIG. 2 shows an example of a layered structure when a polarizing film (Ac2) 5 is used. This is a functional laminate (A) 1 consisting of the first optical sheet (Aa) 2, an adhesive layer 3', a polarizing film (Ac2) 5, an adhesive layer 3' and the second optical sheet (Ab) 4. The layer constitution consisting of adhesive layer 3'/polarizing film 5/adhesive layer 3' corresponds to the functional layer (Ac). The surface modified area 9 is formed on at least one of the outer surface 7 of the first optical sheet (Aa) 2 and the outer surface 7' of the second optical sheet (Ab) 4, and the synthetic resin layer (B) 8 is formed on the outer surface of the surface modified area 9. The surface modified area 9 is not shown in FIG. 2.

In this case, it is preferred that the first optical sheet (Aa) 2 and the second optical sheet (Ab) 4 should be made of a material other than the polyvinyl alcohol resin. Further, it is preferred that the polarizing film (Ac2) 5 should be made of polyvinyl alcohol resin.

The functional laminate (A) 1 shown in FIG. 2 is preferably produced by the following method. Two adhesive sheets having no photochromic properties are prepared by the same method as above. The two adhesive sheets become the adhesive layers 3' existent on both sides of the polarizing film (Ac2) 5. These adhesive sheets are arranged on both sides of the polarizing film 5, respectively. Then, the first optical sheet (Aa) 2 and the second optical sheet (Ab) 4 are arranged on the both sides of the polarizing film (Ac2) 5 having the adhesive sheets on both sides, respectively, and the first optical sheet (Aa) 2 and the second optical sheet (Ab) 4 are pressed against each other from the both outer surfaces with a laminating roll. Thereby, the adhesive sheets become the adhesive layers 3', and the functional laminate (A) 1 having a layered structure showing in FIG. 2 and polarizability can be produced. The adhesive layers 3' may be formed not on both sides of the polarizing film (Ac2) 5 but on the first optical sheet (Aa) 2 and the second optical sheet (Ab) 4, respectively.

<Explanation of FIG. 3>

FIG. 3 shows an example of a functional laminate (A) 1 having a layered structure when the adhesive layer 3 having photochromic properties (photochromic adhesive layer (Ac1) 3) and the polarizing film (Ac2) 5 are combined. This is a functional laminate (A) 1 consisting of the first optical sheet (Aa) 2, the adhesive layer 3 having photochromic properties (photochromic adhesive layer (Ac1) 3), the polarizing film (Ac2) 5, the adhesive layer 3' and the second optical sheet (Ab) 4. The surface modified area 9 is formed on at least one of the outer surface 7 of the first optical sheet (Aa) 2 and the outer surface 7' of the second optical sheet (Ab) 4, and the synthetic resin layer (B) 8 is further formed on the surface modified area 9. The surface modified area 9 is not shown in FIG. 3.

In this case, it is preferred that the first optical sheet (Aa) 2 and the second optical sheet (Ab) 4 should be made of a material other than the polyvinyl alcohol resin. Further, it is preferred that the polarizing film (Ac2) 5 should be made of polyvinyl alcohol resin.

The functional laminate (A) 1 shown in FIG. 3 is preferably produced by the following method. That is, when the same method as that for the functional laminate (A) 1 shown in FIG. 2 is employed to ensure that the photochromic compound is contained in the adhesive sheet laminated on one surface of the polarizing film 5 in the method of producing the functional laminate (A) 1 shown in FIG. 2, the functional laminate (A) 1 having photochromic properties and polarizability shown in FIG. 3 can be obtained. Not shown, as a matter of course, the adhesive layer 3' can be interposed between the photochromic adhesive layer (Ac1) 3 and the polarizing film (Ac2) 5. In FIGS. 1 to 3, it is preferred that the first optical sheet (Aa) 2 and the second optical sheet (Ab) 4 having the surface modified layer on the surface on which the synthetic resin layer (B) 8 is to be formed should be used. The method of forming the surface modified area 9 is as described above.

As a matter of course, even in FIGS. 1 to 3, when the first optical sheet (Aa) 2 and the second optical sheet (Ab) 4 having the surface modified area 9 on the surface on which the synthetic resin layer (B) 8 is to be formed are used, the functional laminate (A) 1 of the present invention is obtained directly. When the surface modified layer 9 is not formed on the first optical sheet (Aa) 2 and the second optical sheet (Ab) 4, a precursor of the functional laminate (A) 1 is produced by the above method and the surface modified area 9 is formed on the surface on which the synthetic resin layer (B) 8 is to be formed of the precursor, thereby making it possible to produce the functional laminate (A) 1. The method of treating the precursor is as described above.

<Other Features>

In the present invention, an ordinary plastic resin film, for example, a polyolefin-based film such as polyethylene or polypropylene film may be attached to the outermost layers (surfaces of the first optical sheet (Aa) and the second optical sheet (Ab) of the functional laminate (A) as a protective film to prevent a scratch or the adhesion of dirt or foreign matter. By attaching this protective film to the outermost layers, surface protection becomes possible when the obtained laminate is thermally bent or punched or when it is stored or transported. This protective film is peeled off when the laminate is used as a final product such as a spectacle lens. This protective film may be attached to the surfaces of the first optical sheet (Aa) and the second optical sheet (Ab) which are the outermost layers of the functional laminate (A) before the adhesive sheet is formed or to the above surfaces as required after the functional laminate (A) is produced.

When the protective film is used, the adhesive of the protective film may remain on the surfaces of the first optical sheet (Aa) and the second optical sheet (Ab). Therefore, after the surfaces of the functional laminate (A) are cleaned, the surface modified layer of the present invention is preferably formed right before the synthetic resin layer (B) is laminated.

<Functional Lens Having Functional Laminate (A)>

In the present invention, a functional lens can be obtained by laminating the synthetic resin layer (B) on at least one surface of the functional laminate (A) and integrating the synthetic resin layer (B) with the functional laminate (A). It is preferred that this synthetic resin layer (B) should be formed on the outer surface of the first optical sheet (Aa) and/or the second optical sheet (Ab) after the surface modified area is formed.

A description is subsequently given of the synthetic resin layer (B) to be formed on this functional laminate (A).

(Synthetic Resin Layer (B))

The synthetic resin layer (B) may be formed from a thermoplastic resin which is an ordinary plastic lens material or a thermosetting resin obtained by curing a monomer composition for forming a lens. The raw material for forming the synthetic resin layer (B) is a resin selected from the group consisting of polyester resin, polyamide resin, allyl resin, (meth)acrylic resin, polyurethane resin, polyurethane urea resin, polythiourethane resin, polythioepoxy resin and polycarbonate resin. It is preferred that the synthetic resin layer (B) should be formed on the surface modified area of the functional laminate (A) by using these resins in accordance with a known method.

Out of these synthetic resin layers (B), what is the most effective in the present invention is use of the monomer composition for forming a lens. According to the present invention, even when the above functional laminate (A) is embedded in the monomer composition for forming a lens, the chemical resistance of the functional laminate (A) can be improved with the result that the synthetic resin layer (B) can be formed without exerting an adverse effect such as the reduction of transparency. It is assumed that this is because the surface modified area is formed on the surface (outer surface) of the above functional laminate on which the synthetic resin layer (B) is to be formed. In addition, as the surface modified area is formed, adhesion between the synthetic resin layer (B) and the functional laminate (A) can be improved.

The above monomer composition for forming a lens is preferably a monomer composition which is polymerized to form allyl resin, (meth)acrylic resin, polyurethane resin, polyurethane urea rein, polythiourethane resin or polythioepoxy resin. That is, it is a monomer composition for forming a lens which is able to form a thermosetting resin, such as allyl-based monomer composition, (meth)acrylate-based monomer composition, urethane-based monomer composition, urethane urea-based monomer composition, thiourethane-based monomer composition or thioepoxy-based monomer composition.

Out of these, a urethane-based monomer composition, urethane urea-based monomer composition, thiourethane-based monomer composition and thioepoxy-based monomer composition are preferably used from the viewpoint of adhesion to the surface (outer surface) of the above functional laminate (A) whose contact angle has been adjusted to 10 to 60° by the above-described etching. Although this reason is unknown, it is assumed that a hydroxyl group, amino group or carboxyl group which is considered to be existent on the surface (outer surface) of the above functional laminate (A) whose contact angle has been adjusted to 10 to 60° reacts with an isocyanate group or thioepoxy group contained in the urethane-based monomer composition, urethane urea-based monomer composition, thiourethane-based monomer composition or thioepoxy-based monomer composition. As another reason, it is assumed that a strong hydrogen bond is formed between the surface (outer surface) of the above functional laminate (A) whose contact angle has been adjusted to 10 to 60° and a cured product of the urethane-based monomer composition, urethane urea-based monomer composition, thiourethane-based monomer composition or thioepoxy-based monomer composition.

It is preferred that the above functional laminate (A) having a layer coated with a coat composition comprising a silane coupling agent having a radically polymerizable group as the surface modified area should be used for the allyl-based monomer composition and (meth)acrylate-based monomer composition from the viewpoint of adhesion. It is assumed that this reason is that the radically polymerizable group existent in the surface modified area reacts with the radically polymerizable group contained in the allyl-based monomer composition and the (meth)acrylate-based monomer composition.

For the above reason, as the most preferred mode of the present invention, the first optical sheet (Aa) and the second optical sheet (Ab) used in the functional laminate (A) are made of polyamide resin, the contact angle of the outer surface of the functional laminate (A) in contact with the synthetic resin layer (B) is adjusted to 10 to 60°, and the synthetic resin layer (B) is made of a urethane urea-based monomer composition, thiourethane-based monomer composition or thioepoxy-based monomer composition.

As another preferred mode, the first optical sheet (Aa) and the second optical sheet (Ab) used in the functional laminate (A) are made of polyamide resin, a layer coated with a coat composition comprising a silane coupling agent having a radically polymerizable group is formed as the surface modified area on the outer surface of the functional laminate (A) in contact with the synthetic resin layer (B), and the synthetic resin layer (B) is made of an allyl-based monomer composition or a (meth)acrylate-based monomer composition.

(Monomer Composition for Forming a Lens)
<Allyl-Based Monomer Composition>

The allyl-based monomer composition is, for example, a composition comprising an allyl monomer having an allyl group such as diethylene glycol bisallyl carbonate, diallyl isophthalate or diallyl terephthalate.

<(Meth)Acrylate-Based Monomer Composition>

The (meth)acrylate-based monomer composition is a composition comprising a (meth)acrylate monomer as shown below and may be mixed with another (meth)acrylate monomer or another polymerizable monomer. Examples of the (meth)acrylate monomer include glycidyl (meth)acrylate, trimethylolpropane tri(meth)acrylate, tetramethylolmethane tri(meth)acrylate, trimethylolpropane triethylene glycol tri(meth)acrylate, pentaerythritol tetra(meth)acrylate, dipentaerythritol hexa(meth)acrylate, urethane oligomer tetra(meth)acrylate, urethane oligomer hexa(meth)acrylate, polyester oligomer hexa(meth)acrylate, diethylene glycol di(meth)acrylate, triethylene glycol di(meth)acrylate, tetraethylene glycol di(meth)acrylate, tripropylene glycol di(meth)acrylate, bisphenol A di(meth)acrylate, 2,2-bis(4-(meth)acryloyloxyethoxyphenyl) propane, 2,2-bis(4-(meth)acryloyloxypolyethylene glycolphenyl) propane having an average molecular weight of 776, methyl ether polyethylene glycol (meth)acrylate having an average molecular weight of 475 and (meth)acrylate monomers having at least one (meth)acrylate group in the molecule such as methyl (meth)acrylate.

(Urethan-Based Monomer Composition, Urethane Urea-Based Monomer Composition>

As the urethane-based monomer composition, a mixture containing a polyisocyanate compound, a polyol compound and a diamine curing agent may be preferably used. By using the diamine curing agent, a urethane urea-based monomer composition can be obtained.

As the polyisocyanate compound, isocyanate compounds enumerated for the polyisocyanate compound of the above polyurethane urea resin may be used.

As the polyol compound, polyol compounds enumerated for the polyol compound of the above polyurethane urea resin may be used.

Examples of the diamine compound include 2,4-diamino-3,5-diethyl-toluene, 2,6-diamino-3,5-diethyl-toluene and mixtures thereof, 4,4'-methylenebis(3-chloro-2,6-diethylaniline), para-phenylenediamine, metaphenylenediamine, 4,4'-diaminodiphenyl ether, diaminodiphenylmethane, bis-4-(4-aminophenoxy)phenyl sulfone, bis-4-(3-aminophenoxy)phenyl sulfone, 2,2-bis(4-(4-aminophenoxy)phenyl) propane, 2,2-bis(4-(4-aminophenoxy)phenyl) hexafluoropropane, 2,2-bis(4-aminophenoxy) hexafluoropropane, 1,3-bis(3-aminophenoxy)benzene, 1,4-bis(3-aminophenoxy)benzene, 1,4-bis(4-aminophenoxy)benzene, 1,4-bis(3-aminophenoxy)benzene, 4,4'-bis(4-amionophenoxy) biphenyl, aromatic diamine compounds such as commercially available "Lonzacure" (registered trademark) series of Lonza Ltd., diamine compounds enumerated for the chain extender of the above urethane-urea resin (C1) and commercially available "JEFFAMINE" (registered tradename) series of Huntsman.

<Thiourethane-Based Monomer Composition>

The thiourethane-based monomer composition is a mixture of a polyisocyanate compound and a polythiol compound.

Examples of the polyisocyanate compound include, in addition to isocyanate compounds enumerated for the polyisocyanate compound of the above polyurethane urea resin, polyisocyanates such as 2,5-diisocyanatomethyl-1,4-dithiane, 2,5-bis(4-isocyanato-2-thiabutyl)-1,4-dithiane, 2,5-bis(3-isocyanatomethyl-4-isocyanato-2-thiabutyl)-1,4-dithiane, 2,5-bis(3-isocyanato-2-thiapropyl)-1,4-dithiane, 1,3,5-trisocyanatocyclohexane, 1,3,5-tris(isocyanatomethyl) cyclohexane, bis(isocyanatomethylthio) methane, 1,5-diisocyanato-2-isocyanatomethyl-3-thiapentane, 1,2,3-tris (isocyanatoethylthio) propane, 1,2,3-tris (isocyanatomethylthio) propane, 1,1,6,6-tetrakis (isocyanatomethyl)-2,5-dithiahexane, 1,1,5,5-tetrakis (isocyanatomethyl)-2,4-dithiapentane, 1,2-bis (isocyanatomethylthio) ethane and 1,5-diisocyanato-3-isocyanatomethyl-2,4-dithiapentane, dimers obtained by the burette type reaction of these polyisocyanates, cyclic trimers of these polyisocyanates and adducts of these polyisocyanates and alcohols or thiols. These polyisocyanate compounds may be used alone or in combination of two or more.

Examples of the polythiol compound include polythiols such as 1,2-dimercaptoethane, 1,2-dimercaptopropane, 2,2-dimercaptopropane, 1,3-dimercaptopropane, 1,2,3-trimercaptopropane, 1,4-dimercaptobutane, 1,6-dimercaptohexane, bis(2-mercaptoethyl) sulfide, bis(2,3-dimercaptopropyl) sulfide, 1,2-bis(2-mercaptoethylthio) ethane, 1,5-dimercapto-3-oxapentane, 1,8-dimercapto-3,6-dioxaoctane, 2,2-dimethylpropane-1,3-dithiol, 3,4-dimethoxybutane-1,2-dithiol, 2-mercaptomethyl-1,3-dimercaptopropane, 2-mercaptomethyl-1,4-dimercaptobutane, 2-(2-mercaptoethylthio)-1,3-dimercaptopropane, 1,2-bis(2-mercaptoethylthio)-3-mercaptopropane, 4-mercaptomethyl-1,8-dimercapto-3,6-dithiaoctane, 2,4-bis(mercaptomethyl)-1,5-dimercapto-3-thiapentane, 4,8-bis(mercaptomethyl)-1,11-dimercapto-3,6,9-trithiaundecane, 4,7-bis(mercaptomethyl)-1,11-dimercapto-3,6,9-trithiaundecane, 5,7-bis(mercaptomethyl)-1,11-dimercapto-3,6,9-trithiaundecane, 1,2,7-trimercapto-4,6-dithiaheptane, 1,2,9-trimercapto-4,6,8-trithianonane, 1,2,8,9-tetramercapto-4,6-dithianonane, 1,2,10,11-tetramercapto-4,6,8-trithiaundecane, 1,2,12,13-tetramercapto-4,6,8,10-tetrathiatridecane, 1,1,1-tris(mercaptomethyl) propane, tetrakis(mercaptomethyl) methane, tetrakis(4-mercapto-2-thiabutyl) methane, tetrakis (7-mercapto-2,5-dithiaheptyl) methane, ethylene glycol bis (2-mercaptoacetate), ethylene glycol bis(3-mercaptopropionate), 1,4-butanediol bis(2-mercaptoacetate), 1,4-butanediol bis(3-mercaptopropionate), trimethylolpropane tris(2-mercaptoacetate), trimethylolpropane tris(3-mercaptopropionate), pentaerythritol tetrakis(2-mercaptoacetate), pentaerythritol tetrakis(3-mercaptopropionate), 1,1-dimercaptocyclohexane, 1,4-dimercaptocyclohexane, 1,3-dimercaptocyclohexane, 1,2-dimercaptocyclohexane, 1,4-bis (mercaptomethyl)cyclohexane, 1,3-bis(mercaptomethyl) cyclohexane, 2,5-bis(mercaptomethyl)-1,4-dithiane, 2,5-bis (2-mercaptoethyl)-1,4-dithiane, 2,5-bis(mercaptomethyl)-1-thiane, 2,5-bis(2-mercaptoethyl)-1-thiane, 1,4-bis (mercaptomethyl)benzene, 1,3-bis(mercaptomethyl) benzene, bis(4-mercaptophenyl) sulfide, bis(4-mercaptophenyl) ether, bis(4-mercaptomethylphenyl) methane, 2,2-bis(4-mercaptophenyl) propane, bis(4-mercaptomethylphenyl) sulfide, bis(4-mercaptomethylphenyl) ether, 2,2-bis(4-mercaptomethylphenyl) propane, 2,5-dimercapto-1,3,4-thiadiazole, 3,4-thiophenedithiol, 1,2-dimercapto-3-propanol, 1,3-dimercapto-2-propanol, glyceryl dithioglycolate, 1,1,2,2-tetrakis(mercaptomethylthio) ethane, 1,1,3,3-tetrakis(mercaptomethylthio) propane and 3-mercaptomethyl-1,5-dimercapto-2,4-dithiapentane. They may be used alone or in combination of two or more.

<Thioepoxy-Based Monomer Composition>

Examples of the thioepoxy-based monomer include chain organic compounds such as bis(β-epithiopropylthio) methane, 1,2-bis(β-epithiopropylthio) ethane, 1,3-bis(β-epithiopropylthio) propane, 1,2-bis(β-epithiopropylthio) propane, 1-(β-epithiopropylthio)-2-(β-epithiopropylthiomethyl) propane, 1,4-bis(β-epithiopropylthio) butane, 1,3-bis(β-epithiopropylthio) butane, 1-(β-epithiopropylthio)-3-(β-epithiopropylthiomethyl) butane, 1,5-bis(β-epithiopropylthio) pentane, 1-(β-epithiopropylthio)-4-(β-epithiopropylthiomethyl) pentane, 1,6-bis(β-epithiopropylthio) hexane, 1-(β-epithiopropylthio)-5-(β-epithiopropylthiomethyl) hexane, 1-(β-epithiopropylthio)-2-[(2-β-epithiopropylthioethyl) thio]ethane and 1-(β-epithiopropylthio)-2-[[2-(2-β-epithiopropylthioethyl)thioethyl]thio]ethane; branched organic compounds and compounds obtained by substituting at least one hydrogen of the episulfide group of these compounds by a methyl group such as tetrakis(β-epithiopropylthiomethyl) methane, 1,1,1-tris(β-epithiopropylthiomethyl) propane, 1,5-bis(β-epithiopropylthio)-2-(β-epithiopropylthiomethyl)-3-thiapentane, 1,5-bis(β-epithiopropylthio)-2,4-bis (β-epithiopropylthiomethyl)-3-thiapentane, 1-(β-epithiopropylthio)-2,2-bis(β-epithiopropylthiomethyl)-4-thiahexane, 1,5,6-tris(β-epithiopropylthio)-4-(β-epithiopropylthiomethyl)-3-thiahexane, 1,8-bis(β-epithiopropylthio)-4-(β-epithiopropylthiomethyl)-3,6-dithiaoctane, 1,8-bis(β-epithiopropylthio)-4,5-bis(β-epithiopropylthiomethyl)-3,6-dithiaoctane, 1,8-bis(β-epithiopropylthio)-4,4-bis(β-epithiopropylthiomethyl)-3,6-dithiaoctane, 1,8-bis(β-epithiopropylthio)-2,4,5-tris(β-epithiopropylthiomethyl)-3,6-dithiaoctane, 1,8-bis(β-epithiopropylthio)-2,5-bis(β-epithiopropylthiomethyl)-3,6-dithiaoctane, 1,9-bis(β-epithiopropylthio)-5-(β-epithiopropylthiomethyl)-5-[(2-β-epithiopropylthioethyl)thiomethyl]-3,7-dithianonane, 1,10-bis(β-epithiopropylthio)-5,6-bis [(2-β-epithiopropylthioethyl)thio]-3,6,9-trithiadecane, 1,11-bis(β-epithiopropylthio)-4,8-bis(β-epithiopropylthiomethyl)-3,6,9-trithiaundecane, 1,11-bis(β-epithiopropylthio)-5,7-bis(β-epithiopropylthiomethyl)-3,6,9-trithiaundecane, 1,11-bis(β-epithiopropylthio)-5,7-[(2-β-epithiopropylthioethyl) thiomethyl]-3,6,9-trithiaundecane and 1,11-bis(β-epithiopropylthio)-4,7-bis(β-epithiopropylthiomethyl)-3,6,9-trithiaundecane; cyclic aliphatic organic compounds and compounds obtained by substituting at least one hydrogen of the episulfide group of these compounds by a methyl group such as 1,3- and 1,4-bis(β-epithiopropylthio)cyclohexanes, 1,3- and 1,4-bis(β-epithiopropylthiomethyl)cyclohexanes, bis [4-(β-epithiopropylthio)cyclohexyl]methane, 2,2-bis [4-(β-epithiopropylthio)cyclohexyl]propane, bis [4-(β-epithiopropylthio)cyclohexyl]sulfide, 2,5-bis(β-epithiopropylthiomethyl)-1-4-dithiane and 2,5-bis(β-epithiopropylthioethylthiomethyl)-1,4-dithiane; and aromatic organic compounds and compounds obtained by substituting at least one hydrogen of the episulfide group of these compounds by a methyl group such as 1,3- and 1,4-bis(β-epithiopropylthio)benzenes, 1,3- and 1,4-bis(β-epithiopropylthiomethyl)benzenes, bis [4-(β-epithiopropylthio)phenyl]methane, 2,2-bis [4-(β-epithiopropylthio)phenyl]propane, bis [4-(β-epithiopropylthio)phenyl]sulfide, bis [4-(β-epithiopropylthio)phenyl]sulfone and 4,4'-bis(β-epithiopropylthio) biphenyl. They may be used alone or in combination of two or more.

To the above monomer compositions for forming a lens, a suitable amount of a polymerization initiator such as thermopolymerization initiator or photopolymerization initiator may be added as required.

<Method of Forming Synthetic Resin Layer (B) (Method of Producing Functional Lens)>

To form (laminate) the synthetic resin layer (B) on the surface (surface modified area) of the functional laminate (A), the following method is employed. Stated more specifically, the functional laminate (A) is set in a glass mold or metal mold used for the production of a plastic lens and then the monomer composition for forming a lens which forms the synthetic resin layer (B) is filled into the mold.

When the above-described thermosetting resin is used for the synthetic resin layer (B), a functional lens can be formed by using a commonly used glass mold, filling the monomer composition for forming a lens into the glass mold and thermally curing (cast polymerizing) it. Further, polymerization may be carried out together with thermal curing or independently by light irradiation. The polymerization time should be suitably determined.

The specific operation of carrying out the above cast polymerization is as follows. For example, the monomer composition for forming a lens is filled into one part of a glass mold, and the functional laminate (A) is floated on the monomer composition. After the other part of the glass mold is set by a gasket or tape, the monomer composition for forming a lens is further injected into the inside of the glass mold and polymerized. As another method, the functional laminate (A) is held in a glass mold by a gasket, tape or other means for fixing the glass mold, and the monomer composition for forming a lens is filled into the glass mold and polymerized. As still another method, the functional laminate (A) is closely attached to one part of a glass mold, and the monomer composition for forming a lens is filled into the other part opposite to the attached part of the glass mold and polymerized.

In the present invention, the synthetic resin layer (B) may be made of a thermoplastic resin other than the monomer composition for forming a lens. When a thermoplastic resin is used as the synthetic resin, an injection molding method may be employed. Stated more specifically, after the functional laminate (A) is closely attached to the inner wall of one part of a metal mold or fixed on around the middle part of the metal mold, the thermoplastic resin is injected into the inside of the metal mold to obtain the functional lens of the present invention.

When the functional lens is produced, the size and shape of the functional laminate (A) may be suitably determined as required. That is, the functional laminate (A) may have a shape that covers the whole functional lens to be finally obtained or part of the lens. The functional laminate (A) whose size is such that the side surface of the functional laminate (A) protrudes to the outside of the above glass mold or metal mold is preferably used. Thereby, the elution of the photochromic compound and/or the dichroic coloring matter from the functional layer (Ac) can be suppressed at a high level.

The functional lens can be produced by the above method. FIG. 4 shows an example of a functional lens 6 produced by using the functional laminate (A) 1 having photochromic properties of the present invention. The functional lens 6 comprises the functional laminate (A) 1 having the first optical sheet (Aa) 2 or the second optical sheet (Ab) 4 on both sides of the adhesive layer (photochromic adhesive layer (Ac1)) 3 having photochromic properties, respectively, and the synthetic resin layer (B) 8 laminated on both sides of the functional laminate (A) 1 (see FIG. 4). The surface modified area 9 is existent at the interface between the functional laminate (A) 1 and the synthetic resin layer (B) 8. The functional lens 6 having an adhesive strength between the first optical sheet (Aa) 2 and/or the second optical sheet (Ab) 4 and the synthetic resin layer (B) 8 of not lower than 50 N can be easily produced by using the functional laminate (A) 1 having the surface modified area 9 in accordance with this method.

The obtained functional lens may be postprocessed by known methods such as hard coating on one side or both sides, water repellent treatment, antifogging treatment and antireflection film according to use purpose.

EXAMPLES

The following examples are provided for the purpose of further illustrating the present invention but are in no way to be taken as limiting.
<Production of Polyurethane Urea Resin>
(Production of Polyurethane Urea Resin (U1))

A stirring blade, a cooling tube, a thermometer and a nitrogen gas introduction pipe were connected to a 10-L reaction vessel, and the stirring blade stirred at 200 rpm.

1,770 g of a polycarbonate diol having a number average molecular weight of 800, 700 g of isophorone diisocyanate and 500 g of toluene were fed to this reaction vessel to carry out a reaction in a nitrogen atmosphere at 100° C. for 7 hours so as to synthesize a urethane prepolymer having an isocyanate group at the end. The end of the reaction was confirmed by the back titration method of the isocyanate group.

After the end of the urethane prepolymer reaction, the reaction solution was cooled to a temperature around 0°, dissolved in 1,430 g of isopropyl alcohol and 2,670 g of diethyl ketone and then kept at 0° ° C. Then, a mixed solution of 171 g of bis-(4-aminocyclohexyl) methane as a chain extender and 145 g of diethyl ketone was added dropwise to the resulting solution within 30 minutes to carry out a reaction at 0° C. for 1 hour. Thereafter, 42 g of 1,2,2,6,6-pentamethyl-4-aminopiperidine was further added dropwise to carry out a reaction at 0° ° C. for 1 hour so as to obtain a diethyl ketone solution of a polyurethane urea resin (U1). This polyurethane urea resin (U1) is an end-capped resin.

[Preparation of Adhesive Composition 1]

1,000 g of a solution of the polyurethane urea resin (U1) (solid content concentration of 36 mass %), 5.7 g of photochromic compounds (PC1/PC2/PC3=4.0/1.0/0.7 g), 43.2 g of an isomer mixture of 4,4'-methylenebis(cyclohexyl isocyanate) as the component (I) (component (11)), 3.6 g of ethylenebis(oxyethylene)bis [3-(5-tert-butyl-4-hydroxy-m-tolyl) propionate] as an antioxidant and 0.5 of L-7001 of DOW CORNING TORAY as a surfactant were added and mixed together under agitation at room temperature to obtain an adhesive composition 1 (for forming the photochromic adhesive layer (Ac1)).

PC1: compound represented by the following formula

[formula 8]

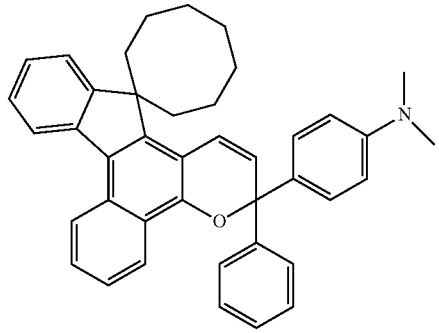

PC2: compound represented by the following formula

[formula 9]

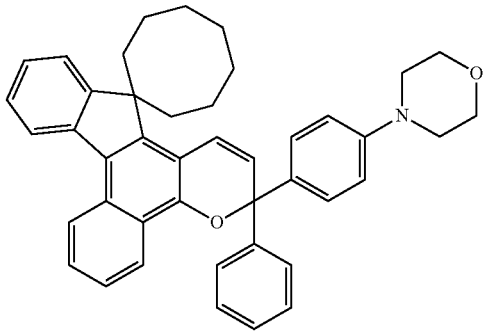

PC3: compound represented by the following formula

[formula 10]

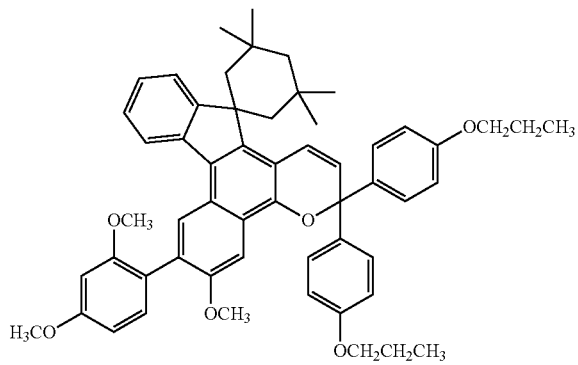

[Preparation of Adhesive Compositions 2 to 3]

Adhesive compositions 2 and 3 were obtained in the same manner as the adhesive composition 1 except that a photochromic compound, polyisocyanate compound (component (I)) and antioxidant shown in Table 1 were used. The component (I) and the antioxidant shown in Table 1 are as follows.

TABLE 1

| Adhesive composition | Photochromic compound *1 | Amount of Polyisocyanate Compound (pbm) *2 | Antioxidant |
|---|---|---|---|
| 1 | PC1/PC2/PC3 4.0 g/1.0 g/0.7 g | (I1-1) component 12 | HP1 |
| 2 | PC1 10.8 g | (I1-1) component 7 (I2-1) component 7 | HP1 |
| 3 | — | (I1-1) component 7 (I2-1) component 7 | — |

*1: amount based on 1,000 g of polyurethane urea resin (U1) solution
*2: based on 100 parts by mass of polyurethane urea resin pbm: part by mass

[Polyisocyanate Compound (Component (I)]
Component (I1)
Component (I1-1): isomer mixture of 4,4'-methylenebis(cyclohexylisocyanate)
Component (I2)
Component (I2-1): burette compound of hexamethylene diisocyanate ("DURANATE 24A-100" (product name) of Asahi Chemical Industry Co., Ltd.)
[Antioxidant]
HP1; ethylenebis(oxyethylene)bis [3-(5-tert-butyl-4-hydroxy-m-tolyl) propionate]
[Polarizing Film]

A polarizing film having a luminous transmittance of 39.2%, a polarization degree of 99.5%, an a* of −0.3, a b* of 0.2 and a thickness of 30 μm was obtained by dyeing a polyvinyl alcohol film with a dichroic dye, stretching and crosslinking it with boric acid.
<Production of Precursor of Functional Laminate (A1)>

The adhesive composition 1 was applied to a 50 μm OPP film (stretched polypropylene film) with a coater (manufactured by Tester Sangyo Co., Ltd.) at a coating speed of 0.3 m/min and dried at 80° C. for 5 minutes to manufacture an adhesive sheet having a thickness of 40 μm from the adhesive composition 1, and an alicyclic polyamide sheet (sheet comprising an alicyclic polyamide containing 4,4'-diaminodicyclohexylmethane and 1,10-decanedicarboxylic acid as the main component; first optical sheet (Aa)) having a thickness of 300 μm was bonded to this adhesive sheet made of the adhesive composition 1.

Then, the OPP film was peeled off from the laminate consisting of alicyclic polyamide sheet/adhesive sheet made of the adhesive composition 1/OPP film laminated in this order which was prepared by the above method. The same alicyclic polyamide sheet (thickness of 300 μm; second optical sheet (Ab)) as the above sheet was pressed against the obtained structure by using a laminating roll to ensure that the adhesive sheet of the structure and the aliphatic polyamide sheet were bonded together. Then, the functional laminated sheet obtained as described above was left to stand at 60° ° C. under vacuum (500 Pa) for 12 hours (degassing step) and then heated at 90° ° C. for 1 hour (heating step). Further, it was humidified at 70° C. and 90% RH for 20 hours (humidifying step) and finally left to stand at 80° ° C. under vacuum (500 Pa) for 5 hours (moisture removing step) to obtain a precursor of a functional laminate (A1) having photochromic properties.

As for the photochromic properties of the obtained precursor of the functional laminate (A1), it had a luminous transmittance of 15.0%, a fading speed of 45 second and a durability of 93%. The peel strength was 100 N/25 mm. These properties were evaluated as follows. The precursor of the functional laminate (A1) became the functional laminate (A1) shown in FIG. 1 by forming the surface modified area.
[Photochromic Properties]

The obtained precursor of the functional laminate (A1) was used as a specimen and irradiated with light from the L-2480 (300 W) SHL-100 xenon lamp of Hamamatsu Photonics K.K. through an aeromass filter (manufactured by Corning Co., Ltd.) at 23° C. and a beam intensity at 365 nm of 2.4 mW/cm$^2$ and at 245 nm of 24 μW/cm$^2$ on the surface of the functional laminate for 120 seconds to develop color so as to measure the photochromic properties of the functional laminate.

1) luminous transmittance: luminous transmittance measured with the spectrophotometer (MCPD1000 instantaneous multi-channel photodetector) of Otsuka Electronics Co., Ltd. after the specimen is irradiated for 120 seconds to develop color. It can be said that as this value becomes smaller, photochromic properties become more excellent.
2) fading speed [t½ (sec)]: time required until the absorbance at the maximum wavelength of the specimen is reduced to ½ of [ε (120)−ε (0)] when light irradiation is stopped after 120 seconds of light irradiation. It can be said that as this time becomes shorter, photochromic properties become more excellent.
3) durability (%)=[(A96/A0)×100]: The following accelerated deterioration test was carried out to evaluate color development durability against light irradiation. That is, the obtained laminate was subjected to accelerated deterioration for 96 hours with the X25 xenon weather meter of Suga Test Instruments Co., Ltd. Thereafter, the above color optical density was evaluated before and after the test to measure color optical density (A0) before the test and color optical density (A96) after the test, and the value [(A96/A0)×100] was taken as a residual rate (%) which is an index for color development durability. As the residual rate becomes higher, color development durability becomes higher.

[Peel Strength]

The obtained precursor of the functional laminate (A1) was formed into a test specimen having a bond part measuring 25×100 mm, and the specimen was set in a tester (AGS-500NX autograph of Shimadzu Corporation) equipped with a thermostat which can set a test ambient temperature to carry out a tensile test at a cross head speed of 100 mm/min so as to measure peel strength.

The peel strength was measured after the test specimen cut out to the above size was left in the thermostat set to 25° C. for 10 minutes.

<Production of Precursor of Functional Laminate (A2)>

The adhesive composition 2 was applied to a 50 μm OPP film (stretched polypropylene film) with a coater (manufactured by Tester Sangyo Co., Ltd.) at a coating speed of 0.3 m/min and dried at 80° C. for 5 minutes to manufacture an adhesive sheet having a thickness of 40 μm from the adhesive composition 2, and a stretched alicyclic polyamide sheet (sheet comprising an alicyclic polyamide containing 4,4'-diaminodicyclohexylmethane and 1,10-decanedicarboxylic acid as the main component; first optical sheet (Aa)) having a thickness of 200 μm was bonded to this adhesive sheet made of the adhesive composition 2 to manufacture a first sheet having an adhesive layer.

The adhesive composition 3 was applied to a 50 μm OPP film (stretched polypropylene film) with a coater (manufactured by Tester Sangyo Co., Ltd.) at a coating speed of 0.3 m/min and dried at 80° C. for 5 minutes to manufacture an adhesive sheet having a thickness of 40 μm from the adhesive composition 2, and a stretched alicyclic polyamide sheet (sheet comprising an alicyclic polyamide containing 4,4'-diaminodicyclohexylmethane and 1,10-decanedicarboxylic acid as the main component; second optical sheet (Ab)) having a thickness of 200 μm was bonded to this adhesive sheet made of the adhesive composition 3 to manufacture a second sheet having an adhesive layer.

Then, the OPP film was peeled off from the first sheet having an adhesive layer, and the exposed photochromic layer (layer which would become the photochromic adhesive layer (Ac1)) and the polarizing film (Ac2) were bonded together. Further, the OPP film was peeled off from the second sheet having an adhesive layer, and the exposed adhesive layer was bonded to the other side of the polarizing film to manufacture a functional laminated sheet.

After this functional laminated sheet was left to stand at 40° C. under vacuum for 24 hours, it was heated at 110° C. for 60 minutes, humidified at 60° C. and 100% RH for 24 hours and left to stand at 40° C. under vacuum for 24 hours in the end to obtain a precursor of a functional laminate (A2) of interest having photochromic properties and polarizability.

The obtained precursor of the functional laminate (A2) had a peel strength of 150 N/25 mm and, as photochromic properties, a luminous transmittance of 11.0, a fading speed of 45 seconds, durability of 93%, a luminous transmittance (before color development) of 39.0% and a polarization degree (before color development) of 99.4%. The peel strength and photochromic properties were evaluated in the same manner as the precursor of the functional laminate (A1). The luminous transmittance (before color development) and polarization degree (before color development) were measured by the following methods.

[Luminous Transmittance (Before Color Development)]

The obtained precursor of the functional laminate (A2) was used as a specimen to measure the luminous transmittance before the irradiation of ultraviolet light of the laminate by using the UV-2550 ultraviolet and visible spectrophotometer of Shimadzu Corporation. [polarization degree (before color development)]

The obtained precursor of the functional laminate (A2) was used as a specimen to measure parallel transmittance (Tp) and orthogonal transmittance (Tc) by using the UV-2550 ultraviolet and visible spectrophotometer of Shimadzu Corporation so as to obtain the polarization degree (P) from the following expression.

$$\text{Polarization degree } (P)(\%) = \{(Tp - Tc) / (Tp + Tc)\}1/2 \times 100$$

Tc and Tp are Y values obtained by measuring with the 2-degree view field (C light source) of JIS Z 8701 and carrying out visibility correction.

<Manufacture of Precursors of Functional Laminates (A3) to (A6)>

First optical sheets (Aa), second optical sheets (Ab), adhesive compositions and a polarizing film (Ac2) shown in Table 2 were used. When the polarizing film was not used, the same operation as that for the precursor of the functional laminate (A1) was made to prepare a precursor. When the polarizing film (Ac2) was used, the same operation as that for the precursor of the functional laminate (A2) was made to prepare a precursor. The results are shown in Table 3.

Reference alphabets for the first optical sheets (Aa) and the second optical sheets (Ab) shown in Table 2 are given below.

<First Optical Sheets (Aa) and Second Optical Sheets (Ab)> a; alicyclic polyamide sheet having a thickness of 300 μm (sheet comprising an alicyclic polyamide containing 4,4'-diaminodicyclohexylmethane and 1,10-decanedicarboxylic acid as main component)

b; stretched alicyclic polyamide sheet having a thickness of 200 μm (sheet comprising an alicyclic polyamide containing 4,4'-diaminodicyclohexylmethane and 1,10-decanedicarboxylic acid as main component)

c; stretched sheet produced from a semi-aromatic polyamide resin and having a thickness of 200 μm (Grivory G21, manufactured by EMS)

d; sheet produced from an aliphatic polyamide resin (TE55, manufactured by EMS) and having a thickness of 300 pam e; polyethylene terephthalate sheet having a thickness of 300 μm f; triacetyl cellulose sheet having a thickness of 300 μm

TABLE 2

| Precursor of functional laminate | First optical sheet (Aa) | Adhesive layer *1 | Polarizing film | Adhesive layer *1 | Second optical sheet (Ab) |
|---|---|---|---|---|---|
| A1 | a | 1 | — | — | a |
| A2 | b | 2 | Polarizing film | 3 | b |
| A3 | c | 3 | Polarizing film | 3 | b |
| A4 | d | 1 | — | — | d |
| A5 | e | 1 | — | — | e |
| A6 | f | 1 | — | — | f |

*1: adhesive composition No. in use

TABLE 3

| Precursor of functional laminate | Peel strength (N/25 mm) | Luminous transmittance (before color development) (%) | Polarization degree (before color development) (%) | Photochromic properties | | |
|---|---|---|---|---|---|---|
| | | | | Luminous transmittance (%) | Fading speed (sec) | Durability (%) |
| A1 | 100 | — | — | 15.0 | 45 | 93 |
| A2 | 150 | 39.0 | 99.4 | 11.0 | 45 | 93 |
| A3 | 150 | 39.5 | 99.4 | — | — | — |
| A4 | 100 | — | — | 15.0 | 45 | 93 |
| A5 | 60 | — | — | 15.0 | 45 | 93 |
| A6 | 50 | — | — | 15.0 | 45 | 93 |

Example 1

(1) Surface Treatment of Precursor of Functional Laminate (A1); Production of Functional Laminate (A1)

The precursor of the functional laminate (A1) was cut into a circular shape having a diameter of 65 mm, and the obtained circular piece was immersed in a tank filled with a 20% KOH solution (mixture of distilled water and benzyl alcohol in a weight ratio of 90/10) heated at 50° ° C. to be ultrasonically cleaned for 10 minutes. Then, the etched precursor of the functional laminate (A1) was cleaned with running water and then in a distilled water tank heated at 50° C. and further in another distilled water tank heated at 50° C. to obtain the functional laminate (A1).

The surface treated functional laminate (A1) had a carboxyl group and an amino group on the outer surface and a contact angle of 43°. The analysis of the reactive functional groups on the outer surface was carried out by using the Spectrum One Fourier transform infrared spectral hardness meter of PERKINELMER INC. and carrying out the comparative analysis of the outer surface of the functional laminate (A1) before and after the surface treatment by a diffusion reflection method. The contact angle was obtained by measuring an angle formed by a water drop and the surface of the sheet with the Drop Master 500 (registered trademark) of Kyowa Interface Science Inc. when the water drop was dropped on the surface of the sheet. The peel strength and photochromic properties of the obtained functional laminate (A1) were almost the same as those of the precursor.

(2) Manufacture of Functional Lens

The functional laminate (A1) obtained in (1) was set in a glass mold (0.00 D, lens diameter of 70 mm, thickness of 3.0 mm) having a gasket. A mixture of an allyl-based monomer composition (3 parts by mass of diisopropylperoxy dicarbonate (polymerization initiator), 100 parts by mass of diethylene glycol bisallyl carbonate; monomer composition for forming a lens) was injected onto the top and bottom of the functional laminate (A1) set in the glass mold, gradually heated in an air furnace from 30° C. to 90° C. over 20 hours and kept at 90° C. for 1 hour to be polymerized. After the end of polymerization, the gasket and the mold were removed, and then a heat treatment was carried out at 120° C. for 2 hours.

Thereafter, the outer wall of the molded product was polished with a ball rubbing machine to obtain a functional lens having a diameter of 60 mm.

When the obtained functional lens was evaluated, as photochromic properties, it had a luminous transmittance of 14.8%, a fading speed of 45 seconds and a durability of 98%.

When adhesive strength between the functional laminate and the synthetic resin layer of the functional lens was measured, it was 60 N. When separation between the functional laminate and the synthetic resin layer of the functional lens was visually evaluated, separation was "O" in the initial stage, after a weatherability test, 1 hour after a boiling test and 2 hours after the boiling test but "1" 3 hours after the boiling test. The visual evaluation of adhesive strength and separation was carried out as follows.

[Adhesive Strength]

A slip-like test specimen having a width of 20 mm and a length of 30 mm was cut out from the obtained functional lens to evaluate adhesive strength thereof. Adhesive strength was measured by pressing a SUS metal sheet (thickness of 0.4 mm, width of 20 mm) against the interface between the functional laminate (A) and the synthetic resin layer (B) in such a manner that it became parallel to the interface and carrying out a compression test on the 20 mm-wide surface of the above test specimen with the AGS-500NX autograph (manufactured by Shimadzu Corporation) at a cross head speed of 10 mm/min and a temperature of 25° C. In Table 5, ">" before the numeral value of adhesive strength means that not interfacial peeling between the functional laminate (A) and the synthetic resin layer (B) but the breakage of the functional laminate (A) or the synthetic resin layer (B) occurred when the numerical value was reached (the functional laminate (A) or the synthetic resin layer (B) was broken at that value and not peeled off by stress applied from the side face.)

[Visual Evaluation (Separation)]

Adhesion between the functional laminate and synthetic resin layer of the obtained functional lens was visually evaluated. This adhesion was evaluated 1) in the initial stage, 2) after a durability test for evaluating photochromic properties (96 hours) and 3) after a boiling test with distilled water (1 hour, 2 hours and 3 hours). Evaluation criteria are given below.

0; Separation between layers is not seen at all.
1; Separation between functional laminate and synthetic resin layer is seen in less than 5% of all parts.
2; Separation between functional laminate and synthetic resin layer is seen in not less than 5% to less than 10% of all parts.
3; Separation between functional laminate and synthetic resin layer is seen in not less than 10% of all parts.

Examples 2 to 21, Comparative Example 1

Functional laminates were manufactured in the same manner as in Example 1 except that precursors of functional laminates and surface treating methods shown in Table 4 were used. The results are shown in Table 4. The photochromic properties, luminous transmittance and polarization degree of each of functional laminates (A2), (A3), (A4), (A5) and (A6) were the same as those of precursors thereof.

Functional lenses were manufactured in the same manner as in Example 1 except that monomer compositions for forming a lens shown in Table 5 were used. The results are shown in Table 5.

Reference alphabets for surface treatments shown in Table 4 denote the following.

a; The functional laminate was cut into a circular shape having a diameter of 65 mm, and the obtained circular piece was immersed in a tank filled with a 20% KOH solution heated at 50° C. (mixture of distilled water and benzyl alcohol in a weight ratio of 90/10) to be ultrasonically cleaned for 5 to 30 minutes. Then, the etched functional laminate (A1) was cleaned with running water and then in a distilled water tank heated at 50° C.

and further in another distilled water tank heated at 50° C. In Table 4, numerical values after "a" denote time (minutes) for treating with the 20% KOH solution.

b; The both surfaces of the functional laminate was subjected to a corona discharge treatment with the MultiDyne of Navitas Co., Ltd. The numerical values after "b" denote time (minutes) for subjecting the each surface to carry out the corona discharge treatment.

c; 110 parts by mass of γ-glycidoxypropyl trimethoxysilane, 63 parts by mass of methanol, 71 parts by mass of t-butyl alcohol and 0.20 part by mass of a silicone-based surfactant (L7001 of DOW CORNING TORAY) were added and mixed together under agitation. 50 parts by mass of a 0.1 N hydrochloric acid aqueous solution was added to the obtained solution under agitation, paying attention to prevent the temperature of the solution from exceeding 50° C. and kept stirred for another 3 hours after the end of addition. Thereafter, 1 part by mass of tris(2,4-pentanedionato)aluminum (III) (acetylacetonate complex) was added to and further mixed with the resulting solution at room temperature under agitation for another 24 hours to obtain a coat composition comprising a silane coupling agent. Then, the functional laminate which was subjected to the surface treatment under the condition "a" (five minutes) was dip coated with this coat composition to form a surface modified layer having a thickness of about 0.5 μm. Numerical values after "c" denote drying and curing conditions after dip coating.

d; The same treatment as "c" was made except that Y-glycidoxypropyl trimethoxysilane of "c" was changed to allyl trimethoxysilane.

e; The same treatment as "c" was made except that γ-glycidoxypropyl trimethoxysilane of "c" was changed to γ-methacryloxypropyl dimethoxymethylsilane.

Reference abbreviations for monomers for forming a lens shown in Table 5 (including polymerization conditions) denote the following.

[Allyl; Monomer Composition for Forming a Lens; Method of Polymerizing an Allyl-Based Monomer Composition]

3 parts by mass of diisopropylperoxy dicarboxylate (polymerization initiator) and 100 parts by mass of diethylene glycol bisallyl carbonate were prepared as a monomer composition for forming a lens.

Then, the above monomer composition for forming a lens was injected onto the top and bottom of the functional laminate (A) set in a glass mold (0.00 D, lens diameter of 70 mm, thickness of 3.0 mm) having a gasket, gradually heated from 30 to 90° C. in an air furnace over 20 hours and kept at 90° C. for 1 hour to be polymerized. After the end of polymerization, the gasket and the mold were removed, and a heat treatment was carried out at 120° C. for 2 hours.

[Acryl; Monomer Composition for Forming a Lens; Method of Polymerizing a (Meth)Acrylic Monomer Composition]

A mixture of 20 parts by mass of trimethylolpropane trimethacrylate, 40 parts by mass of polyethylene glycol diacrylate having an average molecular weight of 522 and 40 parts by mass of urethane acrylate (EBECRYL 4858 of Daicel Chemical Industries, Ltd.) all of which are radically polymerizable monomers was prepared.

Further, t-butylperoxy neodecanoate as a polymerization initiator was mixed in an amount of 1.0 part by mass based on 100 parts by mass of the radically polymerizable monomer under agitation to obtain a monomer composition for forming a lens.

Then, the monomer composition for forming a lens was injected onto the top and bottom of the functional laminate (A) set in a glass mold (0.00 D, lens diameter of 70 mm, thickness of 3.0 mm) having a gasket, gradually heated from 33° C. to 90° C. in an air furnace over 17 hours and kept at 90° C. for 2 hours to be polymerized. After the end of polymerization, the gasket and the mold were removed, and the polymerized product was put into an oven to be heated at 110° C. for 3 hours.

[Thiourethane; Monomer Composition for Forming a Lens; Method of Polymerizing a Thiourethane-Based Monomer Composition]

A mixture of 43.5 parts by mass of dicyclohexylmethane-4,4'-diisocyanate, 43.5 parts by mass of isophorone diisocyanate, 63.0 parts by mass of 1,2-bis [(2-mercaptoethyl)thio]-3-mercaptopropane and 0.1 part by mass of dibutyltin dilaurate as a polymerization initiator was prepared as a monomer composition for forming a lens.

Then, the monomer composition for forming a lens was injected onto the top and bottom of the functional laminate (A) set in a glass mold (0.00 D, lens diameter of 70 mm, thickness of 3.0 mm) having a gasket, gradually heated from 35° C. to 130° C. in an air furnace over 12 hours and kept at 130° ° C. for 0.5 hour to be polymerized. After the end of polymerization, the gasket and the mold were removed, and the polymerized product was put into an oven to be heated at 130° C. for 3 hours.

[Thioepoxy; Monomer Composition for Forming a Lens; Method of Polymerizing a Thioepoxy-Based Monomer Composition]

A mixture of 95 parts by mass of bis(β-epithiopropylthio)ethane, 5 parts by mass of 2-mercaptoethanol and 0.1 part by mass of tetrabutylammonium bromide as a polymerization catalyst was prepared as a monomer composition for forming a lens.

Then, the monomer composition for forming a lens was injected onto the top and bottom of the functional laminate (A) set in a glass mold (0.00 D, lens diameter of 70 mm, thickness of 3.0 mm) having a gasket, gradually heated from 20° ° C. to 90° C. in an air furnace over 20 hours and kept at 90° C. for 1 hour to be polymerized. After the end of polymerization, the gasket and the mold were removed, and the polymerized product was put into an oven to be heated at 90° C. for 1 hour.

[Urethane Urea; Monomer Composition for Forming a Lens; Method of Polymerizing a Urethane Urea-Based Monomer Composition]

100 parts by mass of a polyester polyol having a number average molecular weight of 1,000 and containing adipic acid and 1,6-hexanediol, 78 parts by mass of an isomer mixture of 4,4'-methylenebis(cyclohexylisocyanate) and 17 parts by mass of 2,4-diamino-3,5-diethyl-toluene/2,6-diamino-3,5-diethyl-toluene as an aromatic diamine curing agent were prepared as a monomer composition for forming a lens.

A mixture of the above polyester polyol and the isomer mixture of 4,4'-methylenebis(cyclohexylisocyanate) was first heated at 140° C. in dry nitrogen for 10 minutes to produce a prepolymer. This prepolymer was cooled to 70° C. and left for 24 hours. The aromatic diamine curing agent was mixed with the prepolymer, and the resulting mixture was injected onto the top and bottom of the functional laminate (A) set in a glass mold (0.00 D, lens diameter of 70 mm, thickness of 3.0 mm) having a gasket and cured at 120° C. over 10 hours. After the end of polymerization, the gasket and the mold were removed, and the cured product was put into an oven to be heated at 110° C. for 1 hour.

TABLE 4

| | Functional laminate (A) | Surface treatment | CA | Reactive functional group |
|---|---|---|---|---|
| Ex. 1 | A1 | a; 10 min. | 43 | Carboxyl group, amino group |
| Ex. 2 | A1 | a; 5 min. | 55 | Carboxyl group, amino group |
| Ex. 3 | A1 | a; 20 min. | 37 | Carboxyl group, amino group |
| Ex. 4 | A1 | b; 0.5 min. | 27 | Carboxyl group, amino group |
| Ex. 5 | A2 | b; 0.5 min. | 25 | Carboxyl group, amino group |
| Ex. 6 | A3 | b; 0.5 min. | 30 | Carboxyl group, amino group |
| Ex. 7 | A4 | b; 0.5 min. | 24 | Carboxyl group, amino group |
| Ex. 8 | A5 | b; 1.0 min. | 35 | Carboxyl group |
| Ex. 9 | A6 | b; 1.0 min. | 30 | Hydroxyl group |
| Ex. 10 | A4 | b; 0.5 min. | 24 | Carboxyl group, amino group |
| Ex. 11 | A4 | b; 0.5 min. | 24 | Carboxyl group, amino group |
| Ex. 12 | A4 | b; 0.5 min. | 24 | Carboxyl group, amino group |
| Ex. 13 | A4 | b; 3.0 min. | 17 | Carboxyl group, amino group |
| Ex. 14 | A1 | b; 0.5 min. | 27 | Carboxyl group, amino group |
| Ex. 15 | A1 | b; 0.5 min. | 27 | Carboxyl group, amino group |
| Ex. 16 | A1 | c; 50° C. X 30 min. | 90 | Silanol group, epoxy group |
| Ex. 17 | A1 | c; 100° C. X 60 min. | 90 | Silanol group, epoxy group |
| Ex. 18 | A1 | d; 50° C. X 30 min. | 100 | Silanol group, Allyl group |
| Ex. 19 | A1 | d; 100° C. X 60 min. | 100 | Silanol group, Allyl group |
| Ex. 20 | A1 | e; 50° C. X 30 min. | 90 | Silanol group, Methacrylic group |
| Ex. 21 | A1 | e; 100° C. X 60 min. | 90 | Silanol group, Methacrylic group |
| C. Ex. 1 | A4 | — | 70 | — |

Ex.: Example
C. Ex.: Comparative Example
CA: contact angle

As obvious from the above Examples 1 to 21, it is understood that the functional lens of the present invention has excellent photochromic properties and/or polarizability and also excellent adhesion with an adhesive strength between the functional laminate and the synthetic resin layer of not less than 50 N. The reason that the functional lens has such high adhesive strength between the functional laminate and the synthetic resin layer is that the surface modified area is formed on the outer surface of the functional laminate.

Meanwhile, although there is no problem with photochromic properties in Comparative Example 1, a functional lens having insufficient adhesive strength between the functional laminate and the synthetic resin layer is obtained. It is considered that the reason for this is that the surface modified area is not formed on the outer surface of the functional laminate.

A description is subsequently given of Examples in which optical sheets made of polyvinyl alcohol resin were used as the first optical sheet (Aa) and the second optical sheet (Ab).

[Preparation of Adhesive Composition 4]

An adhesive composition 4 (for forming the photochromic adhesive layer (Ac1)) was prepared in the same manner as the adhesive composition 1 except that 10.8 g of PC1 was used as the photochromic compound in the preparation of the adhesive composition 1. Table 6 shows the adhesive composition 4.

[Adhesive Compositions 5 to 16]

(Photochromic) adhesive compositions 5 to 16 were obtained in the same manner as the (photochromic) adhesive composition 4 except that polyisocyanate compounds (components (1)) were used in an amount shown in Table 6. The

TABLE 5

| | Monomer composition for forming a lens | Luminous transmittance (b.c.d.) (%) | Polarization degree (b.c.d.) (%) | Photochromic properties | | | Adhesive strength (N) | visual evaluation (separation) | | | | |
|---|---|---|---|---|---|---|---|---|---|---|---|---|
| | | | | Luminous transmittance (%) | Fading speed (sec) | Durability (%) | | is | dt | Boiling (1 hr) | Boiling (2 hr) | Boiling (3 hr) |
| Ex. 1 | Allyl | — | — | 14.8 | 45 | 98 | 60 | 0 | 0 | 0 | 1 | 2 |
| Ex. 2 | Allyl | — | — | 14.8 | 45 | 98 | 50 | 0 | 0 | 0 | 1 | 3 |
| Ex. 3 | Allyl | — | — | 14.8 | 45 | 98 | 120 | 0 | 0 | 0 | 0 | 1 |
| Ex. 4 | Thiourethane | — | — | 14.8 | 45 | 98 | >250 | 0 | 0 | 0 | 0 | 0 |
| Ex. 5 | Thiourethane | 38.7 | 99.4 | 11.0 | 45 | 98 | >250 | 0 | 0 | 0 | 0 | 0 |
| Ex. 6 | Thiourethane | 39.2 | 99.4 | — | — | — | >250 | 0 | 0 | 0 | 0 | 0 |
| Ex. 7 | Thiourethane | — | — | 14.8 | 45 | 98 | 200 | 0 | 0 | 0 | 0 | 1 |
| Ex. 8 | Thiourethane | — | — | 14.8 | 45 | 98 | 80 | 0 | 0 | 0 | 1 | 2 |
| Ex. 9 | Thiourethane | — | — | 14.8 | 45 | 98 | 80 | 0 | 0 | 0 | 1 | 2 |
| Ex. 10 | Acryl | — | — | 14.8 | 45 | 98 | 50 | 0 | 0 | 0 | 2 | 3 |
| Ex. 11 | Thioepoxy | — | — | 14.8 | 45 | 98 | 70 | 0 | 0 | 0 | 1 | 2 |
| Ex. 12 | Thiourethane | — | — | 14.8 | 45 | 98 | 150 | 0 | 0 | 0 | 0 | 1 |
| Ex. 13 | Acryl | — | — | 14.8 | 45 | 98 | 55 | 0 | 0 | 0 | 2 | 3 |
| Ex. 14 | Urethane urea | — | — | 14.8 | 45 | 98 | >240 | 0 | 0 | 0 | 0 | 0 |
| Ex. 15 | Thioepoxy | — | — | 14.8 | 45 | 98 | >200 | 0 | 0 | 0 | 0 | 0 |
| Ex. 16 | Allyl | — | — | 14.8 | 45 | 98 | 110 | 0 | 0 | 0 | 0 | 1 |
| Ex. 17 | Allyl | — | — | 14.8 | 45 | 98 | 70 | 0 | 0 | 0 | 1 | 2 |
| Ex. 18 | Allyl | — | — | 14.8 | 45 | 98 | >170 | 0 | 0 | 0 | 0 | 0 |
| Ex. 19 | Allyl | — | — | 14.8 | 45 | 98 | 140 | 0 | 0 | 0 | 0 | 1 |
| Ex. 20 | Acryl | — | — | 14.8 | 45 | 98 | 120 | 0 | 0 | 0 | 0 | 1 |
| Ex. 21 | Acryl | — | — | 14.8 | 45 | 98 | 70 | 0 | 0 | 0 | 1 | 2 |
| C. Ex. 1 | Allyl | — | — | 14.8 | 45 | 98 | 20 | 2 | 3 | 3 | 3 | 3 | b.c.d.: before color development
is: initial stage
dt: durability test
Ex.: Example
C. Ex.: Comparative Example components (I) shown in Table 6 are as follows. Table 6 shows the adhesive compositions 5 to 16.
component (I) polyisocyanate compound
Component (I1); polyisocyanate compound having an isocyanate group bonded to secondary carbon
Component (I1-1); isomer mixture of 4,4'-methylenebis (cyclohexylisocyanate)
Component (I1-2); trimer of isophorone diisocyanate ("TOLONATE IDT70B" (product name) of PERSTORP, mixed with 30% butyl acetate, molecular weight of 666)
Component (I2) polyisocyanate compound other than (IIIA) having 4 to 40 carbon atoms in molecule
Component (I2-1); burette compound of hexamethylene diisocyanate (DURANATE 24A-100 (registered trademark) of Asahi Chemical Industry Co., Ltd.)
Component (I2-2); isocyanurate compound of hexamethylene diisocyanate (DURANATE TPA-100 (registered trademark) of Asahi Chemical Industry Co., Ltd.)
Component (I2-3); hexamethylene diisocyanate

[Preparation of Adhesive Composition 17]

A polyurethane resin (i) having an isocyanate group at the end of the molecular chain and a polyurethane resin (ii) having a hydroxyl group at the end of the molecular chain were synthesized by the following methods.

(Synthesis of Polyurethane Resin (i))

100 g of a polycaprolactone polyol having a number average molecular weight of 1,000 (PLACCEL of Daicel Chemical Industries, Ltd.) and 39.5 g of 4,4'-methylenebis (cyclohexylisocyanate) were fed to a three-necked flask equipped with a stirring blade, cooling tube, thermometer and nitrogen gas introduction pipe to carry out a reaction at 90° C. in a nitrogen atmosphere for 6 hours so as to obtain a prepolymer having an isocyanate group at the end (polyurethane resin (i)).

(Synthesis of Polyurethane Resin (ii))

100 g of a polycaprolactone polyol having a number average molecular weight of 1,000 (PLACCEL of Daicel Chemical Industries, Ltd.) and 61.3 g of hydrogenated diphenylmethane diisocyanate were fed to a three-necked flask equipped with a stirring blade, cooling tube, thermometer and nitrogen gas introduction pipe to carry out a reaction at 90° C. in a nitrogen atmosphere for 6 hours so as to obtain a prepolymer having an isocyanate group at the end. After 300 g of toluene was added, 12.7 g of 1,4-butanediol was added dropwise in a nitrogen atmosphere to carry out a reaction at 90° C. for 24 hours after end of dropwise so as to synthesize a polyurethane resin (ii) having a hydroxyl group at the end of the molecular chain.

175 g of the polyurethane resin (i) obtained as described above, 474 g of a polyurethane resin (ii) solution, 10.5 g of photochromic compound PC1, 3.5 g of ethylenebis(oxyethylene)bis [3-(5-tert-butyl-4-hydroxy-m-tolyl) propionate] as an antioxidant and 0.4 g of L-7001 of DOW CORNING TORAY as a surfactant were added and mixed together at room temperature under agitation to obtain a (photochromic) adhesive composition 17. Table 6 shows the adhesive composition 17.

TABLE 6

| Photochromic adhesive composition No. | Resin as base material of adhesive layer | Component (I) | | | | | Total amount of component (I) based on base resin (pbm) *1 |
|---|---|---|---|---|---|---|---|
| | | Component (I1) | | Component (I2) | | | |
| | | Component | Amount (pbm) *1 | Component | Amount (pbm) *1 | Amount (pbm) *2 | |
| Adhesive Composition 4 | Polyurethane urea resin (U1) | (I1-1) | 12 | — | — | 0 | 12 |
| Adhesive Composition 5 | Polyurethane urea resin (U1) | — | — | — | — | — | — |
| Adhesive Composition 6 | Polyurethane urea resin (U1) | (I1-1) | 12 | (I2-2) | 3 | 25 | 15 |
| Adhesive Composition 7 | Polyurethane urea resin (U1) | (I1-1) | 10 | (I2-2) | 5 | 50 | 15 |
| Adhesive Composition 8 | Polyurethane urea resin (U1) | (I1-1) | 7.5 | (I2-2) | 7.5 | 100 | 15 |
| Adhesive Composition 9 | Polyurethane urea resin (U1) | (I1-1) | 5 | (I2-2) | 10 | 200 | 15 |
| Adhesive Composition 10 | Polyurethane urea resin (U1) | (I1-1) | 3 | (I2-2) | 12 | 400 | 15 |
| Adhesive Composition 11 | Polyurethane urea resin (U1) | (I1-1) | 2.5 | (I2-2) | 12.5 | 500 | 15 |
| Adhesive Composition 12 | Polyurethane urea resin (U1) | (I1-1) | 12 | (I2-1) | 3 | 25 | 15 |
| Adhesive Composition 13 | Polyurethane urea resin (U1) | (I1-1) | 12 | (I2-3) | 3 | 25 | 15 |
| Adhesive Composition 14 | Polyurethane urea resin (U1) | (I1-1) | 8 | (I2-2) | 2 | 25 | 10 |
| Adhesive Composition 15 | Polyurethane urea resin (U1) | (I1-1) | 4 | (I2-2) | 1 | 25 | 5 |
| Adhesive Composition 16 | Polyurethane urea resin (U1) | (I1-2) | 7.5 | (I2-3) | 7.5 | 100 | 15 |
| Adhesive Composition 17 | Two-liquid type adhesive composition comprising polyurethane resin (i) and polyurethane resin (ii) as base materials | | | | | | | pbm: part(s) by mass
*1 amount based on 100 parts by mass of base resin
*2 amount of component (I2) based on total amount of component (I)

[Preparation of Optical Sheet 1 Made of Polyvinyl Alcohol Resin]

A commercially available polyvinyl alcohol sheet was dyed with a dichroic dye, stretched and crosslinked with boric acid to manufacture an optical sheet 1 (may be simply referred to as "optical sheet 1" hereinafter) made of polyvinyl alcohol resin and having a luminous transmittance of 41.0%, a polarization degree of 99.1% and a thickness of 30 μm. The optical sheet 1 had a stretch ratio of 5.0, a boric acid content of 10.3 mass % and a moisture content of 11.3 mass %.

from the mass of the optical sheet to be measured, and the obtained value was divided by the mass of the optical sheet to be measured. A value obtained by multiplying the obtained value by 100 was taken as moisture content (mass %).

[Preparation of Optical Sheets 2 to 15 Made of Polyvinyl Alcohol Resin]

Optical sheets 2 to 15 made of polyvinyl alcohol resin and having physical properties shown in Table 7 were prepared by using polyvinyl alcohol resins shown in Table 7, respectively. The evaluation results of the obtained optical sheets are shown in Table 7.

TABLE 7

| Film No. | Polyvinyl alcohol-based resin | Type | Luminous transmittance (%) | Polarization degree (%) | Stretch ratio | Boric acid content (mass %) | moisture content (mass %) | Film thickness (μm) |
|---|---|---|---|---|---|---|---|---|
| Optical sheet 1 | Polyvinyl alcohol | Polarizing | 41.0 | 99.1 | 5.0 | 10.3 | 11.3 | 30 |
| Optical sheet 2 | Polyvinyl alcohol | Non-polarizing | — | — | 5.0 | 10.3 | 10.5 | 30 |
| Optical sheet 3 | Polyvinyl alcohol | Non-polarizing | — | — | 5.0 | 2.5 | 10.3 | 30 |
| Optical sheet 4 | Polyvinyl alcohol | Non-polarizing | — | — | 5.0 | 16.5 | 11.1 | 30 |
| Optical sheet 5 | Polyvinyl alcohol | Non-polarizing | — | — | 5.0 | 19.5 | 11.5 | 30 |
| Optical sheet 6 | Polyvinyl alcohol | Non-polarizing | — | — | 1.0 | 0.0 | 12.8 | 73 |
| Optical sheet 7 | Polyvinyl alcohol | Non-polarizing | — | — | 3.5 | 10.3 | 11.5 | 39 |
| Optical sheet 8 | Polyvinyl alcohol | Non-polarizing | — | — | 6.5 | 10.3 | 10.1 | 25 |
| Optical sheet 9 | Polyvinyl alcohol | Non-polarizing | — | — | 2.3 | 10.3 | 11.8 | 53 |
| Optical sheet 10 | Polyvinyl alcohol | Non-polarizing | — | — | 1.0 | 10.3 | 12.8 | 73 |
| Optical sheet 11 | Polyvinyl formal | Non-polarizing | — | — | 4.5 | 10.3 | 11.3 | 32 |
| Optical sheet 12 | Polyvinyl acetal | Non-polarizing | — | — | 4.5 | 10.3 | 11.3 | 32 |
| Optical sheet 13 | Polyvinyl butyral | Non-polarizing | — | — | 4.5 | 10.3 | 10.7 | 32 |
| Optical sheet 14 | Polyethylene vinyl alcohol | Non-polarizing | — | — | 4.5 | 10.3 | 10.8 | 32 |
| Optical sheet 15 | Polyvinyl alcohol | Polarizing | 75.9 | 34.8 | 5.0 | 10.3 | 10.2 | 30 |

The luminous transmittance and the polarization degree were measured by the above methods. The stretch ratio and the boric acid content were evaluated as follows.

[Stretch Ratio]

The stretch ratio of the obtained optical sheet was calculated based on the lengths before and after stretching of the sheet made of polyvinyl alcohol resin. For example, the stretch ratio of the optical sheet which is not stretched is 1.

[Boric Acid Content]

The obtained optical sheet was used as a specimen and dissolved in a nitric acid aqueous solution to analyze the boric acid content thereof with an ICP emission spectral analyzing device (SPS-1100) manufactured by Seiko Instruments Inc. so as to calculate the boric acid content of the optical sheet.

[Moisture Content]

The moisture content of the obtained optical sheet was obtained as follows. The mass of the optical sheet (to be measured) whose moisture content was to be obtained was first measured. Then, the optical sheet was dried at 110° C. under vacuum for 20 hours to obtain an optical sheet (basic optical sheet) whose mass did not change any more by drying. The mass of the basic optical sheet was subtracted Example 22

[Production of Functional Laminate (A)]

The adhesive composition 4 was applied to the optical sheet 1 by using a bar coater and dried at 80° ° C. for 5 minutes to form an adhesive layer made of the adhesive composition 4 and having a thickness of 40 μm, and then the optical sheet 2 was bonded to this adhesive layer with a laminating roll.

Then, the structure obtained by the above method was left to stand at 60° ° C. under vacuum (500 Pa) for 12 hours (degassing step) and heated at 90° C. for 1 hour (heating step). Thereafter, it was left at room temperature for about one week to obtain a functional laminate (A10) having photochromic properties (may be simply referred to as "functional laminate (A10)" hereinafter).

As for the photochromic properties of the obtained functional laminate A10, the luminous transmittance was 11.0%, the fading speed was 45 seconds, the luminous transmittance (before color development) was 40.8%, and the polarization degree (before color development) was 99.0%. The peel strength at 25° C. was 70 N/25 mm, and the appearance was "0". The photochromic properties, peel strength, luminous transmittance and polarization degree were measured by the above evaluation methods.

The moisture content was measured in the same manner as the optical sheet made of polyvinyl alcohol resin. Stated more specifically, the obtained functional laminate was dried under vacuum at 80° C. and 13 Torr for 15 hours and measured. In the following Examples, after this vacuum drying, the synthetic resin layer (B) was laminated.

The appearance was evaluated as follows.

[Appearance]

As for the evaluation of the appearance of the obtained functional laminate, the functional laminate was irradiated with light from a high-pressure mercury lamp to be projected on white paper so as to observe and evaluate the whole projection plane of the functional laminate. The evaluation criteria are given below.

0; No defect is seen.
1; A defect caused by surface distortion of functional laminate is partially seen.
2; A defect caused by surface distortion of functional laminate is seen on whole plane.

Examples 23 to 49, Comparative Example 2

Functional laminates ((A11) to (A38)) were manufactured and evaluated in the same manner as in Example 22 except that adhesive compositions and optical sheets made of polyvinyl alcohol resin shown in Table 8 were used to manufacture the functional laminates. The evaluation results of the obtained functional laminates are shown in Table 8. In Example 49, a functional laminate (A37) was manufactured by laminating two optical sheets 15 while the polarization axes of the two optical sheets 15 were inclined at 45°. The constitutions of the obtained functional laminates are shown in Table 8, and the evaluation results are shown in Table 9. Table 10 shows the contact angles of the outer surfaces (surfaces on which at least the synthetic resin layer (B) was to be formed, Table 10 shows the contact angles of the both outer surfaces) of the obtained functional laminates, the types of the reactive functional groups and the moisture contents (before the formation of the synthetic resin layer (B)) of the functional laminates.

In Comparative Example 2, a polycarbonate sheet having a thickness of 300 μm was used to manufacture a functional laminate (A38).

TABLE 8-1

| | Photochromic adhesive composition | Optical sheet made of polyvinyl alcohol resin first optical sheet (Aa)/ second optical sheet (Ab) | Functional laminate (A) |
|---|---|---|---|
| Ex. 22 | Adhesive composition 4 | Optical sheet 1/ Optical sheet 2 | Functional laminate (A10) |
| Ex. 23 | Adhesive composition 5 | Optical sheet 1/ Optical sheet 2 | Functional laminate (A11) |
| Ex. 24 | Adhesive composition 6 | Optical sheet 1/ Optical sheet 2 | Functional laminate (A12) |
| Ex. 25 | Adhesive composition 7 | Optical sheet 1/ Optical sheet 2 | Functional laminate (A13) |
| Ex. 26 | Adhesive composition 8 | Optical sheet 1/ Optical sheet 2 | Functional laminate (A14) |
| Ex. 27 | Adhesive composition 9 | Optical sheet 1/ Optical sheet 2 | Functional laminate (A15) |
| Ex. 28 | Adhesive composition 10 | Optical sheet 1/ Optical sheet 2 | Functional laminate (A16) |
| Ex. 29 | Adhesive composition 11 | Optical sheet 1/ Optical sheet 2 | Functional laminate (A17) |
| Ex. 30 | Adhesive composition 12 | Optical sheet 1/ Optical sheet 2 | Functional laminate (A18) |
| Ex. 31 | Adhesive composition 13 | Optical sheet 1/ Optical sheet 2 | Functional laminate (A19) |
| Ex. 32 | Adhesive composition 14 | Optical sheet 1/ Optical sheet 2 | Functional laminate (A20) |
| Ex. 33 | Adhesive composition 15 | Optical sheet 1/ Optical sheet 2 | Functional laminate (A21) |
| Ex. 34 | Adhesive composition 16 | Optical sheet 1/ Optical sheet 2 | Functional laminate (A22) |
| Ex. 35 | Adhesive composition 17 | Optical sheet 1/ Optical sheet 2 | Functional laminate (A23) |
| Ex. 36 | Adhesive composition 8 | Optical sheet 3/ Optical sheet 3 | Functional laminate (A24) |

Ex.: Example

TABLE 8-2

| | Photochromic adhesive composition | Optical sheet made of polyvinyl alcohol resin first optical sheet (Aa)/ second optical sheet (Ab) | Functional laminate (A) |
|---|---|---|---|
| Ex. 37 | Adhesive composition 8 | Optical sheet 4/ Optical sheet 4 | Functional laminate (A25) |
| Ex. 38 | Adhesive composition 8 | Optical sheet 5/ Optical sheet 5 | Functional laminate (A26) |
| Ex. 39 | Adhesive composition 8 | Optical sheet 6/ Optical sheet 6 | Functional laminate (A27) |
| Ex. 40 | Adhesive composition 8 | Optical sheet 7/ Optical sheet 7 | Functional laminate (A28) |
| Ex. 41 | Adhesive composition 8 | Optical sheet 8/ Optical sheet 8 | Functional laminate (A29) |
| Ex. 42 | Adhesive composition 8 | Optical sheet 9/ Optical sheet 9 | Functional laminate (A30) |
| Ex. 43 | Adhesive composition 8 | Optical sheet 10/ Optical sheet 10 | Functional laminate (A31) |
| Ex. 44 | Adhesive composition 8 | Optical sheet 11/ Optical sheet 11 | Functional laminate (A32) |
| Ex. 45 | Adhesive composition 8 | Optical sheet 12/ Optical sheet 12 | Functional laminate (A33) |
| Ex. 46 | Adhesive composition 8 | Optical sheet 13/ Optical sheet 13 | Functional laminate (A34) |
| Ex. 47 | Adhesive composition 8 | Optical sheet 14/ Optical sheet 14 | Functional laminate (A35) |
| Ex. 48 | Adhesive composition 8 | Optical sheet 15/ Optical sheet 2 | Functional laminate (A36) |
| Ex. 49 | Adhesive composition 8 | Optical sheet 15/ Optical sheet 15 | Functional laminate (A37) |
| C. Ex. 2 | Adhesive composition 5 | Polycarbonate sheet/ polycarbonate sheet | Functional laminate (A38) |

Ex.: Example
C. Ex.: Comparative Example

TABLE 9

| | Functional laminate (A) | Photochromic properties Luminous transmittance (%) | Fading speed (sec) | Luminous transmittance (before color development) (%) | Polarization degree (before color development) (%) | peel strength (N/25 mm) | App |
|---|---|---|---|---|---|---|---|
| Ex. 22 | F.L. (A10) | 11.0 | 45 | 40.8 | 99.0 | 70 | 0 |
| Ex. 23 | F.L. (A11) | 11.0 | 45 | 40.8 | 99.0 | 40 | 0 |
| Ex. 24 | F.L. (A12) | 11.0 | 45 | 40.8 | 99.0 | 90 | 0 |
| Ex. 25 | F.L. (A13) | 11.0 | 45 | 40.8 | 99.0 | 120 | 0 |
| Ex. 26 | F.L. (A14) | 11.0 | 45 | 40.8 | 99.0 | 150 | 0 |
| Ex. 27 | F.L. (A15) | 11.0 | 45 | 40.8 | 99.0 | 150 | 0 |
| Ex. 28 | F.L. (A16) | 11.0 | 45 | 40.8 | 99.0 | 110 | 0 |
| Ex. 29 | F.L. (A17) | 11.0 | 45 | 40.8 | 99.0 | 100 | 0 |
| Ex. 30 | F.L. (A18) | 11.0 | 45 | 40.8 | 99.0 | 100 | 0 |
| Ex. 31 | F.L. (A19) | 11.0 | 45 | 40.8 | 99.0 | 90 | 0 |
| Ex. 32 | F.L. (A20) | 11.0 | 45 | 40.8 | 99.0 | 90 | 0 |
| Ex. 33 | F.L. (A21) | 11.0 | 45 | 40.8 | 99.0 | 80 | 0 |
| Ex. 34 | F.L. (A22) | 11.0 | 45 | 40.8 | 99.0 | 140 | 0 |
| Ex. 35 | F.L. (A23) | 11.0 | 45 | 40.8 | 99.0 | 20 | 0 |
| Ex. 36 | F.L. (A24) | 26.5 | 45 | — | — | 140 | 1 |
| Ex. 37 | F.L. (A25) | 26.5 | 45 | — | — | 100 | 0 |
| Ex. 38 | F.L. (A26) | 26.5 | 45 | — | — | 90 | 0 |
| Ex. 39 | F.L. (A27) | 26.5 | 45 | — | — | 60 | 1 |
| Ex. 40 | F.L. (A28) | 26.5 | 45 | — | — | 110 | 0 |
| Ex. 41 | F.L. (A29) | 26.5 | 45 | — | — | 100 | 0 |
| Ex. 42 | F.L. (A30) | 26.5 | 45 | — | — | 100 | 0 |
| Ex. 43 | F.L. (A31) | 26.5 | 45 | — | — | 90 | 1 |
| Ex. 44 | F.L. (A32) | 26.5 | 45 | — | — | 120 | 1 |
| Ex. 45 | F.L. (A33) | 26.5 | 45 | — | — | 110 | 1 |
| Ex. 46 | F.L. (A34) | 26.5 | 45 | — | — | 110 | 1 |
| Ex. 47 | F.L. (A35) | 26.5 | 45 | — | — | 110 | 1 |
| Ex. 48 | F.L. (A36) | 21.3 | 45 | 75.1 | 34.8 | 150 | 0 |
| Ex. 49 | F.L. (A37) | 14.8 | 45 | 55.2 | 81.3 | 150 | 0 |
| C. Ex. 2 | F.L. (A38) | 26.5 | 45 | — | — | 130 | 0 |

Ex.: Example
C. Ex.: Comparative Example
F.L.: Functional laminate
App: Appearance

TABLE 10

| | Functional laminate (A) | Contact angle | Reactive functional group | Moisture content of functional laminate (mass %) |
|---|---|---|---|---|
| Ex. 22 | F.L. (A10) | 35/35 | Hydroxyl group | 0.01 |
| Ex. 23 | F.L. (A11) | 35/35 | Hydroxyl group | 0.02 |
| Ex. 24 | F.L. (A12) | 35/35 | Hydroxyl group | 0.02 |
| Ex. 25 | F.L. (A13) | 35/35 | Hydroxyl group | 0.01 |
| Ex. 26 | F.L. (A14) | 35/35 | Hydroxyl group | 0.01 |
| Ex. 27 | F.L. (A15) | 35/35 | Hydroxyl group | 0.02 |
| Ex. 28 | F.L. (A16) | 35/35 | Hydroxyl group | 0.01 |
| Ex. 29 | F.L. (A17) | 35/35 | Hydroxyl group | 0.01 |
| Ex. 30 | F.L. (A18) | 35/35 | Hydroxyl group | 0.01 |
| Ex. 31 | F.L. (A19) | 35/35 | Hydroxyl group | 0.01 |
| Ex. 32 | F.L. (A20) | 35/35 | Hydroxyl group | 0.02 |
| Ex. 33 | F.L. (A21) | 35/35 | Hydroxyl group | 0.01 |
| Ex. 34 | F.L. (A22) | 35/35 | Hydroxyl group | 0.01 |
| Ex. 35 | F.L. (A23) | 35/35 | Hydroxyl group | 0.01 |
| Ex. 36 | F.L. (A24) | 28/28 | Hydroxyl group | 0.00 |
| Ex. 37 | F.L. (A25) | 37/37 | Hydroxyl group | 0.01 |
| Ex. 38 | F.L. (A26) | 38/38 | Hydroxyl group | 0.01 |
| Ex. 39 | F.L. (A27) | 25/25 | Hydroxyl group | 0.02 |
| Ex. 40 | F.L. (A28) | 33/33 | Hydroxyl group | 0.01 |
| Ex. 41 | F.L. (A29) | 35/35 | Hydroxyl group | 0.01 |
| Ex. 42 | F.L. (A30) | 33/33 | Hydroxyl group | 0.01 |
| Ex. 43 | F.L. (A31) | 30/30 | Hydroxyl group | 0.01 |
| Ex. 44 | F.L. (A32) | 45/45 | Hydroxyl group | 0.12 |
| Ex. 45 | F.L. (A33) | 50/50 | Hydroxyl group | 0.02 |
| Ex. 46 | F.L. (A34) | 50/50 | Hydroxyl group | 0.01 |
| Ex. 47 | F.L. (A35) | 50/50 | Hydroxyl group | 0.01 |
| Ex. 48 | F.L. (A36) | 30/35 | Hydroxyl group | 0.02 |
| Ex. 49 | F.L. (A37) | 30/30 | Hydroxyl group | 0.01 |
| C. Ex. 2 | F.L. (A38) | 82/82 | — | 0.01 |

Ex.: Example
C. Ex.: Comparative Example
F.L.: Functional laminate

Example 50

The functional laminate (A10) was set in a glass mold (0.00 D, lens diameter of 70 mm, thickness of 3.0 mm) having a gasket. A mixture of a thiourethane-based monomer composition (43.5 parts by mass of dicyclohexylmethane-4,4'-diisocyanate, 43.5 parts by mass of isophorone diisocyanate, 63.0 parts by mass of 1,2-bis [(2-mercaptoethyl)thio]-3-mercaptopropane and 0.1 part by mass of dibutyltin dilaurate as a polymerization initiator) was injected onto the top and bottom of the functional laminate (A10) set in the glass mold, gradually heated from 35° ° C. to 130° C. in an air furnace over 12 hours and then kept at 130° C. for 0.5 hour to be polymerized. After the end of polymerization, the gasket and the mold were removed, and the polymerized product was put into an oven to be heated at 130° ° C. for 3 hours. The functional laminate (A10) was dried under vacuum at 80° C. and 13 Torr for 15 hours before use.

Thereafter, the outer wall of the molded product was polished with a ball rubbing machine to obtain a functional lens having a diameter of 60 mm. The same operation was repeated to obtain 10 functional lenses.

When the obtained functional lens was evaluated, as photochromic properties, it had a luminous transmittance of 10.8%, a fading speed of 45 seconds, a luminous transmittance (before color development) of 40.2%, a polarization degree (before color development) of 99.0% and an appearance of "0". When separation between the functional laminate and the synthetic resin layer of the functional lens was visually evaluated, it was "0" in the initial stage and "0" after a boiling test (after 3 hours). The adhesive strength was higher than 250 N with the result that the functional laminate (A) or the synthetic resin layer (B) was broken.

The photochromic properties, luminous transmittance, fading speed, luminous transmittance (before color development), polarization degree (before color development), appearance, separation and adhesive strength were evaluated in the same manner as in the above Examples.

The visual evaluation (air bubbles) of the functional lens was "0". As for air bubbles, how many lenses out of 10 lenses air bubbles were produced was visually checked as will be explained below.

[Visual Evaluation (Air Bubbles)]

The production of air bubbles contained in the obtained laminate was visually checked. This evaluation was made on the basis of the following criteria by making 10 laminated bodies each.

0; 0 to 2 air bubbles are produced in all 10 laminates. Even when air bubbles are produced, they are produced only at around edges.

1; 3 or more air bubbles are produced in 5 or more out of 10 laminates.

Examples 51 to 77, Comparative Example 3

Functional lenses were produced in the same manner as in Example 50 except that functional laminates and monomer compositions for forming a lens shown in Tale 11 were used. The results are shown in Table 11.

Reference abbreviations for the monomers for forming a lens (including polymerization conditions) shown in Table 11 are the same as those for the monomers for forming a lens used in Table 5, and details thereof are as described above.

TABLE 11

| | Functional laminate (A) | Monomer compositions for forming a lens | Polarization L.T. (b.c.d.) (%) | Polarization degree (b.c.d.) (%) | L.T. (%) | Photochromic properties Fading speed (sec) | Photochromic properties Adhesive strength (N) | Appearance | Visual evaluation (separation) After Boiling test | Visual evaluation (air bubbles) |
|---|---|---|---|---|---|---|---|---|---|---|
| Ex. 50 | F.L. (A10) | Thiourethane | 40.2 | 99.0 | 10.8 | 45 | >250 | 0 | 0 | 0 | 0 |
| Ex. 51 | F.L. (A11) | Thiourethane | 40.2 | 99.0 | 10.8 | 45 | >250 | 0 | 0 | 1 | 0 |
| Ex. 52 | F.L. (A12) | Thiourethane | 40.2 | 99.0 | 10.8 | 45 | >250 | 0 | 0 | 0 | 0 |
| Ex. 53 | F.L. (A13) | Thiourethane | 40.2 | 99.0 | 10.8 | 45 | >250 | 0 | 0 | 0 | 0 |
| Ex. 54 | F.L. (A14) | Thiourethane | 40.2 | 99.0 | 10.8 | 45 | >250 | 0 | 0 | 0 | 0 |
| Ex. 55 | F.L. (A15) | Thiourethane | 40.2 | 99.0 | 10.8 | 45 | >250 | 0 | 0 | 0 | 0 |
| Ex. 56 | F.L. (A16) | Thiourethane | 40.2 | 99.0 | 10.8 | 45 | >250 | 0 | 0 | 0 | 0 |
| Ex. 57 | F.L. (A17) | Thiourethane | 40.2 | 99.0 | 10.8 | 45 | >250 | 0 | 0 | 0 | 0 |
| Ex. 58 | F.L. (A18) | Thiourethane | 40.2 | 99.0 | 10.8 | 45 | >250 | 0 | 0 | 0 | 0 |
| Ex. 59 | F.L. (A19) | Thiourethane | 40.2 | 99.0 | 10.8 | 45 | >250 | 0 | 0 | 0 | 0 |
| Ex. 60 | F.L. (A20) | Thiourethane | 40.2 | 99.0 | 10.8 | 45 | >250 | 0 | 0 | 0 | 0 |
| Ex. 61 | F.L. (A21) | Thiourethane | 40.2 | 99.0 | 10.8 | 45 | >250 | 0 | 0 | 0 | 0 |
| Ex. 62 | F.L. (A22) | Thiourethane | 40.2 | 99.0 | 10.8 | 45 | >250 | 0 | 0 | 0 | 0 |
| Ex. 63 | F.L. (A23) | Thiourethane | 40.2 | 99.0 | 10.8 | 45 | >250 | 0 | 0 | 2 | 0 |
| Ex. 64 | F.L. (A24) | Thiourethane | — | — | 26.2 | 45 | >250 | 1 | 0 | 0 | 0 |
| Ex. 65 | F.L. (A25) | Thiourethane | — | — | 26.2 | 45 | >250 | 0 | 0 | 0 | 0 |
| Ex. 66 | F.L. (A26) | Thiourethane | — | — | 26.2 | 45 | >250 | 0 | 0 | 0 | 0 |
| Ex. 67 | F.L. (A27) | Thiourethane | — | — | 26.2 | 45 | >250 | 1 | 0 | 1 | 0 |
| Ex. 68 | F.L. (A28) | Thiourethane | — | — | 26.2 | 45 | >250 | 0 | 0 | 0 | 0 |
| Ex. 69 | F.L. (A29) | Thiourethane | — | — | 26.2 | 45 | >250 | 0 | 0 | 0 | 0 |
| Ex. 70 | F.L. (A30) | Thiourethane | — | — | 26.2 | 45 | >250 | 0 | 0 | 0 | 0 |
| Ex. 71 | F.L. (A31) | Thiourethane | — | — | 26.2 | 45 | >250 | 1 | 0 | 0 | 0 |
| Ex. 72 | F.L. (A32) | Allyl | — | — | 26.2 | 45 | 50 | 1 | 0 | 1 | 1 |
| Ex. 73 | F.L. (A33) | Acryl | — | — | 26.2 | 45 | 40 | 1 | 0 | 1 | 0 |
| Ex. 74 | F.L. (A34) | Thioepoxy | — | — | 26.2 | 45 | >200 | 1 | 0 | 1 | 0 |
| Ex. 75 | F.L. (A35) | Urethane urea | — | — | 26.2 | 45 | >240 | 1 | 0 | 1 | 0 |
| Ex. 76 | F.L. (A36) | Thiourethane | 74.8 | 34.5 | 21.1 | 45 | >250 | 0 | 0 | 0 | 0 |

TABLE 11-continued

| | | | | | | | | | | |
|---|---|---|---|---|---|---|---|---|---|---|
| Ex. 77 | F.L. (A37) | Thiourethane | 54.8 | 80.7 | 14.5 | 45 | >250 | 0 | 0 | 0 | 0 |
| C. Ex. 3 | F.L. (A38) | Thiourethane | — | — | — | — | — | cloudy | — | — | 0 |

Ex.: Example
C. Ex.: Comparative Example
F.L.: Functional laminate
is: initial stage
b.c.d.: before color development
L.T.: Luminous transmittance Examples 78 to 80

Functional lenses were produced in the same manner as in Example 50 except that surface treating methods and monomer compositions for forming a lens shown in Table 12 were used. The results are shown in Table 12. The surface treatments were carried out under the same conditions as those shown in Table 4.

TABLE 12

| | Functional laminate (A) | Surface treating methods | Monomer compositions for forming a lens | L.T. (b.c.d.) (%) | Polarization degree (b.c.d.) (%) | Photochromic properties | | | Visual evaluation (separation) | | | Visual evaluation (air bubbles) |
|---|---|---|---|---|---|---|---|---|---|---|---|---|
| | | | | | | L.T. (%) | Fading speed (sec) | Adhesive strength (N) | Appearance | is | After Boiling test | |
| Ex. 78 | F.L. (A10) | b; 0.5 min. | Thiourethane | 40.2 | 99.0 | 10.8 | 45 | >250 | 0 | 0 | 0 | 0 |
| Ex. 79 | F.L. (A10) | d; 50° C. X 30 min. | aryl | 40.2 | 99.0 | 10.8 | 45 | >170 | 0 | 0 | 0 | 0 |
| Ex. 80 | F.L. (A10) | e; 50° C. X 30 min. | acryl | 40.2 | 99.0 | 10.8 | 45 | 140 | 0 | 0 | 0 | 0 |

Ex.: Example
F.L.: Functional laminate
b.c.d.: before color development
L.T.: Luminous transmittance
is: initial stage As obvious from the above Examples 50 to 80, it is understood that the photochromic laminates and the laminates of the present invention have excellent photochromic properties and/or polarizability and further excellent adhesion and appearance.

Meanwhile, although a photochromic laminate having excellent photochromic properties and a good appearance was obtained in Comparative Example 2, a cloudy (appearance defect) functional lens was obtained in Comparative Example 3 as the solvent resistance of the polycarbonate sheet was low in Comparative Example 3 in which functional laminate (A38) of Comparative Example 2 was used.

EXPLANATION OF REFERENCE NUMERALS 1 functional laminate (A)
2 first optical sheet (Aa)
3 adhesive layer having photochromic properties (photochromic adhesive layer (Ac1))
3' adhesive layer having no photochromic properties (adhesive layer)
4 second optical sheet (Ab)
4' second optical sheet composed of polarizing film (Ab)
5 polarizing film (Ac2)
6 functional lens
7 outer surface of first optical sheet (Aa)
7' outer surface of second optical sheet (Ab)
8 synthetic resin layer
9 surface modified area

The invention claimed is:

1. A functional lens having a functional laminate (A) comprising a first optical sheet (Aa), a second optical sheet (Ab) and a functional layer (Ac) existent between these two sheets and having photochromic properties and/or polarizability and a synthetic resin layer (B) existent on at least one of the first optical sheet (Aa) and the second optical sheet (Ab) of the functional laminate (A), wherein
 the first optical sheet (Aa) and the second optical sheet (Ab) are both made of a resin selected from the group consisting of polyamide resin, polyester resin, cellulose resin, (meth)acrylic resin, polyurethane resin, polyurethane urea resin, polyimide resin, epoxy resin, polyolefin resin and polyvinyl alcohol resin, the synthetic resin layer (B) is made of a resin selected from the group consisting of polyamide resin, polyester resin, allyl resin, (meth)acrylic resin, polyurethane resin, polyurethane urea resin, polythiourethane resin, polythioepoxy resin and polycarbonate resin, and adhesive strength between the first optical sheet (Aa) and/or the second optical sheet (Ab) and the synthetic resin layer (B) is not less than 50 N,
 wherein the reactive functional group of the surface modified area is selected from the group consisting of hydroxy group, thiol group, carboxy group, amino group, sulfo group, (thio) isocyanate group, allyl group, (meth)acrylic group, vinyl group, epoxy group, oxetane group and thioepoxy group.

2. The functional lens according to claim 1, wherein the first optical sheet (Aa) and/or the second optical sheet (Ab) are/is made of a resin selected from the group consisting of polyamide resin, polyester resin, cellulose resin and polyvinyl alcohol resin, and the synthetic resin layer (B) is made of a resin selected from the group consisting of allyl resin, (meth)acrylic resin, polyurethane resin, polyurethane urea resin, polythiourethane resin and polythioepoxy resin.

3. The functional lens according to claim 1, wherein the first optical sheet (Aa) and the second optical sheet (Ab) are both made of polyvinyl alcohol resin, the functional layer (Ac) is a photochromic adhesive layer (Ac1) containing a photochromic compound and a polyurethane urea resin, and the first optical sheet (Aa) and the second optical sheet (Ab) are directly bonded together by the photochromic adhesive layer (Ac1).

4. The functional lens according to claim 3, wherein at least one of the first optical sheet (Aa) and the second optical sheet (Ab) made of polyvinyl alcohol resin is a sheet having polarizability.

5. A functional laminate (A) comprising a first optical sheet (Aa), a second optical sheet (Ab) and a functional layer (Ac) existent between these two sheets and having photochromic properties and/or polarizability, wherein the first optical sheet (Aa) and the second optical sheet (Ab) are both made of a resin selected from the group consisting of polyamide resin, polyester resin, cellulose resin, (meth)acrylic resin, polyurethane resin, polyurethane urea resin, polyimide resin, epoxy resin and polyolefin resin, and a surface modified area having a reactive functional group is existent on the outer surface of at least one of the first optical sheet (Aa) and the second optical sheet (Ab)

wherein the reactive functional group of the surface modified area is selected from the group consisting of hydroxy group, thiol group, carboxy group, amino group, sulfo group, (thio) isocyanate group, allyl group, (meth)acrylic group, vinyl group, epoxy group, oxetane group and thioepoxy group.

6. The functional laminate according to claim 5, wherein the surface modified area is an area formed by treating the outer surface of the optical sheet with a coat composition comprising a silane coupling agent having a radically polymerizable group.

7. The functional laminate according to claim 5, wherein a contact angle of the surface modified area is 10 to 60°.

8. The functional laminate according to claim 5, wherein the functional layer (Ac) comprises a layer having photochromic properties, and the layer having photochromic properties is a photochromic adhesive layer (Ac1) comprising a photochromic compound and a polyurethane urea resin.

9. The functional laminate according to claim 5, wherein the functional layer (Ac) comprises a polarizing film (Ac2) which is a layer having polarizability, and both surfaces of the polarizing film (Ac2) are bonded to the first optical sheet (Aa) and the second optical sheet (Ab) through an adhesive layer, respectively.

10. The functional laminate according to claim 5, wherein the functional layer (Ac) has a layer having photochromic properties and a layer having polarizability, the layer having photochromic properties is a photochromic adhesive layer (Ac1) comprising a photochromic compound and a polyurethane urea resin, the photochromic adhesive layer (Ac1) is bonded to the first optical sheet (Aa), the layer having polarizability is a polarizing film (Ac2), one surface of the polarizing film (Ac2) is bonded to the photochromic adhesive layer (Ac1), and the other surface of the polarizing film (Ac2) is bonded to the second optical sheet (Ab) through an adhesive layer.

11. A method of producing the functional lens of claim 1, comprising the steps of:

embedding a functional laminate (A) in a monomer composition for forming a lens which is polymerized to form a resin selected from the group consisting of allyl resin, (meth)acrylic resin, polyurethane resin, polyurethane urea resin, polythiourethane resin and polythioepoxy resin; said functional laminate (A) comprising a first optical sheet (Aa), a second optical sheet (Ab) and a functional layer (Ac) existent between these two sheets and having photochromic properties and/or polarizability, wherein the first optical sheet (Aa) and the second optical sheet (Ab) are both made of a resin selected from the group consisting of polyamide resin, polyester resin, cellulose resin, (meth)acrylic resin, polyurethane resin, polyurethane urea resin, polyimide resin, epoxy resin and polyolefin resin, and a surface modified area having a reactive functional group is existent on the outer surface of at least one of the first optical sheet (Aa) and the second optical sheet (Ab), and polymerizing the monomer composition for forming a lens to laminate a synthetic resin layer (B) on the functional laminate (A), wherein the reactive functional group of the surface modified area is selected from the group consisting of hydroxy group, thiol group, carboxy group, amino group, sulfo group, (thio) isocyanate group, allyl group, (meth)acrylic group, vinyl group, epoxy group, oxetane group and thioepoxy group.

12. The functional laminate according to claim 1, wherein the surface modified area is an area formed by treating the outer surface of the optical sheet with a coat composition comprising a silane coupling agent having a radically polymerizable group.

13. The functional laminate according to claim 1, wherein a contact angle of the surface modified area is 10 to 60°.

14. The functional laminate according to claim 1, wherein the functional layer (Ac) comprises a layer having photochromic properties, and the layer having photochromic properties is a photochromic adhesive layer (Ac1) comprising a photochromic compound and a polyurethane urea resin.

15. The functional laminate according to claim 6, wherein the functional layer (Ac) comprises a layer having photochromic properties, and the layer having photochromic properties is a photochromic adhesive layer (Ac1) comprising a photochromic compound and a polyurethane urea resin.

16. The functional laminate according to claim 7, wherein the functional layer (Ac) comprises a layer having photochromic properties, and the layer having photochromic properties is a photochromic adhesive layer (Ac1) comprising a photochromic compound and a polyurethane urea resin.

17. The functional laminate according to claim 5, wherein the functional layer (Ac) comprises a polarizing film (Ac2) which is a layer having polarizability, and both surfaces of the polarizing film (Ac2) are bonded to the first optical sheet (Aa) and the second optical sheet (Ab) through an adhesive layer, respectively.

* * * * *